US012395268B1

(12) United States Patent
Shattil

(10) Patent No.: US 12,395,268 B1
(45) Date of Patent: Aug. 19, 2025

(54) LINEAR NETWORK CODING IN COMMUNICATION NETWORKS

(71) Applicant: Steve J Shattil, Cheyenne, WY (US)

(72) Inventor: Steve J Shattil, Cheyenne, WY (US)

(73) Assignee: Genghiscomm Holdings, LLC, Cheyenne, WY (US)

( * ) Notice: Subject to any disclaimer, the term of this patent is extended or adjusted under 35 U.S.C. 154(b) by 161 days.

(21) Appl. No.: 18/367,410

(22) Filed: Sep. 12, 2023

Related U.S. Application Data

(63) Continuation of application No. 17/873,111, filed on Jul. 25, 2022, now Pat. No. 12,224,860, which is a
(Continued)

(51) Int. Cl.
*H04L 1/06* (2006.01)
*H04B 7/026* (2017.01)
(Continued)

(52) U.S. Cl.
CPC .......... *H04L 1/0681* (2013.01); *H04B 7/026* (2013.01); *H04J 13/0003* (2013.01);
(Continued)

(58) Field of Classification Search
CPC . H04L 1/0681; H04L 1/0077; H04L 27/2602; H04L 45/24; H04L 5/0021;
(Continued)

(56) References Cited

U.S. PATENT DOCUMENTS

| 4,164,714 A | 8/1979 | Swanson |
| 4,471,399 A | 9/1984 | Udren |

(Continued)

FOREIGN PATENT DOCUMENTS

| CN | 101622797 A | 1/2010 |
| CN | 105978655 A | 9/2016 |

(Continued)

OTHER PUBLICATIONS

C-Y. Hsu, et al.; "Novel SLM Scheme with Low-Complexity for PAPR Reduction in OFDM System", IEICE Trans. Fundamentals, vol. E91-A. No. 7, pp. 1689-1696, Jul. 2008.
(Continued)

*Primary Examiner* — Vineeta S Panwalkar
(74) *Attorney, Agent, or Firm* — Steven J Shattil

(57) ABSTRACT

A device configured to communicate in a wireless network modulates data symbols onto a sequence of code symbols to produce a transmit signal comprising linear combinations of the data symbols. Modulation includes performing a block transform on the data symbols to produce coded data symbols. The block transform multiplies each of the data symbols with one of a set of code vectors, wherein each of the code vectors comprises a different frequency. Subcarrier modulation is employed to modulate each coded data symbol onto a different subcarrier frequency to produce modulated subcarriers. The transmit signal comprises a sum of the modulated subcarriers. The block transform has dimension N×N, whereas the subcarrier modulation employs a transform having dimension K×N, where K>N.

21 Claims, 18 Drawing Sheets

Related U.S. Application Data continuation of application No. 16/779,654, filed on Feb. 2, 2020, now abandoned, which is a continuation of application No. 15/810,828, filed on Nov. 13, 2017, now Pat. No. 10,587,369, which is a continuation of application No. 14/168,466, filed on Jan. 30, 2014, now Pat. No. 9,819,449.

(51) Int. Cl.
*H04J 13/00* (2011.01)
*H04L 1/00* (2006.01)
*H04L 27/26* (2006.01)
*H04L 45/24* (2022.01)
*H04L 5/00* (2006.01)
*H04W 52/34* (2009.01)
*H04W 72/044* (2023.01)

(52) U.S. Cl.
CPC .......... *H04J 13/004* (2013.01); *H04L 1/0077* (2013.01); *H04L 27/2602* (2013.01); *H04L 45/24* (2013.01); *H04L 2001/0097* (2013.01); *H04L 5/0021* (2013.01); *H04L 27/2601* (2013.01); *H04L 27/2614* (2013.01); *H04W 52/346* (2013.01); *H04W 72/046* (2013.01)

(58) Field of Classification Search
CPC ............. H04L 27/2601; H04L 27/2614; H04L 2001/0097; H04B 7/026; H04J 13/0003; H04J 13/004; H04W 52/346; H04W 72/046

See application file for complete search history.

(56) References Cited

U.S. PATENT DOCUMENTS

| | | |
|---|---|---|
| 4,479,226 A | 10/1984 | Prabhu et al. |
| 4,550,402 A | 10/1985 | Gable et al. |
| 4,590,511 A | 5/1986 | Bocchi et al. |
| 4,628,517 A | 12/1986 | Schwarz |
| 4,700,341 A | 10/1987 | Huang |
| 4,827,480 A | 5/1989 | Kowalski |
| 4,901,307 A | 2/1990 | Gilhousen et al. |
| 4,912,422 A | 3/1990 | Kobayashi et al. |
| 4,943,973 A | 7/1990 | Werner |
| 5,003,545 A | 3/1991 | Kowalski |
| 5,016,242 A | 5/1991 | Tang |
| 5,093,863 A | 3/1992 | Galand et al. |
| 5,125,100 A | 6/1992 | Katznelson |
| 5,191,459 A | 3/1993 | Thompson et al. |
| 5,249,201 A | 9/1993 | Posner et al. |
| 5,282,222 A | 1/1994 | Fattouche et al. |
| 5,309,514 A | 5/1994 | Johnson et al. |
| 5,406,551 A | 4/1995 | Saito et al. |
| 5,410,538 A | 4/1995 | Roche et al. |
| 5,412,648 A | 5/1995 | Fan |
| 5,422,952 A | 6/1995 | Kennedy et al. |
| 5,425,049 A | 6/1995 | Dent et al. |
| 5,457,557 A | 10/1995 | Zarem et al. |
| 5,463,376 A | 10/1995 | Stoffer |
| 5,491,727 A | 2/1996 | Petit |
| 5,500,856 A | 3/1996 | Nagase et al. |
| 5,504,775 A | 4/1996 | Chouly et al. |
| 5,504,783 A | 4/1996 | Tomisato et al. |
| 5,519,692 A | 5/1996 | Hershey |
| 5,521,937 A | 5/1996 | Kondo et al. |
| 5,528,581 A | 6/1996 | De Bot |
| 5,533,012 A | 7/1996 | Fukasawa et al. |
| 5,543,806 A | 8/1996 | Wilkinson |
| 5,548,582 A | 8/1996 | Brajal et al. |
| 5,555,268 A | 9/1996 | Fattouche et al. |
| 5,563,906 A | 10/1996 | Hershey et al. |
| 5,579,304 A | 11/1996 | Sugimoto et al. |
| 5,612,978 A | 3/1997 | Blanchard et al. |
| 5,630,154 A | 5/1997 | Bolstad et al. |
| 5,640,698 A | 6/1997 | Shen et al. |
| 5,691,832 A | 11/1997 | Liedenbaum et al. |
| 5,694,393 A | 12/1997 | Kaye |
| 5,704,013 A | 12/1997 | Watari et al. |
| 5,712,716 A | 1/1998 | Vanoli et al. |
| 5,765,097 A | 6/1998 | Dail |
| 5,790,516 A | 8/1998 | Gudmundson et al. |
| 5,793,413 A | 8/1998 | Hylton et al. |
| 5,793,759 A | 8/1998 | Rakib et al. |
| 5,809,426 A | 9/1998 | Radojevic et al. |
| 5,815,801 A | 9/1998 | Hamalainen et al. |
| 5,818,619 A | 10/1998 | Medved et al. |
| 5,822,368 A | 10/1998 | Wang |
| 5,828,658 A | 10/1998 | Ottersten et al. |
| 5,831,977 A | 11/1998 | Dent |
| 5,838,268 A | 11/1998 | Frenkel et al. |
| 5,844,951 A | 12/1998 | Proakis et al. |
| 5,862,189 A | 1/1999 | Huisken et al. |
| 5,931,893 A | 8/1999 | Dent et al. |
| 5,940,196 A | 8/1999 | Piehler et al. |
| 5,940,379 A | 8/1999 | Startup et al. |
| 5,943,322 A | 8/1999 | Mayor et al. |
| 5,943,332 A | 8/1999 | Liu et al. |
| 5,949,796 A | 9/1999 | Kumar |
| 5,955,983 A | 9/1999 | Li |
| 5,955,992 A | 9/1999 | Shattil |
| 5,960,032 A | 9/1999 | Letaief et al. |
| 5,991,334 A | 11/1999 | Papadopoulos et al. |
| 6,008,760 A | 12/1999 | Shattil |
| 6,018,317 A | 1/2000 | Dogan et al. |
| 6,047,190 A | 4/2000 | Haleem et al. |
| 6,055,432 A | 4/2000 | Haleem et al. |
| 6,058,105 A | 5/2000 | Hochwald |
| 6,075,812 A | 6/2000 | Cafarella et al. |
| 6,084,871 A | 7/2000 | Engstrom et al. |
| 6,088,351 A | 7/2000 | Jenkin et al. |
| 6,091,967 A | 7/2000 | Kruys et al. |
| 6,097,712 A | 8/2000 | Secord et al. |
| 6,097,773 A | 8/2000 | Carter et al. |
| 6,107,954 A | 8/2000 | Li |
| 6,122,295 A | 9/2000 | Kato et al. |
| 6,128,276 A | 10/2000 | Agee |
| 6,128,350 A | 10/2000 | Shastri et al. |
| 6,130,918 A | 10/2000 | Humphrey et al. |
| 6,141,393 A | 10/2000 | Thomas et al. |
| RE36,944 E | 11/2000 | Li |
| 6,144,711 A | 11/2000 | Raleigh et al. |
| 6,154,443 A | 11/2000 | Huang et al. |
| 6,155,980 A | 12/2000 | Chiao et al. |
| 6,175,550 B1 | 1/2001 | van Nee et al. |
| 6,175,551 B1 | 1/2001 | Awater et al. |
| 6,178,158 B1 | 1/2001 | Suzuki et al. |
| 6,188,717 B1 | 2/2001 | Kaiser et al. |
| 6,192,068 B1 | 2/2001 | Fattouche et al. |
| 6,208,295 B1 | 3/2001 | Dogan et al. |
| 6,211,671 B1 | 4/2001 | Shattil |
| 6,215,983 B1 | 4/2001 | Dogan et al. |
| 6,233,248 B1 | 5/2001 | Sautter et al. |
| 6,236,642 B1 | 5/2001 | Shaffer et al. |
| 6,240,129 B1 | 5/2001 | Reusens et al. |
| 6,243,565 B1 | 6/2001 | Smith et al. |
| 6,243,581 B1 | 6/2001 | Jawanda |
| 6,252,909 B1 | 6/2001 | Tzannes et al. |
| 6,266,702 B1 | 7/2001 | Darnell et al. |
| 6,282,167 B1 | 8/2001 | Michon et al. |
| 6,282,185 B1 | 8/2001 | Hakkinen et al. |
| 6,289,220 B1 | 9/2001 | Spear |
| 6,292,473 B1 | 9/2001 | Duske et al. |
| 6,301,221 B1 | 10/2001 | Paterson |
| 6,307,892 B1 | 10/2001 | Jones et al. |
| 6,310,704 B1 | 10/2001 | Dogan et al. |
| 6,320,897 B1 | 11/2001 | Fattouche et al. |
| 6,331,837 B1 | 12/2001 | Shattil |
| 6,348,791 B2 | 2/2002 | Shattil |
| 6,351,499 B1 | 2/2002 | Paulraj et al. |
| 6,359,923 B1 | 3/2002 | Agee et al. |
| 6,377,566 B1 | 4/2002 | Cupo et al. |
| 6,389,034 B1 | 5/2002 | Guo et al. |

(56) References Cited

U.S. PATENT DOCUMENTS

| | | | |
|---|---|---|---|
| 6,405,147 B1 | 6/2002 | Fera |
| 6,418,136 B1 | 7/2002 | Naor et al. |
| 6,421,528 B1 | 7/2002 | Rosen et al. |
| 6,434,390 B2 | 8/2002 | Rahman |
| 6,438,173 B1 | 8/2002 | Stantchev et al. |
| 6,442,130 B1 | 8/2002 | Jones, IV et al. |
| 6,442,193 B1 | 8/2002 | Hirsch |
| 6,442,214 B1 * | 8/2002 | Boleskei ............. H04B 7/12 375/267 |
| 6,442,222 B1 | 8/2002 | Ghazi-Moghadam et al. |
| 6,452,981 B1 | 9/2002 | Raleigh et al. |
| 6,459,740 B1 | 10/2002 | Lo |
| 6,463,295 B1 | 10/2002 | Yun |
| 6,470,055 B1 | 10/2002 | Feher |
| 6,473,393 B1 | 10/2002 | Ariyavisitakul et al. |
| 6,473,418 B1 | 10/2002 | Laroia et al. |
| 6,496,290 B1 | 12/2002 | Lee |
| 6,504,862 B1 | 1/2003 | Yang et al. |
| 6,507,319 B2 | 1/2003 | Sikina |
| 6,510,133 B1 | 1/2003 | Uesugi |
| 6,512,737 B1 | 1/2003 | Agee |
| 6,526,105 B1 | 2/2003 | Harikumar et al. |
| 6,532,224 B1 | 3/2003 | Dailey |
| 6,549,581 B1 | 4/2003 | Izumi et al. |
| 6,563,786 B1 | 5/2003 | Van Nee |
| 6,563,881 B1 | 5/2003 | Sakoda et al. |
| 6,567,482 B1 | 5/2003 | Popovic |
| 6,567,982 B1 | 5/2003 | Howe et al. |
| 6,570,913 B1 | 5/2003 | Chen |
| 6,597,745 B1 | 7/2003 | Dowling |
| 6,600,776 B1 | 7/2003 | Alamouti et al. |
| 6,603,827 B2 | 8/2003 | Bottomley et al. |
| 6,606,351 B1 | 8/2003 | Dapper et al. |
| 6,631,175 B2 | 10/2003 | Harikumar et al. |
| 6,636,495 B1 | 10/2003 | Tangemann |
| 6,650,645 B2 | 11/2003 | Scott et al. |
| 6,654,408 B1 | 11/2003 | Kadous et al. |
| 6,654,719 B1 | 11/2003 | Papadias |
| 6,662,024 B2 | 12/2003 | Walton et al. |
| 6,665,348 B1 | 12/2003 | Feher |
| 6,665,521 B1 | 12/2003 | Gorday et al. |
| 6,667,714 B1 | 12/2003 | Solondz |
| 6,674,810 B1 | 1/2004 | Cheng |
| 6,674,999 B2 | 1/2004 | Ramachandran |
| 6,678,318 B1 | 1/2004 | Lai |
| 6,686,879 B2 | 2/2004 | Shattil |
| 6,687,511 B2 | 2/2004 | McGowan et al. |
| 6,693,984 B1 | 2/2004 | Andre et al. |
| 6,694,154 B1 | 2/2004 | Molnar et al. |
| 6,704,794 B1 | 3/2004 | Kejriwal et al. |
| 6,717,908 B2 | 4/2004 | Vijayan et al. |
| 6,728,295 B1 | 4/2004 | Nallanathan et al. |
| 6,747,946 B1 | 6/2004 | Kaneko et al. |
| 6,751,187 B2 | 6/2004 | Walton et al. |
| 6,757,344 B2 | 6/2004 | Carleton et al. |
| 6,760,373 B2 | 7/2004 | Gross et al. |
| 6,765,969 B1 | 7/2004 | Vook et al. |
| 6,778,514 B1 | 8/2004 | Boccussi et al. |
| 6,785,513 B1 | 8/2004 | Sivaprakasam |
| 6,813,485 B2 | 11/2004 | Sorrells et al. |
| 6,832,251 B1 | 12/2004 | Gelvin et al. |
| 6,842,847 B2 | 1/2005 | Larsson |
| 6,850,481 B2 | 2/2005 | Wu et al. |
| 6,859,506 B1 | 2/2005 | McCorkle |
| 6,859,641 B2 | 2/2005 | Collins et al. |
| 6,882,619 B1 | 4/2005 | Gerakoulis |
| 6,891,792 B1 | 5/2005 | Cimini, Jr. et al. |
| 6,901,422 B1 | 5/2005 | Sazegari |
| 6,904,283 B2 | 6/2005 | Li et al. |
| 6,907,270 B1 | 6/2005 | Blanz |
| 6,928,047 B1 | 8/2005 | Xia |
| 6,944,168 B2 | 9/2005 | Paatela et al. |
| 6,975,666 B2 | 12/2005 | Affes et al. |
| 6,980,768 B2 | 12/2005 | Arend et al. |
| 6,982,968 B1 | 1/2006 | Barratt et al. |
| 6,985,533 B2 | 1/2006 | Attallah et al. |
| 6,996,076 B1 | 2/2006 | Forbes et al. |
| 7,009,958 B1 | 3/2006 | Gerakoulis |
| 7,010,015 B2 | 3/2006 | Hervey |
| 7,010,048 B1 | 3/2006 | Shattil |
| 7,020,110 B2 | 3/2006 | Walton et al. |
| 7,031,309 B1 | 4/2006 | Sautter et al. |
| 7,031,371 B1 | 4/2006 | Lakkis |
| 7,035,661 B1 | 4/2006 | Yun |
| 7,039,120 B1 | 5/2006 | Thoumy et al. |
| 7,057,555 B2 | 6/2006 | Lewis |
| 7,075,999 B2 | 7/2006 | Redfern |
| 7,076,168 B1 | 7/2006 | Shattil |
| 7,082,153 B2 | 7/2006 | Balachandran et al. |
| 7,099,268 B2 | 8/2006 | Ichihara et al. |
| 7,139,320 B1 | 11/2006 | Singh et al. |
| 7,139,321 B2 | 11/2006 | Giannakis et al. |
| 7,149,211 B2 | 12/2006 | Bennett et al. |
| 7,154,936 B2 | 12/2006 | Bjerke et al. |
| 7,155,255 B2 | 12/2006 | Blum et al. |
| 7,158,474 B1 | 1/2007 | Gerakoulis |
| 7,158,504 B2 | 1/2007 | Kadaba et al. |
| 7,194,766 B2 | 3/2007 | Noehring et al. |
| 7,197,084 B2 | 3/2007 | Ketchum et al. |
| 7,224,716 B2 | 5/2007 | Roman |
| 7,263,133 B1 | 8/2007 | Miao |
| 7,283,799 B2 | 10/2007 | Shattil |
| 7,286,604 B2 | 10/2007 | Shattil |
| 7,295,509 B2 | 11/2007 | Laroia et al. |
| 7,304,939 B2 | 12/2007 | Steer et al. |
| 7,317,750 B2 | 1/2008 | Shattil |
| 7,366,117 B2 | 4/2008 | Kim et al. |
| 7,376,074 B2 | 5/2008 | Jung et al. |
| 7,391,804 B2 | 6/2008 | Shattil |
| 7,406,261 B2 | 7/2008 | Shattil |
| 7,418,043 B2 | 8/2008 | Shattil |
| 7,426,196 B2 | 9/2008 | Gopalakrishnan et al. |
| 7,430,257 B1 | 9/2008 | Shattil |
| 7,469,013 B1 | 12/2008 | Bolt et al. |
| 7,505,788 B1 | 3/2009 | Narasimhan |
| 7,508,798 B2 | 3/2009 | Tong et al. |
| 7,570,956 B2 | 8/2009 | Bigham et al. |
| 7,594,010 B2 | 9/2009 | Dohler et al. |
| 7,606,137 B2 | 10/2009 | Shattil |
| 7,751,488 B2 | 7/2010 | Moffatt |
| 7,764,594 B2 | 7/2010 | Walton et al. |
| 7,787,514 B2 | 8/2010 | Shattil |
| 7,787,556 B2 | 8/2010 | Zhang et al. |
| 7,801,247 B2 | 9/2010 | Onggosanusi et al. |
| 7,876,729 B1 | 1/2011 | Grilli et al. |
| 7,907,588 B2 | 3/2011 | Schaepperle et al. |
| 8,031,583 B2 | 10/2011 | Classon et al. |
| 8,090,000 B2 | 1/2012 | Hamamura |
| 8,090,037 B1 | 1/2012 | Harris et al. |
| 8,102,907 B2 | 1/2012 | Kim |
| 8,107,965 B2 | 1/2012 | Hui et al. |
| 8,149,969 B2 | 4/2012 | Khan et al. |
| 8,160,166 B2 | 4/2012 | Moffatt et al. |
| 8,301,139 B2 | 10/2012 | Lotze et al. |
| 8,320,301 B2 | 11/2012 | Walton et al. |
| 8,345,693 B1 | 1/2013 | Kim |
| 8,363,739 B2 | 1/2013 | Ma et al. |
| 8,374,074 B2 | 2/2013 | Liao et al. |
| 8,391,913 B2 | 3/2013 | Zimmer et al. |
| 8,396,153 B1 | 3/2013 | Shen et al. |
| 8,401,095 B2 | 3/2013 | Han et al. |
| 8,416,837 B2 | 4/2013 | Wu et al. |
| 8,472,335 B2 | 6/2013 | De Pasquale et al. |
| 8,498,647 B2 | 7/2013 | Gorokhov et al. |
| 8,526,400 B2 | 9/2013 | Tong et al. |
| 8,538,159 B2 | 9/2013 | Lu |
| 8,588,803 B2 | 11/2013 | Hakola et al. |
| 8,649,364 B2 | 2/2014 | Myung |
| 8,654,871 B2 | 2/2014 | Kishigami et al. |
| 8,670,390 B2 | 3/2014 | Shattil |
| 8,677,050 B2 | 3/2014 | Chen et al. |
| 8,724,721 B2 | 5/2014 | Soler Garrido |
| 8,780,830 B2 | 7/2014 | Doppler et al. |
| 8,804,647 B2 | 8/2014 | Ko et al. |

(56) References Cited

U.S. PATENT DOCUMENTS

| | | |
|---|---|---|
| 8,885,628 B2 | 11/2014 | Palanki et al. |
| 8,929,550 B2 | 1/2015 | Shattil |
| 8,942,082 B2 | 1/2015 | Shattil |
| 8,976,838 B2 | 3/2015 | Jaeckel et al. |
| 9,025,684 B2 | 5/2015 | Jeong et al. |
| 9,026,790 B2 | 5/2015 | Bolton et al. |
| 9,042,468 B2 | 5/2015 | Barbu et al. |
| 9,130,810 B2 | 9/2015 | Laroia et al. |
| 9,225,471 B2 | 12/2015 | Shattil |
| 9,485,063 B2 | 11/2016 | Shattil |
| 9,628,231 B2 | 4/2017 | Shattil |
| 9,693,339 B2 | 6/2017 | Palanki et al. |
| 9,698,888 B2 | 7/2017 | Ko et al. |
| 9,768,842 B2 | 9/2017 | Shattil |
| 9,798,329 B2 | 10/2017 | Shattil |
| 9,800,448 B1 | 10/2017 | Shattil |
| 9,819,449 B2 | 11/2017 | Shattil |
| 9,870,341 B2 | 1/2018 | Badin et al. |
| 10,094,650 B2 | 10/2018 | Todeschini |
| 10,200,227 B2 | 2/2019 | Shattil |
| 10,211,892 B2 | 2/2019 | Shattil |
| 10,243,773 B1 | 3/2019 | Shattil |
| 10,447,520 B1 | 10/2019 | Shattil |
| 10,505,774 B1 | 12/2019 | Shattil |
| 10,554,353 B2 | 2/2020 | Zhao et al. |
| 10,568,143 B2 | 2/2020 | Delfeld et al. |
| 10,602,507 B2 | 3/2020 | Nammi et al. |
| 10,637,705 B1 | 4/2020 | Shattil |
| 10,728,074 B1 | 7/2020 | Shattil |
| 10,917,167 B2 | 2/2021 | Jia et al. |
| 10,985,961 B1 | 4/2021 | Shattil |
| 10,992,998 B2 | 4/2021 | Bergstrom |
| 11,018,918 B1 | 5/2021 | Shattil |
| 11,025,377 B2 | 6/2021 | Rakib et al. |
| 11,025,471 B2 | 6/2021 | Kuchi |
| 11,075,786 B1 | 7/2021 | Shattil |
| 11,196,603 B2 | 12/2021 | Shattil |
| 11,223,508 B1 | 1/2022 | Shattil |
| 11,252,006 B1 | 2/2022 | Shattil |
| 11,700,162 B2 | 7/2023 | Shattil |
| 2001/0050926 A1 | 12/2001 | Kumar |
| 2002/0009096 A1 | 1/2002 | Odenwalder |
| 2002/0034191 A1 | 3/2002 | Shattil |
| 2002/0044524 A1 | 4/2002 | Laroia et al. |
| 2002/0051433 A1 | 5/2002 | Affes et al. |
| 2002/0061068 A1 | 5/2002 | Leva et al. |
| 2002/0118727 A1 | 8/2002 | Kim et al. |
| 2002/0118781 A1 | 8/2002 | Thomas et al. |
| 2002/0127978 A1 | 9/2002 | Khatri |
| 2002/0137472 A1 | 9/2002 | Quinn et al. |
| 2002/0168016 A1 | 11/2002 | Wang et al. |
| 2002/0172184 A1 | 11/2002 | Kim et al. |
| 2002/0172213 A1 | 11/2002 | Laroia et al. |
| 2002/0181509 A1 | 12/2002 | Mody et al. |
| 2002/0191630 A1 | 12/2002 | Jacobsen |
| 2002/0193146 A1 | 12/2002 | Wallace et al. |
| 2002/0196733 A1 | 12/2002 | Shen et al. |
| 2003/0026222 A1 | 2/2003 | Kotzin |
| 2003/0043732 A1 | 3/2003 | Walton et al. |
| 2003/0072380 A1 | 4/2003 | Huang |
| 2003/0085832 A1 | 5/2003 | Yu et al. |
| 2003/0086363 A1 | 5/2003 | Hernandes |
| 2003/0128658 A1 | 7/2003 | Walton et al. |
| 2003/0133469 A1 | 7/2003 | Brockmann et al. |
| 2003/0147655 A1 | 8/2003 | Shattil |
| 2003/0154262 A1 | 8/2003 | Kaiser et al. |
| 2003/0161282 A1 | 8/2003 | Medvedev et al. |
| 2003/0169824 A1 | 9/2003 | Chayat |
| 2003/0206527 A1 | 11/2003 | Mm |
| 2003/0218973 A1 | 11/2003 | Oprea et al. |
| 2004/0013101 A1 | 1/2004 | Akin et al. |
| 2004/0017824 A1 | 1/2004 | Koenck |
| 2004/0022175 A1 | 2/2004 | Bolinth et al. |
| 2004/0047405 A1 | 3/2004 | Boesel et al. |
| 2004/0057501 A1 | 3/2004 | Balachandran et al. |
| 2004/0086027 A1 | 5/2004 | Shattil |
| 2004/0100897 A1 | 5/2004 | Shattil |
| 2004/0131011 A1 | 7/2004 | Sandell et al. |
| 2004/0141548 A1 | 7/2004 | Shattil |
| 2004/0151109 A1 | 8/2004 | Batra et al. |
| 2004/0178954 A1 | 9/2004 | Vook et al. |
| 2004/0184398 A1 | 9/2004 | Walton et al. |
| 2004/0223476 A1 | 11/2004 | Jose et al. |
| 2004/0240535 A1 | 12/2004 | Verma et al. |
| 2004/0243258 A1 | 12/2004 | Shattil |
| 2005/0058098 A1 | 3/2005 | Klein et al. |
| 2005/0075081 A1 | 4/2005 | Catreux-Erceg et al. |
| 2005/0078742 A1 | 4/2005 | Cairns et al. |
| 2005/0143037 A1 | 6/2005 | Stratis et al. |
| 2005/0179607 A1 | 8/2005 | Gorsuch et al. |
| 2005/0198199 A1 | 9/2005 | Dowling |
| 2005/0255808 A1 | 11/2005 | Ahmed et al. |
| 2005/0259627 A1 | 11/2005 | Song et al. |
| 2005/0265275 A1 | 12/2005 | Howard et al. |
| 2005/0265293 A1 | 12/2005 | Ro et al. |
| 2005/0270968 A1 | 12/2005 | Feng et al. |
| 2005/0286476 A1 | 12/2005 | Crosswy et al. |
| 2006/0023803 A1 | 2/2006 | Perlman et al. |
| 2006/0034378 A1 | 2/2006 | Lindskog et al. |
| 2006/0057958 A1 | 3/2006 | Ngo et al. |
| 2006/0106600 A1 | 5/2006 | Bessette |
| 2006/0153283 A1 | 7/2006 | Scharf et al. |
| 2006/0245346 A1 | 11/2006 | Bar-Ness et al. |
| 2006/0262870 A1 | 11/2006 | Khan |
| 2007/0004465 A1 | 1/2007 | Papasakellariou et al. |
| 2007/0041311 A1 | 2/2007 | Baum et al. |
| 2007/0041404 A1 | 2/2007 | Palanki et al. |
| 2007/0071125 A1 | 3/2007 | Tan et al. |
| 2007/0078924 A1 | 4/2007 | Hassan et al. |
| 2007/0081580 A1 | 4/2007 | Breiling |
| 2007/0098099 A1 | 5/2007 | Gore et al. |
| 2007/0110172 A1 | 5/2007 | Faulkner et al. |
| 2007/0140102 A1 | 6/2007 | Oh et al. |
| 2007/0160014 A1 | 7/2007 | Larsson |
| 2007/0165845 A1 | 7/2007 | Ye et al. |
| 2007/0177681 A1 | 8/2007 | Choi et al. |
| 2007/0177689 A1 | 8/2007 | Beadle et al. |
| 2007/0183386 A1 | 8/2007 | Muharemovic et al. |
| 2007/0206686 A1 | 9/2007 | Vook et al. |
| 2007/0211807 A1 | 9/2007 | Han et al. |
| 2007/0218942 A1 | 9/2007 | Khan et al. |
| 2007/0253496 A1* | 11/2007 | Giannakis ........... H04L 27/2602 375/260 |
| 2008/0075188 A1 | 3/2008 | Kowalski et al. |
| 2008/0090572 A1 | 4/2008 | Cha et al. |
| 2008/0095121 A1 | 4/2008 | Shattil |
| 2008/0151743 A1 | 6/2008 | Tong et al. |
| 2008/0240022 A1 | 10/2008 | Yoon et al. |
| 2008/0298335 A1 | 12/2008 | Lee |
| 2008/0298502 A1 | 12/2008 | Xu et al. |
| 2008/0310484 A1 | 12/2008 | Shattil |
| 2008/0317172 A1 | 12/2008 | Zhang et al. |
| 2009/0005094 A1 | 1/2009 | Lee et al. |
| 2009/0019165 A1 | 1/2009 | Li et al. |
| 2009/0074093 A1 | 3/2009 | Han et al. |
| 2009/0086848 A1 | 4/2009 | Han et al. |
| 2009/0092182 A1 | 4/2009 | Shin et al. |
| 2009/0110033 A1 | 4/2009 | Shattil |
| 2009/0112551 A1 | 4/2009 | Hollis |
| 2009/0147870 A1 | 6/2009 | Lin et al. |
| 2009/0156252 A1 | 6/2009 | Harris |
| 2009/0274103 A1 | 11/2009 | Yang et al. |
| 2009/0304108 A1 | 12/2009 | Kwon et al. |
| 2009/0316643 A1 | 12/2009 | Yamada et al. |
| 2010/0008432 A1 | 1/2010 | Kim et al. |
| 2010/0039928 A1 | 2/2010 | Noh et al. |
| 2010/0041350 A1 | 2/2010 | Zhang et al. |
| 2010/0056200 A1 | 3/2010 | Tolonen |
| 2010/0080112 A1 | 4/2010 | Bertrand et al. |
| 2010/0091919 A1 | 4/2010 | Xu et al. |
| 2010/0098042 A1 | 4/2010 | Dent |
| 2010/0110875 A1 | 5/2010 | No et al. |
| 2010/0165829 A1 | 7/2010 | Narasimha et al. |
| 2010/0184369 A1 | 7/2010 | Cho et al. |

(56) References Cited

U.S. PATENT DOCUMENTS

| | | |
|---|---|---|
| 2010/0185541 A1 | 7/2010 | Hassan et al. |
| 2010/0232525 A1 | 9/2010 | Xia et al. |
| 2010/0238873 A1 | 9/2010 | Asanuma |
| 2010/0248739 A1 | 9/2010 | Westerberg et al. |
| 2010/0254484 A1 | 10/2010 | Hamaguchi et al. |
| 2010/0254497 A1 | 10/2010 | To et al. |
| 2010/0317343 A1 | 12/2010 | Krishnamurthy et al. |
| 2011/0012798 A1 | 1/2011 | Triolo |
| 2011/0041021 A1 | 2/2011 | Khoshnevis et al. |
| 2011/0058471 A1 | 3/2011 | Zhang |
| 2011/0064156 A1 | 3/2011 | Kim et al. |
| 2011/0096658 A1 | 4/2011 | Yang et al. |
| 2011/0105051 A1 | 5/2011 | Thomas et al. |
| 2011/0107174 A1 | 5/2011 | Liu et al. |
| 2011/0122930 A1 | 5/2011 | Al-Naffouri et al. |
| 2011/0135016 A1 | 6/2011 | Ahn et al. |
| 2011/0150325 A1 | 6/2011 | Hill et al. |
| 2011/0206207 A1 | 8/2011 | Priotti |
| 2011/0228863 A1 | 9/2011 | Papasakellariou et al. |
| 2011/0228878 A1 | 9/2011 | Sorrentino |
| 2011/0281534 A1 | 11/2011 | Liao et al. |
| 2012/0014392 A1 | 1/2012 | Bhushan et al. |
| 2012/0057660 A1 | 3/2012 | Nguyen et al. |
| 2012/0087393 A1 | 4/2012 | Jeong et al. |
| 2012/0093200 A1 | 4/2012 | Kyeong |
| 2012/0106504 A1 | 5/2012 | Klatt et al. |
| 2012/0113816 A1 | 5/2012 | Bhattad et al. |
| 2012/0177140 A1 | 7/2012 | Sahara |
| 2012/0188994 A1 | 7/2012 | Palanki et al. |
| 2012/0213054 A1 | 8/2012 | Hamaguchi et al. |
| 2012/0224517 A1 | 9/2012 | Yun et al. |
| 2012/0250740 A1 | 10/2012 | Ling |
| 2012/0252387 A1 | 10/2012 | Haskins et al. |
| 2012/0269285 A1 | 10/2012 | Jeong et al. |
| 2012/0294346 A1 | 11/2012 | Kolze |
| 2013/0012144 A1 | 1/2013 | Besoli et al. |
| 2013/0058239 A1 | 3/2013 | Wang et al. |
| 2013/0058432 A1 | 3/2013 | Futatsugi et al. |
| 2013/0077508 A1 | 3/2013 | Axmon et al. |
| 2013/0142275 A1 | 6/2013 | Baik et al. |
| 2013/0198590 A1 | 8/2013 | Kim et al. |
| 2013/0223269 A1 | 8/2013 | To et al. |
| 2013/0259113 A1 | 10/2013 | Kumar |
| 2013/0315211 A1 | 11/2013 | Balan et al. |
| 2014/0038657 A1 | 2/2014 | Jo et al. |
| 2014/0064392 A1 | 3/2014 | Jonsson et al. |
| 2014/0086186 A1 | 3/2014 | Hamaguchi et al. |
| 2014/0198863 A1 | 7/2014 | Terry |
| 2014/0348253 A1 | 11/2014 | Mobasher et al. |
| 2014/0376652 A1 | 12/2014 | Sayana et al. |
| 2015/0009971 A1 | 1/2015 | Han et al. |
| 2015/0049713 A1 | 2/2015 | Lan et al. |
| 2015/0103723 A1 | 4/2015 | Kim et al. |
| 2015/0110216 A1 | 4/2015 | Bajcsy et al. |
| 2015/0117558 A1 | 4/2015 | Phillips |
| 2015/0124765 A1 | 5/2015 | Rong et al. |
| 2015/0195840 A1 | 7/2015 | Ahn et al. |
| 2015/0199963 A1 | 7/2015 | Maaninen |
| 2015/0227747 A1 | 8/2015 | Gassi |
| 2015/0234033 A1 | 8/2015 | Jamieson et al. |
| 2015/0271000 A1 | 9/2015 | Yang et al. |
| 2015/0304153 A1 | 10/2015 | Moffatt et al. |
| 2015/0358190 A1 | 12/2015 | Kruglick et al. |
| 2016/0006594 A1 | 1/2016 | Persson et al. |
| 2016/0050096 A1 | 2/2016 | DelMarco |
| 2016/0050099 A1 | 2/2016 | Siohan et al. |
| 2016/0142117 A1 | 5/2016 | Rahman et al. |
| 2016/0197756 A1 | 7/2016 | Mestdagh et al. |
| 2016/0198474 A1 | 7/2016 | Raghavan et al. |
| 2016/0248443 A1 | 8/2016 | Murakami et al. |
| 2016/0254889 A1 | 9/2016 | Shattil |
| 2016/0269083 A1 | 9/2016 | Porat et al. |
| 2016/0344497 A1 | 11/2016 | Myung et al. |
| 2016/0352012 A1 | 12/2016 | Foo |
| 2016/0353446 A1 | 12/2016 | Abdoli et al. |
| 2017/0019284 A1 | 1/2017 | Ankarali et al. |
| 2017/0026218 A1 | 1/2017 | Shattil |
| 2017/0054480 A1 | 2/2017 | Shattil et al. |
| 2017/0054584 A1 | 2/2017 | Madaiah et al. |
| 2017/0126291 A1 | 5/2017 | Lea et al. |
| 2017/0126454 A1 | 5/2017 | Huan et al. |
| 2017/0126458 A1 | 5/2017 | Shattil |
| 2017/0134202 A1 | 5/2017 | Baligh et al. |
| 2017/0134235 A1 | 5/2017 | Wu et al. |
| 2017/0250848 A1 | 8/2017 | Lee et al. |
| 2017/0255593 A9 | 9/2017 | Agee |
| 2017/0264474 A1 | 9/2017 | He et al. |
| 2017/0279648 A1 | 9/2017 | Song et al. |
| 2017/0295000 A1 | 10/2017 | Yoo et al. |
| 2017/0331532 A1 | 11/2017 | Le-Ngoc |
| 2017/0353340 A1 | 12/2017 | Raphaeli et al. |
| 2018/0006692 A1 | 1/2018 | Noh et al. |
| 2018/0062904 A1 | 3/2018 | Hwang et al. |
| 2018/0075482 A1 | 3/2018 | Gierach |
| 2018/0091338 A1 | 3/2018 | Mayer et al. |
| 2018/0092086 A1 | 3/2018 | Nammi et al. |
| 2018/0109408 A1 | 4/2018 | Sandell et al. |
| 2018/0123846 A1 | 5/2018 | Kibutu et al. |
| 2018/0167244 A1 | 6/2018 | Cheng et al. |
| 2018/0191543 A1 | 7/2018 | Park et al. |
| 2018/0212810 A1 | 7/2018 | Park et al. |
| 2018/0219590 A1 | 8/2018 | Matsuda et al. |
| 2018/0262253 A1 | 9/2018 | Rahman et al. |
| 2018/0278303 A1 | 9/2018 | Hong et al. |
| 2018/0288809 A1 | 10/2018 | Delfeld et al. |
| 2018/0309599 A1 | 10/2018 | Lee |
| 2018/0332573 A1 | 11/2018 | Yu et al. |
| 2019/0036657 A1 | 1/2019 | Zhao et al. |
| 2019/0132177 A1 | 5/2019 | Wang et al. |
| 2019/0158338 A1 | 5/2019 | Herath et al. |
| 2019/0181928 A1 | 6/2019 | Pan et al. |
| 2019/0190753 A1 | 6/2019 | Bayesteh et al. |
| 2019/0260441 A1 | 8/2019 | Akuon et al. |
| 2019/0393948 A1 | 12/2019 | Zhao et al. |
| 2020/0028727 A1 | 1/2020 | Chen |
| 2022/0060363 A1 | 2/2022 | Shattil |

FOREIGN PATENT DOCUMENTS

| | | |
|---|---|---|
| CN | 105635025 | 9/2018 |
| CN | 108737307 A | 11/2018 |
| EP | 1835682 | 9/2007 |
| EP | 2675072 | 12/2013 |
| EP | 2763321 A1 | 8/2014 |
| EP | 2449690 B1 | 1/2016 |
| EP | 3118573 A1 | 1/2017 |
| JP | H08331093 | 12/1996 |
| JP | 2004-147126 A | 5/2004 |
| JP | 2011-229090 A | 11/2011 |
| JP | 2012-100323 | 5/2012 |
| JP | 2012109811 | 6/2012 |
| JP | 2013-521741 A | 6/2013 |
| JP | 2017-537514 A | 12/2017 |
| KR | 10-2010-0019974 | 2/2010 |
| KR | 10-20090033703 | 8/2011 |
| WO | WO/2001/054303 | 7/2001 |
| WO | 0237771 | 5/2002 |
| WO | WO2007048278 | 5/2007 |
| WO | WO2007068214 A1 | 6/2007 |
| WO | WO2011161601 | 12/2011 |
| WO | WO2014199989 A1 | 12/2014 |
| WO | WO2014206461 | 12/2014 |
| WO | WO2016115546 | 7/2016 |
| WO | WO2016172875 A1 | 11/2016 |
| WO | WO2017077848 A1 | 5/2017 |
| WO | WO2017078779 | 5/2017 |
| WO | WO2017186301 | 11/2017 |
| WO | WO2018031709 A1 | 2/2018 |
| WO | WO2018082791 | 5/2018 |
| WO | WO2018083601 | 5/2018 |

(56) References Cited

FOREIGN PATENT DOCUMENTS

| WO | WO/2018174686 | 9/2018 |
|---|---|---|
| WO | WO/2019023283 | 1/2019 |

OTHER PUBLICATIONS

N. Jacklin, et al.; "A Linear Programming Based Tone Injection Algorithm for PAPR Reduction of OFDM and Linearly Precoded Systems", IEEE Trans. on Circuits and Systems—I: Regular Papers, vol. 60, No. 7, pp. 1937-1945, Jul. 2013.
T. Dias, R.C. de Lamare; "Study of Unique-Word Based GFDM Transmission Systems"; https://arxiv.org/pdf/1805.10702.pdf, May 27, 2018.
R. Ferdian, et al.; "Efficient Equalization Hardware Architecture for SC-FDMA Systems without Cyclic Prefix"; 2012 International Symposium on Communications and Information Technologies (ISCIT): pp. 936-941, Oct. 2012.
M. Au, et al.; "Joint Code-Frequency Index Modulation for IoT and Multi-User Communications"; IEEE Journal of Selected Topics in Signal Processing (vol. 13, Issue: 6, Oct. 2019).
I.M. Hussain; "Low Complexity Partial SLM Technique for PAPR Reduction in OFDM Transmitters"; Int. J. on Electrical Engineering and Informatics, vol. 5, No. 1, Mar. 2013.
Z. Wang, et al.; "Linearly Precoded or Coded OFDM against Wireless Channel Fades?"; Third IEEE Signal Processing Workshop on Signal Processing Advances in Wireless Communications, Taoyuan, Taiwan, Mar. 20-23, 2001.
B.E. Priyanto, et al.; "Initial Performance Evaluation of DFT-Spread OFDM Based SC-FDMA for UTRA LTE Uplink;" 2007 IEEE 65th Vehicular Technology Conference—VTC2007—Spring; May 29, 2007.
H. Wu, et al., "Sum rate analysis of SDMA transmission in single carrier FDMA system"; Communication Systems, 2008. ICCS 2008. 11th IEEE Singapore International Conference; Dec. 2008.
R. Stirling-Gallacher; "Multi-Carrier Code Division Multiple Access," Ph. D. Thesis, University of Edinburgh; Aug. 1997.
T. Ginige, et al.; "Dynamic Spreading Code Selection Method for PAPR Reduction in OFDM-CDMA Systems With 4-QAM Modulation"; IEEE Communications Letters, vol. 5, No. 10; Oct. 2001.
C.R. Nassar, V.K. Garg, S.J. Shattil; "Discovery of uniform multicarrier frameworks for multiple-access technologies"; SPIE Proceedings [SPIE ITCom 2001: International Symposium on the Convergence of IT and Communications—Denver, CO (Monday Aug. 20, 2001)].
B. Natarajan, C.R. Nassar, S. Shattil; "High Data Rate FSK via Multi-Carrier Implementations for Wireless Personal Area Networks"; Proceedings of SPIE—The International Society for Optical Engineering, Oct. 2002.
S. Shattil, C.R. Nassar; "Improved Fourier Transforms for Multicarrier Processing"; Conference on Emerging Technologies for Future Generation Wireless Communications, Jul. 29-30, 2002, Boston, Massachusetts, Proceedings of SPIE vol. 4869 (2002).
S. Hijazi, M. Michelini, B. Natarajan, Z. Wu; "Enabling FCC's proposed spectral policy via carrier interferometry", Conference: Wireless Communications and Networking Conference, 2004. WCNC. 2004 IEEE vol. 4.
M. Michelini, S. Hijazi, C.R. Nassar, Z. Wu; "Spectral sharing across 2G-3G systems"; Signals, Systems and Computers, 2003. Conference Record of the Thirty-Seventh Asilomar Conference on vol. 1.
C.R. Nassar, F. Zhu, Z. Wu; "Direct Sequence Spreading UWB Systems: Frequency Domain Processing for Enhanced Performance and Throughput"; Communications, 2003. ICC '03. IEEE International Conference on vol. 3.
K. Chen, B. Natarajan, S. Shattil, "Secret Key Generation Rate With Power Allocation in Relay-Based LTE-A Networks," in IEEE Transactions on Information Forensics and Security, vol. 10, No. 11, pp. 2424-2434, Nov. 2015.

Yuanwei Liu et al., 'Non-Orthogonal Multiple Access for 5G and Beyond', arXiv:1808.00277, Aug. 1, 2018 [retrieved on Aug. 21, 2020]. Retrieved from <URL: https://arxiv.org/abs/1808.00277>. pp. 1-54.
Z. Wang, et al.; "Wireless multicarrier communications"; IEEE Signal Processing Magazine ( vol. 17, Issue: 3, May 2000).
B. Weinstein, P. Ebert; "Data Transmission by Frequency-Division Multiplexing Using the Discrete Fourier Transform"; IEEE Transactions on Communications; Oct. 1971.
A. Czylwik. "Comparison Between Adaptive OFDM and Single Carrier Modulation with Frequency Domain Equalization"; 1997 IEEE 47th Vehicular Technology Conference. Technology in Motion; May 4-7, 1997.
Intel Corporation; "Numerology for New Radio Interface" (R1-162386); 3GPP TSG RAN WG1 Meeting #84bis; Busan, Korea Apr. 11-15, 2016.
Qualcomm Incorporated; "Numerology requirements" (R1-162204); 3GPP TSG RAN WG1 Meeting #84bis; Busan, Korea, Apr. 11-15, 2016.
J. Zyren; "Overview of the 3GPP Long Term Evolution Physical Layer"; Document No. 3GPPEVOLUTIONWP; Jul. 2007. https://pdf4pro.com/view/overview-of-the-3gpp-long-term-evolution-physical-layer-7a50af.html.
Ixia; "SC-FDMA Single Carrier FDMA in LTE"; 915-2725-01 Rev A Nov. 2009. https://support.ixiacom.com/sites/default/files/resources/whitepaper/sc-fdma-indd.pdf.
Telesystem Innovations; "LTE in a Nutshell: The Physical Layer"; 2010. https://pdf4pro.com/view/lte-in-a-nutshell-mywww-zhaw-4c4210.html.
ETSI TS 136 211 V8.7.0 (Jun. 2009); "Evolved Universal Terrestrial Radio Access (E-UTRA); Physical Channels and Modulation" (3GPP Ts 36.211 version 8.7.0 Release 8).
ETSI TS 138 211 V15.2.0 (Jul. 2018); "5G; NR; Physical channels and modulation"; (3GPP TS 38.211 version 15.2.0 Release 15).
ETSI TS 136 211 V15.2.0 (Oct. 2018); "LTE; Evolved Universal Terrestrial Radio Access (E-UTRA); Physical Channels and Modulation" (3GPP TS 36.211 version 15.2.0 Release 15).
ShareTechnote; "5G/NR—PHY Candidate"; https://www.sharetechnote.com/html/5G/5G_Phy_Candidate_DFTsOFDM.html.
EventHelix; "5G physical layer specifications"; Dec. 25, 2017; https://medium.com/5g-nr/5g-physical-layer-specifications-e025f8654981.
ETSI TR 121 905 V8.6.0 (Oct. 2008); "Digital cellular telecommunications system (Phase 2+); Universal Mobile Telecommunications System (UMTS); Vocabulary for 3GPP Specifications"; (3GPP TR 21.905 version 8.6.0 Release 8).
ETSI TS 136 211 V8.4.0 (Nov. 2008); "LTE; Evolved Universal Terrestrial Radio Access (E-UTRA); Physical channels and modulation"; (3GPP TS 36.211 version 8.4.0 Release 8).
D.A. Wiegandt, C.R. Nassar; "Higher-Speed, Higher-Performance 802.11a Wireless LAN via Carrier-Interferometry Orthogonal Frequency Division Multiplexing"; 2002 IEEE International Conference on Communications. Conference Proceedings. ICC 2002 (Cat. No. 02CH37333). Apr. 28-May 2, 2002.
Z. Wu, et al.; "High-Performance 64-QAM OFDM via Carrier Interferometry Spreading Codes"; 2003 IEEE 58th Vehicular Technology Conference. VTC 2003-Fall (IEEE Cat. No. 03CH37484). Oct. 6-9, 2003.
B.Natarajan, C.R. Nassar and S.Shattil; "High-Throughput High-Performance TDMA Through Pseudo-Orthogonal Carrier Interferometry Pulse Shaping"; IEEE Transactions on Wireless Communications, vol. 3, No. 3, May 2004.
B.Natarajan, C.R. Nassar; "Introducing Novel FDD and FDM in MC-CDMA to Enhance Performance"; RAWCON 2000. 2000 IEEE Radio and Wireless Conference (Cat. No. 00EX404). Sep. 13-13, 2000.
B.Natarajan, Z Wu, C.R. Nassar and S.Shattil; "Large Set of CI Spreading Codes for High-Capacity MC-CDMA"; IEEE Transactions on Communications, vol. 52, No. 11, Nov. 2004.
B.Natarajan, C.R. Nassar, Z Wu; "Multi-carrier platform for wireless communications. Part 1: High-performance, high-throughput TDMA and DS-CDMA via multi-carrier implementations"; Wire-

(56) References Cited

OTHER PUBLICATIONS less Communications and Mobile Computing; Wirel. Commun. Mob. Comput. 2002; 2:357-379 (DOI: 10.1002/wcm.51) Jun. 18, 2002.

S.A. Zekavat, C.R. Nassar and S.Shattil; "Merging Multicarrier CDMA and Oscillating-Beam Smart Antenna Arrays: Exploiting Directionality, Transmit Diversity, and Frequency Diversity"; IEEE Transactions on Communications, vol. 52, No. 1, pp. 110-119, Jan. 2004.

C.R. Nassar, B.Natarajan, Z. Wu, D. Wiegandt, and S. Shattil; Multi-Carrier Technologies for Wireless Communication; Kluwer Academic Publishers 2002.

B.Natarajan, C.R. Nassar, S. Shattil; "Novel Multi-Carrier Implementation of FSK for Bandwidth Efficient, High Performance Wireless Systems"; 2002 IEEE International Conference on Communications. Conference Proceedings. ICC 2002 (Cat. No. 02CH37333) Apr. 28-May 2, 2002.

D.A. Wiegandt, C.R. Nassar, Z. Wu; "Overcoming Peak-to-Average Power Ratio Issues in OFDM via Carrier-Interferometry Codes"; IEEE 54th Vehicular Technology Conference. VTC Fall 2001. Proceedings (Cat. No. 01CH37211), Oct. 7-11, 2001.

D.A. Wiegandt, C.R. Nassar; "Peak-to-Average Power Reduction in High-Performance, High-Throughput OFDM via Pseudo-Orthogonal Carrier-Interferometry Coding"; PACRIM. 2001 IEEE Pacific Rim Conference on, vol. 2, Feb. 2001.

X. Lin, et al.; "5G New Radio: Unveiling the Essentials of the Next Generation Wireless Access Technology"; IEEE Communications Standards Magazine ( vol. 3 , Issue: 3, Sep. 2019 ) pp. 30-37. Dec. 6, 2019.

"D2.2 Architecture, system and interface definitions of a 5G for Remote Area network"; Project website: http://5g-range.eu; Version 1 date Apr. 26, 2018.

R. Rani, et al.; "Peak-to-Average Power Ratio Analysis of SCFDMA Signal by Hybrid Technique"; International Journal of Computer Applications (0975-8887) vol. 69—No. 15, May 2013.

H. Kim, et al.; "Multiple Access for 5G New Radio: Categorization, Evaluation, and Challenges"; arXiv:1703.09042 [cs.IT], Mar. 27, 2017.

A. Anand, et al.; "Joint Scheduling of URLLC and eMBB Traffic in 5G Wireless Networks"; IEEE Infocom 2018—IEEE Conference on Computer Communications; Apr. 16-19, 2018.

M. Bennis, et al.; "Ultra-Reliable and Low-Latency Wireless Communication: Tail, Risk and Scale"; Proceedings of the IEEE ( vol. 106 , Issue: 10 , Oct. 2018 ).

B.G. Agee; "Efficient Allocation of RF Transceiver Resources in Spatially Adaptable Communication Networks"; SDR Forum/ MPRG Workshop on Advanced in Smart Antennas for Software Radios, At Virginia Polytechnic Institute, Blacksburg, VA.

C.A. Azurdia-Meza, et al.; "PAPR reduction in SC-FDMA by pulse shaping using parametric linear combination pulses"; IEEE Communications Letters, vol. 16, No. 12, Dec. 2012.

C.A. Azurdia-Meza, et al.; "PAPR Reduction in Single Carrier FDMA Uplink by Pulse Shaping Using a ß-α Filter"; Wireless Pers Commun 71, 23-44 (2013). https://doi.org/10.1007/s11277-012-0794-0; Aug. 9, 2012.

A Hamed, et al.; "Bandwidth and Power efficiency analysis of fading communication link"; 2016 International Symposium on Performance Evaluation of Computer and Telecommunication Systems (SPECTS); Jul. 24-27, 2016.

Y. Akhtman, L Hanzo; "Power Versus Bandwidth Efficiency in Wireless Communications: from Economic Sustainability to Green Radio"; China Communications 7(2) • Apr. 2010.

L. Militano, et al.; "Device-to-Device Communications for 5G Internet of Things"; EAI Endorsed Transactions on Internet of Things; Ghent vol. 1, Iss. 1, (Oct. 2015).

M. Vergara, et al.; "Multicarrier Chip Pulse Shape Design With Low Papr"; 21st European Signal Processing Conference (EUSIPCO 2013); Sep. 9-13, 2013.

C. Liu, et al.; "Experimental demonstration of high spectral efficient 4×4 MIMO SCMA-OFDM/OQAM radio over multi-core fiber system"; Optics Express 18431, vol. 25, No. 15 | Jul. 24, 2017.

F. Wei, et al.; "Message-Passing Receiver Design for Joint Channel Estimation and Data Decoding in Uplink Grant-Free SCMA Systems"; IEEE Transactions on Communications, vol. 18 , Issue: 1 , Jan. 2019: Nov. 6, 2018.

H. Jiang, et al.; "Distributed Layered Grant-Free Non-Orthogonal Multiple Access for Massive MTC"; 2018 IEEE 29th Annual International Symposium on Personal, Indoor and Mobile Radio Communications (PIMRC); Sep. 9-12, 2018.

S. Sengar, P.B. Bhattacharya; "Performance Improvement in OFDM System by PAPR Reduction Using Pulse Shaping Technique"; International Journal of Emerging Technology and Advanced Engineering, vol. 2, Issue 12, Dec. 2012.

B.H. Alhassoun; "Peak-to-Average-Power-Ratio (PAPR) Reduction Techniques for Orthogonal-Frequency-Division-Multiplexing (OFDM) Transmission"; Thesis, University of Denver, Jun. 1, 2012.

A. Boonkajay, et al.; "Performance Evaluation of Low-PAPR Transmit Filter for Single-Carrier Transmission"; 2012 18th Asia-Pacific Conference on Communications (APCC); Oct. 15-17, 2012.

D. Das; "Peak to Average Power Ratio Reduction in OFDM Using Pulse Shaping Technique"; Computer Engineering and Applications vol. 5, No. 2, ISSN: 2252-5459 (Online) Jun. 2016.

D. Wulich, et al.; "Peak to Average Power Ratio in Digital Communications"; https://www.academia.edu/6222108/Peak_to_Average_Power_Ratio_in_Digital_Communications 2005.

S. Singh, et al.; "Analysis of Roll-Off-Factor to Reduce the Papr in SC-FDMA System"; International Journal of Computational Intelligence Techniques, ISSN: 0976-0466 & E-ISSN: 0976-0474, vol. 3, Issue 2, 2012, pp. 76-78.

M. Mahlouji, T. Mahmoodi; "Analysis of Uplink Scheduling for Haptic Communications"; arXiv:1809.09837 [cs.NI], Sep. 26, 2018.

K. Au, et al.; "Uplink Contention Based SCMA for 5G Radio Access"; 2014 IEEE Globecom Workshops (GC Wkshps), Dec. 8-12, 2014.

S. Shah, A.R. Patel; "LTE—Single Carrier Frequency Division Multiple Access"; Jan. 1, 2010.

S.L. Ariyavisitakul, et al.; "Frequency Domain Equalization for Single-Carrier Broadband Wireless Systems"; IEEE Communications Magazine ( vol. 40 , Issue: 4 , Apr. 2002 ); pp. 58-66, Aug. 7, 2002.

A. Agarwal and P. R. Kumar, "Improved capacity bounds for wireless networks." Wireless Communications and Mobile Computing, vol. 4, pp. 251-261, 2004.

J.F. Cardoso, A. Souloumiac, "Blind Beamforming for non-Gaussian Signals," IEEE—Proceedings—F, vol. 140, No. 6, pp. 362-370, Dec. 1993.

D. Galda; H. Rohling, "A low complexity transmitter structure for OFDM-FDMA uplink systems", IEEE 55th Vehicular Technology Conference. VTC Spring 2002, May 6-9, 2002.

P. Gupta and P. R. Kumar, "The Capacity of Wireless Networks," IEEE Trans. Info. Theory, vol. IT-46, No. 2, Mar. 2000, pp. 388-404.

T. Kailath, Linear Systems, Prentice-Hall, Inc., 1980.

T. May; H. Rohling, "Reducing the peak-to-average power ratio in OFDM radio transmission systems", VTC '98. 48th IEEE Vehicular Technology Conference. May 21-21, 1998.

J.D. Schaffer, "Multiple objective optimization with vector evaluated genetic algorithms," Proceedings of 1st International Conference on Genetic Algorithms, 1991, pp. 93-100.

Z. Wu, C.R. Nassar, "Combined Directionality and Transmit Diversity via Smart Antenna Spatial Sweeping," RAWCON 2000, IEEE Radio and Wireless Conference 2000, p. 103-106. Sep. 13, 2000.

S.A. Zekavat; C.R. Nassar; S. Shattil, "Combining multi-input single-output systems and multi-carrier systems: achieving transmit diversity, frequency diversity and directionality", Vehicular Technology Conference. IEEE 55th Vehicular Technology Conference. VTC Spring 2002, May 6-9, 2002.

S.A. Zekavat, C. R. Nassar and S. Shattil, "Smart antenna spatial sweeping for combined directionality and transmit diversity," Journal of Communications and Networks (JCN), Special Issue on Adaptive Antennas for Wireless Communications, vol. 2, No. 4, pp. 325-330, Dec. 2000.

(56) References Cited

OTHER PUBLICATIONS

E. Zitzler and L. Thiele, "Multiobjective evolutionary algorithms: A comparative case study and the strength pareto approach," IEEE Tran. on Evol. Comput., vol. 3, No. 4, Nov. 1999, pp. 257-271.
D. Gerakoulis and E. Geraniotis, CDMA: Access and Switching for Terrestrial and Satellite Networks, John Wiley & Sons, Ltd, 2001.
ITU-T, Asymmetric Digital Subscriber Line (ADSL) Transceivers, G.992.1, Jun. 1999.
H. Prakash, C.D.Suriyakala; "PAPR Reduction in MIMO SC-FDMA—A Survey"; Int. J Rec. Adv. Sci. Tech., 2015; 2(2):11-19.
E. Hajlaoui, M. Abdellaoui; "SOCP Approach for Reducing PAPR for MIMO-OFDM via Tone Reservation"; International Journal of Distributed and Parallel Systems (IJDPS) vol. 2, No. 3, May 2011.
J. Shin, B. Seo; "PAPR Reduction Scheme for MISO and MIMO OFDM Systems with Limited Feedback"; WSEAS Transactions on Communications 13:355-362 • Jan. 2014.
D. Sinanovic, et al.; "Low PAPR Spatial Modulation for SC-FDMA"; IEEE Transactions on Vehicular Technology; vol. 66, Issue: 1, Jan. 2017.
G.H. Karande, et al.; "Peak-to-Average Power Reduction in MIMO-OFDM Systems using SLM technique"; IPASJ International Journal of Electronics & Communication (IIJEC); vol. 2, Issue 8, Aug. 2014.
M. Lieberei, U. Zolzer; "Time Domain PAPR Reduction in MIMO-OFDM Spatial Multiplexing Systems"; in Proceedings of the 14th International OFDM-Workshop (InOWo'09), S. 218-222, 2009.
M. Vu, A. Paulraj; "MIMO Wireless Linear Precoding"; IEEE Signal Processing Magazine. Submitted Feb. 2006, revised Nov. 2006 and Dec. 2006.
H.G. Myung, et al.; "Peak Power Characteristics of Single Carrier FDMA MIMO Precoding System"; 2007 IEEE 66th Vehicular Technology Conference, Sep. 30-Oct. 3, 2007.
B. Naik, et al.; "Reduction of PAPR in MIMO-OFDM/A System Using Polyphase Complementary Modulation"; International Journal of Innovative Research in Computer and Communication Engineering; vol. 2, Issue 5, May 2014.
A.S. Parihar, A. Rai; "A Review: PAPR Reduction Techniques in MIMO OFDM System"; International Journal of Engineering and Innovative Technology (IJEIT); vol. 4, Issue 12, Jun. 2015.
B. Rihawi, Y.Louet; "PAPR Reduction Scheme with SOCP for MIMO-OFDM Systems"; I. J. Communications, Network and System Sciences. 2008; 1: 1-103; Published Online Feb. 2008 in SciRes (http://www.SRPublishing.org/journal/ijcns/).
C.A. Devlin, et al.; "Peak to Average Power Ratio Reduction Technique for OFDM Using Pilot Tones and Unused Carriers"; 2008 IEEE Radio and Wireless Symposium; Year: 2008; pp. 33-36.
K Mhatre, U.P. Khot; "Efficient Selective Mapping PAPR Reduction Technique"; International Conference on Advanced Computing Technologies and Applications (ICACTA—2015); Procedia Computer Science 45 ( 2015 ) 620-627.
K. Srinivasarao, et al.; "Peak-to-Average Power Reduction in MIMO-OFDM Systems Using Sub-Optimal Algorithm"; International Journal of Distributed and Parallel Systems (IJDPS) vol. 3, No. 3, May 2012.
K. Xu, et al.; "Beamforming MISO-OFDM PAPR Reduction: A Space-User Perspective"; 2007 IEEE International Conference on Acoustics, Speech and Signal Processing—ICASSP '07, Apr. 15-20, 2007.
H. Zhang, D.L. Goeckel; "Peak Power Reduction in Closed-Loop MIMO-OFDM Systems via Mode Reservation"; IEEE Communications Letters, vol. 11, No. 7, Jul. 2007.
C.L. Wang, Y. Ouyang; "Low-Complexity Selected Mapping Schemes for Peak-to-Average Power Ratio Reduction in OFDM Systems"; IEEE Transactions on Signal Processing, vol. 53, No. 12, Dec. 2005.
P. Sindhu, G. Krishnareddy; "Peak and Average Power Reduction in OFDM System with Trellis Shaping Method"; International Journal of Advanced Research in Electrical, Electronics and Instrumentation Engineering; vol. 6, Issue 7, Jul. 2017.

H-B Jeon, et al.; "Bit-Based SLM Schemes for PAPR Reduction in QAM Modulated OFDM Signals"; IEEE Transactions on Broadcasting, vol. 55, No. 3, Sep. 2009.
H-B Jeon, et al.; "A Low-Complexity SLM Scheme Using Additive Mapping Sequences for PAPR Reduction of OFDM Signals"; IEEE Transactions on Broadcasting, vol. 57, No. 4, Dec. 2011.
S-J Heo, et al.; "A Modified SLM Scheme With Low Complexity for PAPR Reduction of OFDM Systems"; IEEE Transactions on Broadcasting, vol. 53, No. 4, Dec. 2007.
M.I. Abdullah, et al.; "Comparative Study of PAPR Reduction Techniques in OFDM"; ARPN Journal of Systems and Software; vol. 1, No. 8, Nov. 2011.
E. Abdullah, et al.; "Modified selective mapping scheme with low complexity for minimizing high peak average power ratio in orthogonal frequency division multiplexing system"; AIP Conference Proceedings 1774, 050005 (2016).
S.T. O'Hara, J.R. Periard; "Orthogonal-Coded Selective Mapping (OCSM) for OFDM Peakto-Average Power Reduction Without Side Information"; Proceeding of the SDR 04 Technical Conference and Product Exposition 2004, Syracuse, NY, Technology Center—Syracuse Research Corporation. 2004.
P. Sharma, S. Verma; "PAPR Reduction of OFDM Signals Using Selective Mapping With Turbo Codes"; International Journal of Wireless & Mobile Networks (IJWMN) vol. 3, No. 4, Aug. 2011.
D. Wiegandt et al., "Overcoming peak-to-average power ratio issues in OFDM via carrier-interferometry codes", VTC 2001 Fall. IEEE VTS 54th Vehicular Technology Conference, 2001, vol. 2, pp. 660-663, Oct. 7-11, 2001.
B. Natarajan, et al. "Crest factor considerations in MC-CDMA with carrier interferometry codes", PACRIM. 2001 IEEE Communications Pacific Rim Conference on Computers and signal Processing, 2001, vol. 2, pp. 445-448 Aug. 26-28, 2001.
C.R. Nassar et al., "High-Performance Broadband DS-CDMA via Carrier Interferometry Chip Shaping," 2000 Int'l Symposium on Advanced Radio Technologies, Boulder, CO, Sep. 6-8, 2000.
C.R. Nassar, B. Natarajan, S. Shattil, "Introduction of carrier interference to spread spectrum multiple access," Wireless Communications and Systems, 1999 Emerging Technologies Symposium Apr. 12-13, 1999 pp. 4.1-4.5.
B. Natarajan, C.R. Nassar, S. Shattil, M. Michelini, and Z. Wu; "High-Performance MC-CDMA via Carrier Interferometry Codes," Vehicular Technology, IEEE Transactions on; vol. 50, Issue 6, Nov. 2001, pp. 1344-1353.
Z. Wu, B. Natarajan, C.R. Nassar, S. Shattil; "High-performance, high-capacity MC-CDMA via carrier interferometry," Personal, Indoor and Mobile Radio Communications, 2001 12th IEEE International Symposium on; vol. 2, Sep. 30-Oct. 3, 2001 pp. G-11-G-16.
S.A. Zekavat, C.R. Nassar, S. Shattil; "The merger of a single oscillating-beam smart antenna and MC-CDMA: transmit diversity, frequency diversity and directionality," Broadband Communications for the Internet Era Symposium digest, 2001 IEEE Emerging Technologies Symposium on Sep. 10-11, 2001 pp. 107-112.
B. Natarajan, C.R. Nassar, S. Shattil; "Enhanced Bluetooth and IEEE 802.11 (FH) via multi-carrier implementation of the physical layer," Broadband Communications for the Internet Era Symposium digest, 2001 IEEE Emerging Technologies Symposium on; Sep. 10-11, 2001 pp. 129-133.
Z. Wu; C.R. Nassar, S. Shattil; "Ultra wideband DS-CDMA via innovations in chip shaping," Vehicular Technology Conference, 2001. VTC 2001 Fall. IEEE VTS 54th; vol. 4, Oct. 7-11, 2001 pp. 2470-2474.
B. Natarajan, C.R. Nassar, S. Shattil; "Innovative pulse shaping for high-performance wireless TDMA," Communications Letters, IEEE vol. 5, Issue 9, Sep. 2001 pp. 372-374.
B.Natarajan, C.R. Nassar and S.Shattil; "Throughput Enhancement in TDMA through Carrier Interference Pulse Shaping," IEEE Vehicular technology Conference Proceedings, vol. 4, Fall 2000, Boston, Sep. 24-28, 2000, pp. 1799-1803.
V.Thippavajula, B. Natarajan; "Parallel Interference Cancellation Techniques for Synchronous Carrier Interferometry/MC-CDMA Uplink"; IEEE 60th Vehicular Technology Conference, 2004. VTC2004—Fall. Sep. 26-29, 2004.

(56) References Cited

OTHER PUBLICATIONS

A. Serener, et al.; "Performance of Spread OFDM with LDPC Coding in Outdoor Environments"; 2003 IEEE 58th Vehicular Technology Conference. VTC 2003—Fall (IEEE Cat. No. 03CH37484), Oct. 6-9, 2003.

LTE: Evolved Universal Terrestrial Radio Access (E-UTRA); Multiplexing and channel coding (3GPP TS 36.212 version 8.8.0 Release 8), Jan. 2010.

LTE: Evolved Universal Terrestrial Radio Access (E-UTRA); Physical channels and modulation (3GPP TS 36.211 version 8.7.0 Release 8), Jun. 2009.

B.Natarajan, C.R. Nassar and S.Shattil; "CI/FSK: Bandwidth-Efficient Multicarrier FSK for High Performance, High Throughput, and Enhanced Applicability"; IEEE Transactions On Communications, vol. 52, No. 3, Mar. 2004.

G. Wunder, K.G. Paterson; "Crest-Factor Analysis of Carrier Interferometry MC-CDMA and OFDM systems"; International Symposium onInformation Theory, 2004. ISIT 2004. Proceedings. Jun. 27-Jul. 2, 2004.

B.Natarajan, C.R. Nassar "Crest Factor Reduction in MC-CDMA Employing Carrier Interferometry Codes"; EURSAP Journal on Wireless Comm. and Networking 2004:2, 374-379.

A.J. Best, B. Natarajan; "The Effect of Jamming on the Performance of Carrier Interferometry/OFDM"; WiMob'2005), IEEE International Conference on Wireless And Mobile Computing, Networking And Communications, 2005. Aug. 24-22, 2005.

S. Hijazi, et al.; "Enabling FCC's Proposed Spectral Policy via Carrier Interferometry"; 2004 IEEE Wireless Communications and Networking Conference (IEEE Cat. No. 04TH8733). Mar. 21-25, 2004.

Z. Wu, et al.; "FD-MC-CDMA: A Frequency-based Multiple Access Architecture for High Performance Wireless Communication"; Proceedings RAWCON 2001. 2001 IEEE Radio and Wireless Conference (Cat.No. 01EX514). Aug. 19-22, 2001.

P. Barbosa, et al.; "High-Performance MIMO-OFDM via Carrier Interferometry"; GLOBECOM '03. IEEE Global Telecommunications Conference (IEEE Cat. No. 03CH37489). Dec. 1-5, 2003.

D.A. Wiegandt, C.R. Nassar; "High-Throughput, High-Performance OFDM via Pseudo-Orthogonal Carrier Interferometry"; 12th IEEE International Symposium on Personal, Indoor and Mobile Radio Communications. PIMRC 2001. Proceedings (Cat. No. 01TH8598) Oct. 3-Sep. 30, 2001.

D.A. Wiegandt, C.R. Nassar; "High-Throughput, High-Performance OFDM via Pseudo-Orthogonal Carrier Interferometry Type 2"; The 5th International Symposium on Wireless Personal Multimedia Communications. Oct. 27-30, 2002.

D.A. Wiegandt, C.R. Nassar; "High-Throughput, High-Performance OFDM via Pseudo-Orthogonal Carrier Interferometry Spreading Codes"; IEEE Transactions on Communications, vol. 51, No. 7, pp. 1123-1134. Jul. 2003.

\* cited by examiner

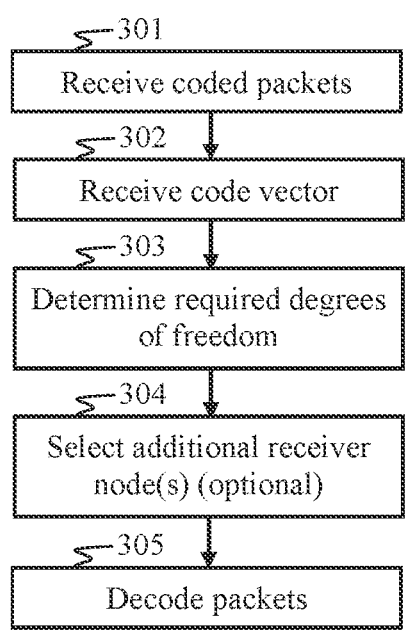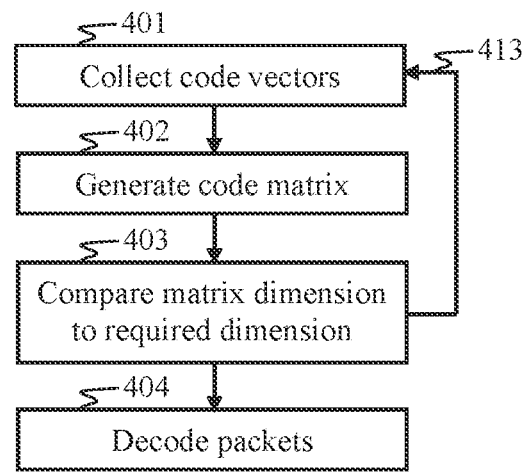
FIGURE 3                    FIGURE 4

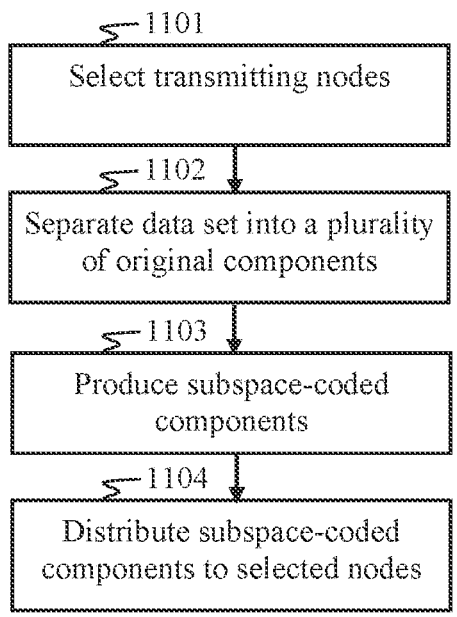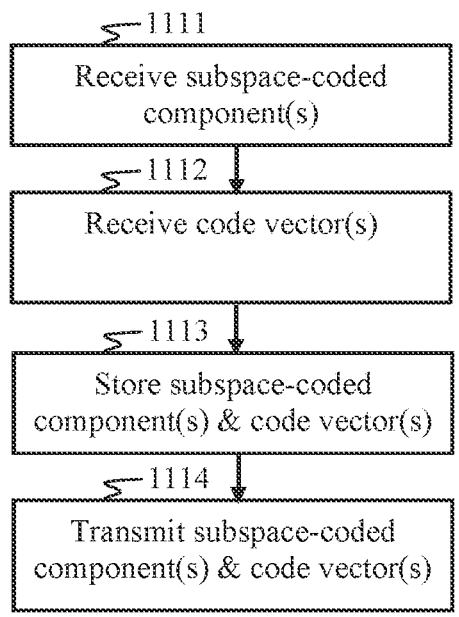
FIGURE 11A
FIGURE 11B
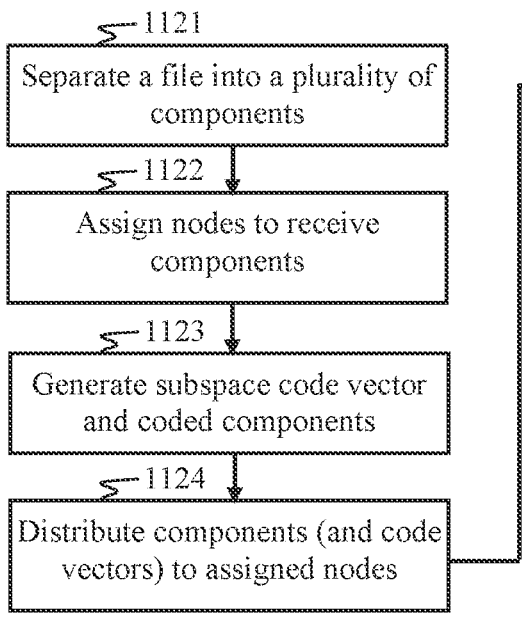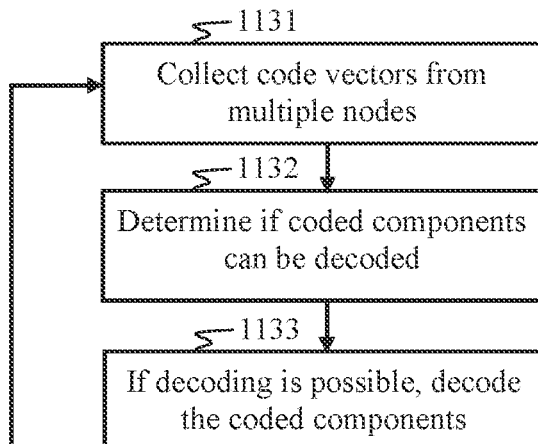
FIGURE 11C

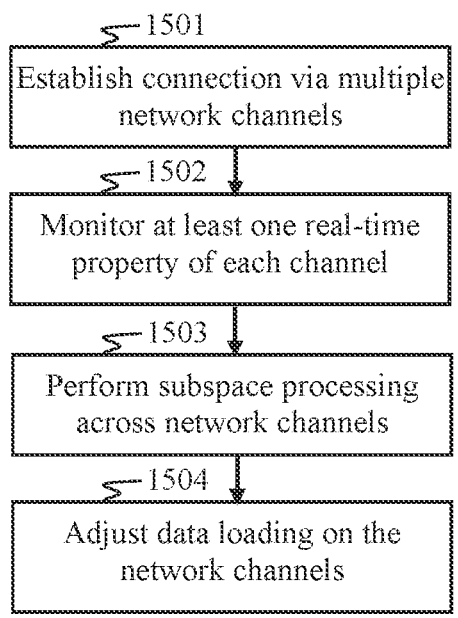
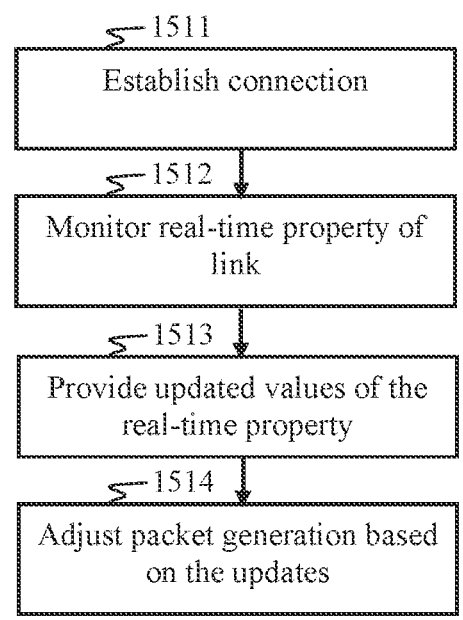
FIGURE 15A
FIGURE 15B

LINEAR NETWORK CODING IN COMMUNICATION NETWORKS

CROSS-REFERENCE TO PRIOR APPLICATIONS

This application is a Continuation of U.S. patent application Ser. No. 17/873,111, filed on Jul. 25, 2022; which is a Continuation of U.S. patent application Ser. No. 16/779,654, filed Feb. 2, 2020; which is a Continuation of U.S. patent application Ser. No. 15/810,828, filed Nov. 13, 2017, now U.S. Pat. No. 10,587,369; which is a Continuation of U.S. patent application Ser. No. 14/168,466, filed Jan. 30, 2014, now U.S. Pat. No. 9,819,449; all of which are hereby incorporated by reference in their entireties and all of which this application claims priority under at least 35 U.S.C. 120 and/or any other applicable provision in Title 35 of the United States Code.

BACKGROUND

1. Field of the Invention

Subject matter disclosed herein relates generally to data communications, and in some aspects, to techniques, systems, and protocols for use in employing cooperative subspace processing when transferring data between locations.

2. Introduction

Limited storage of mobile devices is driving cloud services in which data and software are stored on the network. However, in wireless networks, limited wireless bandwidth, variable reliability of the communication channels, and mobility of the client devices discourages off-site data storage and produces significant challenges to media distribution.

Wireless communication devices (e.g., smart phones and other handheld communicators, tablet computers with communication functionality, etc.) often possess multiple network interfaces for use with different network technologies having different connectivity characteristics. The different network technologies may each have, for example, different delay, throughput, and reliability characteristics. A mobile device that is connected to a remote source node through both a cellular network (i.e., a wireless wide area network (WWAN)) and an IEEE 802.11 wireless local area network (i.e., a WLAN) may, for example, observe different usage costs and quality of service through each interface. It would be desirable to be able to utilize multiple available network resources to carry out a data transfer operation for a communication device to, for example, increase throughput, decrease data transit time, and/or make efficient use of available resources. It would also be desirable if this could be done in a reliable and efficient manner that takes advantage of already existing communication techniques and protocols.

Accordingly, content delivery mechanisms need to adapt to highly variable network topologies and operating conditions in order to provide reliable media and data services. These and other needs in the field may be addressed by aspects of the present invention.

SUMMARY

Techniques, devices, systems, and protocols are described herein that support efficient and reliable data transfer between communication nodes via multiple different paths, such as subchannels, channels, and network channels involving different network technologies. In aspects of the disclosure, subspace coding generates linear combinations of original data sets for multiplexing the original data sets into subspace-coded data sets, which are transmitted over the multiple paths. Subspace decoding is provided for demultiplexing received subspace-coded data sets. In some aspects, multiple transmitting nodes are configured to cooperatively perform subspace coding to build the dimension spanned by the subspace of the transmitted signals. In some aspects, multiple receiving nodes are configured to cooperatively perform subspace decoding, such as to build the dimension of the subspace spanned by the received signals.

The solution set to any homogeneous system of linear equations with n variables is a subspace in the coordinate space $K^n$, wherein the coordinate space $K^n$ is the prototypical example of an n-dimensional vector space over a field K. Every subspace of $K^n$ can be described as the null space of some matrix. For example, in a finite-dimensional space, a homogeneous system of linear equations can be written as a single matrix equation: $Ax=0$, wherein the set of solutions to this equation is the null space of the matrix A. Given a set of n independent functions, the dimension of the subspace in $K^k$ will be the dimension of the null set of A, the composite matrix of the n functions.

In accordance with one aspect of the concepts, systems, circuits, and techniques described herein, a machine implemented method for use in transferring data from a source node to a destination node comprises selecting a plurality of original packets to transfer to a destination node; selecting a plurality of transmitting nodes to perform cooperative encoding; cooperatively encoding the original packets for generating a plurality of coded packets and a corresponding code matrix of coefficients, the coded packets and the corresponding code matrix comprising a plurality of independent equations having a plurality of independent variables in a system of linear equations, wherein the independent variables comprise the original packets; and transmitting the plurality of coded packets and corresponding code matrix to a destination node.

In one aspect of the disclosure, the code matrix comprises a matrix of random coefficients. For example, the coded packets may comprise random linear combinations of the original packets. The coefficients may comprise scalar and/or complex coefficients. Coding may employ sliding window and/or block codes. In another aspect of the disclosure, the code matrix is an invertible transform matrix, such as a block transform or a sliding window transform. For example, CI codes may be employed.

Aspects of the disclosure describe methods for ensuring that the number of independent equations is sufficient for enabling the destination node to decode the plurality of independent variables. Methods are also disclosed for ensuring the corresponding code matrix is well-conditioned.

In accordance with some aspects of the disclosure, coding is provided to the coded packets and corresponding code vectors of the code matrix at intermediate nodes, such as by applying linear coding to the coded packets and the code vectors.

In accordance with another aspect of the concepts, systems, circuits, and techniques described herein, a machine implemented method for use in processing coded packets received from a source node comprises: selecting a plurality of receiving nodes for cooperatively receiving a transmission from the source node, the plurality of receiving nodes being selected to provide a sufficient number of independent equations for decoding a plurality of original packets encoded in the transmission; collecting a plurality of coded packets and a corresponding code matrix from the receiving nodes; and decoding the packets, wherein decoding comprises calculating a solution for a system of linear equations comprising the independent equations having a plurality of independent variables, the independent equations comprising the plurality of coded packets and the corresponding code matrix, and the plurality of independent variables comprising the plurality of original packets.

In one aspect of the disclosure, the coded packets are encoded by the source node. In another aspect, encoding is provided by transmitting signals in a multipath channel. In a wireless channel, selecting the transmitting and/or receiving nodes may comprise any adaptive array processing techniques. In some aspects, it is disclosed how selecting the nodes can build the rank of the code matrix and/or improve the conditioning of the code matrix. For example, as the destination node collects code vectors, it may build up the dimension of the subspace spanned by the received code vectors.

In one aspect of the disclosure, the solution can be calculated when the number of degrees of freedom received at least equals the number of original packets. In another aspect of the disclosure, the solution may be calculated when the number of degrees of freedom received is less than the number of original packets, such as when a CI code matrix is employed for coding. In accordance with certain aspects, a destination node determines whether coded packets are linearly independent, such as by performing a row-reduction operation (or other algorithms for solving systems of linear equations) on the code matrix.

In accordance with another aspect of the concepts, systems, circuits, and techniques described herein, a machine implemented method for use in transferring data from a source node to a destination node comprises: selecting a plurality of original packets to transfer to the destination node; selecting a plurality of transmitting nodes to cooperatively encode the original packets for generating a plurality of coded packets and a corresponding code matrix; and providing for transmitting from each of the transmitting nodes a subset of the plurality of coded packets and corresponding code matrix, wherein at least one of the transmitting nodes has a rank that is insufficient for decoding the plurality of coded packets.

In some aspects of the disclosure, cooperative encoding is configured to ensure that the code matrix has sufficient rank and is sufficiently well-conditioned to enable the destination node to decode the coded packets. In some aspects, at least one intermediate node provides additional encoding to the plurality of coded packets and corresponding code matrix. For example, additional subspace coding may be provided to the coded packets and the code vector at each intermediate node by applying linear coding to the coded packets and the code vector.

In some aspects of the disclosure, the transmitting nodes may retransmit coded packets, such as when an acknowledgement has not been received from the destination node after a predetermined amount of time. In some aspects, new linear combinations of the original packets are transmitted, such as when retransmission occurs after a delay that at least equals the coherence time of the channel.

In accordance with another aspect of the concepts, systems, circuits, and techniques described herein, a machine implemented method for use in processing coded packets received from a source node comprises: selecting a plurality of receiving nodes to cooperatively receive a plurality of linearly coded packets and a plurality of corresponding code vectors, wherein the rank of at least one of the receiving nodes is insufficient for decoding the coded packets; building up a dimension of a subspace spanned by code vectors received at the destination node by collecting the coded packets and the corresponding code vectors from the plurality of receiving nodes; and decoding the coded packets.

In one aspect of the disclosure, when the receiving nodes transmit their received signals to the destination node, they provide additional linear encoding to the coded packets and the corresponding code vectors. In some aspects, the destination node (and/or the receiving nodes) transmit an acknowledgement to the source node upon at least one of receiving a coded packet and decoding an original packet. In some aspects, building up the dimension of the subspace spanned by the code vectors may further comprise collecting at least one additional coded packet and corresponding code vector transmitted by the source node during a later time interval.

In accordance with some aspects of the disclosure, the plurality of receiving nodes is configured to cooperatively receive the linearly coded packets and corresponding code vectors transmitted over a plurality of different network channels. The different network channels may comprise different multiple-access channels on the same network and/or channels on different networks. The destination node and/or the receiving nodes may employ different network technologies.

In accordance with another aspect of the concepts, systems, circuits, and techniques described herein, a machine implemented method for use in processing coded packets received from a source node comprises: determining a required number of degrees of freedom for decoding a plurality of linearly coded packets received from a source node; based on the required number of degrees of freedom, selecting at least one additional receiving node for cooperatively receiving at least one coded packet and associated code vector; collecting a plurality of coded packets and associated code vectors from a plurality of cooperating receiving nodes, including the at least one additional receiving node; and decoding the plurality of coded packets.

In some aspects of the disclosure, determining the required number of degrees of freedom comprises counting the number of collected code vectors, determining the number of collected linearly independent code vectors, and/or determining the rank of a matrix comprising the collected code vectors. Selecting additional receiving nodes and collecting coded packets and/or associated code vectors therefrom may be performed until the number of received linearly independent coded packets is at least equal to the required number of degrees of freedom. In some aspects, decoding comprises arranging the associated code vectors in a matrix, and then performing at least one matrix operation on the plurality of coded packets.

In accordance with another aspect of the concepts, systems, circuits, and techniques described herein, a machine implemented method for transmitting a file between a server and a client comprises: generating a plurality of linearly coded packets from a plurality of original packets; selecting a plurality of transmitting nodes to perform cooperative subspace processing; and coordinating the plurality of transmitting nodes to increase a dimension of a subspace spanned by the linearly coded packets to provide the client with a sufficient number of linearly independent coded packets from which to retrieve the plurality of original packets.

In accordance with certain aspects of the disclosure, the plurality of transmitting nodes comprises a plurality of intermediate nodes between the server and the client, the intermediate nodes being configured to receive and retransmit the coded packets.

In accordance with another aspect of the concepts, systems, circuits, and techniques described herein, a machine implemented method for transmitting data from a source node via multiple different network channels comprises: encoding a plurality of original packets for generating a plurality of linearly coded packets and corresponding code vectors for transfer to a destination node; selecting a first network channel and at least a second network channel to simultaneously employ in the transfer; and distributing a first subset of the plurality of linearly coded packets and corresponding code vectors to the first network channel and distributing a second subset of the plurality of linearly coded packets and corresponding code vectors to the at least second network channel, wherein at least one of the first subset and the second subset has a rank that is insufficient for decoding the plurality of coded packets, and wherein a sum of ranks of the first subset and the second subset is sufficient for decoding the plurality of coded packets.

In one aspect of the disclosure, the first network channel resides on a first network and the second network channel resides on a second network that is different than the first network. In some aspects, distributing comprises network load balancing whereby a lesser number of packets is distributed to a network channel having a lesser capacity and a greater number of packets is distributed to a network channel having a greater capacity. Aspects of the disclosure provide for coordinating a plurality of transmitting nodes to cooperatively transmit the linearly coded packets and/or coordinating a plurality of receiving nodes to cooperatively receive the linearly coded packets. The linearly coded packets may comprise random linearly coded packets with coefficients generated at random and/or deterministically.

An aspect of the disclosure further comprises monitoring at least one real-time property of the first network channel and the second network channel, and encoding and/or distributing may be adjusted based on the monitoring to provide for network load balancing.

In some aspects, encoding comprises selecting a plurality of transmitting nodes to build the dimension of the subspace of a transmitted signal comprising the coded packets. Similarly, a plurality of cooperating receiving nodes may be selected to build the dimension of the subspace of a received signal. In some aspects of the disclosure, encoding and distributing are performed such that the destination node needs to receive coded packets from a plurality of network channels in order to have a sufficient number of degrees of freedom to decode the coded packets.

In accordance with another aspect of the concepts, systems, circuits, and techniques described herein, a machine implemented method for use in processing data to be transmitted from a source node on multiple different paths comprises: selecting a plurality of original packets for subspace coding to generate a plurality of linearly coded packets from a plurality of original packets; selecting a plurality of nodes to cooperatively perform subspace processing, whereby the plurality of nodes employs a plurality of transmission paths for transmitting the plurality of linearly coded packets and associated code vectors to a destination node, each of the plurality of transmission paths providing a linearly independent combination of the original packets to the destination node; and coordinating the plurality of nodes to produce a sufficient number of the plurality of transmission paths to enable the destination node to perform decoding to retrieve the plurality of original packets.

In some aspects of the disclosure, the above-recited plurality of nodes comprises one or more intermediate nodes. In an aspect of the disclosure, the method above further comprises transmitting new linear combinations until the destination node decodes the coded packets.

In accordance with another aspect of the concepts, systems, circuits, and techniques described herein, a machine implemented method for use in processing and distributing data comprises: generating a plurality of sub-space coefficients to encode a plurality of original data packets; generating a plurality of subspace-encoded data packets by employing the plurality of sub-space coefficients to produce linear combinations of the original data packets; and distributing the sub-space coefficients and the subspace-encoded data to a plurality of transmitting nodes for transmission to a destination node.

In some aspects of the disclosure, the plurality of transmitting nodes may comprise edge servers in a content delivery network. The sub-space coefficients and subspace-encoded data packets may be stored on the transmitting nodes before being served to the destination node.

In accordance with another aspect of the concepts, systems, circuits, and techniques described herein, a machine implemented method for use in processing and distributing data comprises: selecting a plurality of receiving nodes for cooperatively receiving a plurality of subspace-encoded data packets and corresponding subspace codes; distributing the plurality of subspace-encoded data packets and the subspace codes collected by the plurality of receiving nodes to a destination node; and decoding the subspace-encoded data packets to retrieve a plurality of original data packets encoded in the subspace-encoded data packets.

In some aspects of the disclosure, the plurality of receiving nodes may comprise edge servers in a content delivery network. The sub-space coefficients and subspace-encoded data packets may be stored on the receiving nodes before being collected by the destination node.

In accordance with another aspect of the concepts, systems, circuits, and techniques described herein, at least one source node is configured to transmit a plurality of original data packets; and a plurality of coding nodes are configured to output a plurality of coded packets comprising linear combinations of the original data packets. The coding nodes are configured to provide a sufficient number of degrees of freedom to enable a destination node to decode the coded packets. The coefficients of the linear combinations may be randomly chosen. A deterministic process may be employed for generating random coefficients. In some aspects, an invertible transform matrix may be employed for generating the coefficients.

In accordance with another aspect of the concepts, systems, circuits, and techniques described herein, a machine implemented method for use in distributing subspace-encoded data comprises: selecting a plurality of nodes to cooperatively function as a subspace multiplexing process; separating a data set into a plurality N of original components; generating a plurality of subspace-coded components by generating at least N linear combinations of the original components; and distributing the plurality of subspace-coded components and a plurality of associated subspace code vectors to the plurality of nodes, such that at least one of the plurality of nodes has a number of coded components that is less than a number of required degrees of freedom to decode the plurality of subspace-coded components.

In accordance with an aspect of the disclosure, the above method further comprises: at a destination node, collecting a plurality of the subspace-coded components and associated subspace code vectors from a plurality of the nodes until a sufficient number of linearly independent code vectors have been collected to decode the coded components; and decoding the subspace-coded components.

In some aspects of the disclosure, the selected nodes are nearby a destination node in a peer-to-peer network. In some aspects, the plurality of nodes comprises end nodes in a content delivery network. The physical wireless channel may provide the required statistical randomness for the coding. Codes may be based on measurements of the physical wireless channel. Codes may be generated deterministically. In some aspects, coding may comprise employing a sliding coding window.

In another aspect of the disclosure, a method for transmitting data from a source node to a destination node comprises forming linear combinations of original packets from a source node to produce subspace-coded packets, and delivering the subspace-coded packets to the destination node over one or more network paths. Based on the responsiveness of the destination node, the source node may produce new linear combinations of the original packets, and deliver the new subspace-coded packets to the destination node. This adaptive technique can be used to select the number of transmitting antennas and/or receiving antennas in a wireless network.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

Flow charts depicting disclosed methods comprise "processing blocks" or "steps" may represent computer software instructions or groups of instructions. Alternatively, the processing blocks or steps may represent steps performed by functionally equivalent circuits, such as a digital signal processor or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present disclosure. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied. Unless otherwise stated, the steps described below are unordered, meaning that the steps can be performed in any convenient or desirable order.

FIG. 3 is a flowchart illustrating methods for processing coded packets received at a destination node from a source node via multiple different WWAN paths in some aspects of the invention.

FIG. 4 is a flowchart illustrating methods for processing coded packets received at a destination node from a plurality of intermediate nodes in accordance with aspects of the invention.

FIGS. 11A, 111B, and 11C are flow diagrams illustrating cooperative subspace multiplexing methods used in accordance with aspects of the invention.

FIG. 15A is a flow diagram depicting subspace processing with data interleaving across multiple network channels in accordance with an aspect of the invention.

FIG. 15B is a flow diagram depicting a method for managing quality of service in a node in accordance with an aspect of the invention.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

Figure 1:
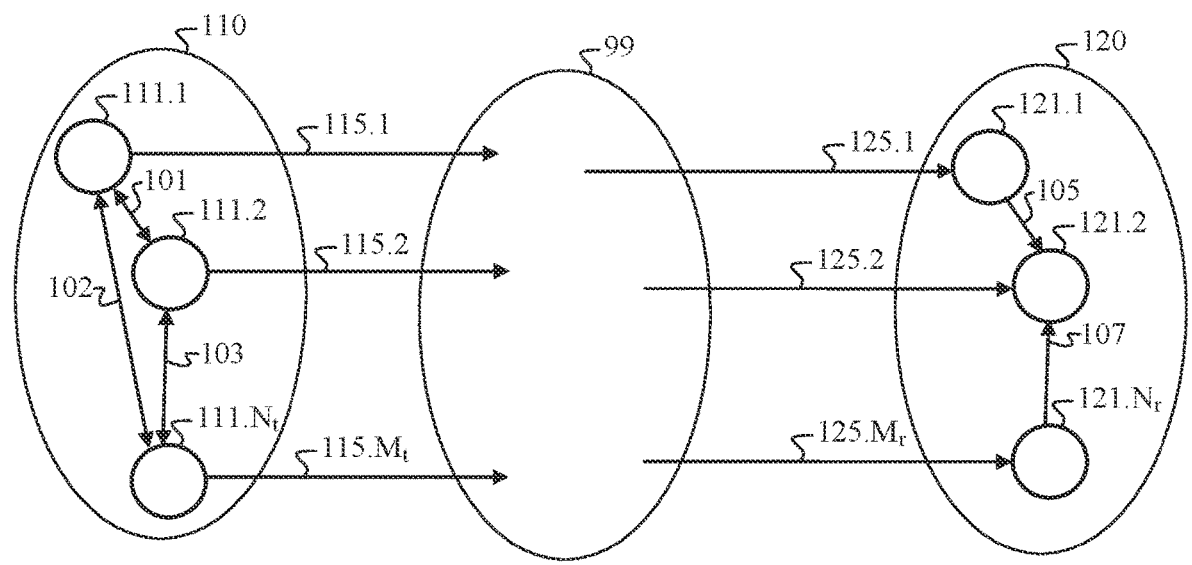
FIG. 1 is a diagram of a cooperative-MIMO system in which multiple cooperating nodes are employed at both the transmitter side and the receiver side of a wireless link in accordance with some aspects of the invention.

FIG. 1 is a diagram illustrating one possible aspect of a cooperative-MIMO system in which multiple nodes are employed at both the transmitter side and the receiver side of a WWAN (i.e., long-haul) transmission link. This figure and the figures that follow are for demonstrative purposes only and are not intended to limit the scope of the pending claims.

A node, as used herein, is an active electronic device that is communicatively connected to a network via one or more connectors and is configured for sending, receiving, and/or forwarding information over a communication channel. A device may have multiple network connectors for a given network. For example, a device may have multiple antennas. However, a single device with multiple network connectors is a single node. In a distributed network, nodes are clients, servers, or peers. A peer may sometimes serve as a client and sometimes as a server. Nodes may include super nodes, which route data for other networked devices as well as themselves.

On the transmit side, a first local group 110 comprises a plurality $N_t$ of transmitting nodes 111.1, 111.2, ..., 111.$N_t$. Each node 111.1, 111.2, ..., 111.$N_t$ may employ a WLAN (i.e., local transmissions 101-103) to broadcast its data to one or more of the other transmitting nodes 111.1, 111.2, ..., 111.$N_t$. Thus, the local group 110 of transmitting nodes may comprise all nodes 111.1, 111.2, ..., 111.$N_t$ that are communicatively coupled together by a WLAN.

In alternative aspects, the nodes 111.1, 111.2, ..., 111.$N_t$ do not share their data with the other transmitting nodes 111.1, 111.2, ..., 111.$N_t$. In such aspects, the local group 110 may comprise transmitting nodes 111.1, 111.2, ..., 111.$N_t$ that self organize or that are configured by a WWAN controller (not shown) to simultaneously employ the same WWAN channel (e.g., frequency band, time slot, and/or code space).

Each transmitting node 111.1, 111.2, ..., 111.$N_t$ transmits at least a respective WWAN signal 115.1, 115.2, ..., 115.$M_t$ into a WWAN channel 99. In some aspects of the invention, one or more of the transmitting nodes 111.1, 111.2, ..., 111.$N_t$ may comprise a plurality of ($M_t$) antennas. In such aspects, the transmitting nodes 111.1, 111.2, ..., 111.$N_t$ may generate a number up to $M_t$ of simultaneous transmissions that exceeds the number $N_t$ of nodes.

On the receiver side, a second local group 120 comprises a plurality $N_r$ of receiving nodes 121.1, 121.2, ..., 121.$N_r$ that join together for cooperative reception. Each of the receiving nodes 121.1, 121.2, ..., 121.$N_r$ receives at least a respective WWAN signal 125.1, 125.2, ..., 125.$M_r$ from the WWAN channel 99. In some aspects of the invention, one or more of the receiving nodes 121.1, 121.2, ..., 121.$N_r$ may comprise multiple antennas. Thus, the receiving nodes 121.1, 121.2, ..., 121.$N_r$ may receive a number $M_r$ of received signals that exceeds the number $N_r$ of receiving nodes. However, signals received on multiple antennas at a single node may be combined, such as may be performed for diversity combining, especially when the received signals are correlated. Thus, the number of spatial subchannels (e.g., the effective number $M_r$ of received signals) may be less than the total number of antennas, $M_r$, employed by the receiver array depending on whether or not received signals are diversity combined prior to spatial processing.

One or more of the receiving nodes 121.1, 121.2, ..., 121.$N_r$ may be designated as a destination node. For example, the local group 120 comprises nodes 121.1, 121.2, ..., 121.$N_r$, which are communicatively coupled together via a WLAN, and wherein node 121.1 and node 121.$N_r$ communicate their received WWAN data to node 121.2 (which, in this case, is designated as the destination node) for further processing. In such aspects of the invention, peer-to-peer or multi-hop communications are a natural part of cooperative-MIMO processing.

The receiving nodes 121.1, 121.2, ..., 121.$N_r$ may perform any of various combining techniques to provide MIMO subspace demultiplexing of the received signals, including EGC, MRC, Minimum Mean Squared Error Combining, other types of optimal combining, Successive Interference Cancellation, and other matrix-reduction/matrix diagonalization techniques. Some aspects may employ Cholesky triangularization (or other matrix decomposition approaches), overlapped subspace detection, maximum likelihood detection, and/or maximum a posteriori probability detection. Gaussian elimination, also known as row reduction, is a well-known algorithm for solving systems of linear equations. Using row operations to convert a matrix into reduced row echelon form is sometimes called Gauss-Jordan elimination. Some authors use the term Gaussian elimination to refer to the process until it has reached its upper triangular, or (non-reduced) row echelon form. For computational reasons, when solving systems of linear equations, it is sometimes preferable to halt row operations before the matrix is completely reduced.

This MIMO-based system may require additional energy for local communication between the transmitting nodes 111.1, 111.2, ..., 111.$N_t$ and the receiving nodes 121.1, 121.2, ..., 121.N$_r$, but simultaneously introduces important gains for the long-haul (i.e., WWAN) communication. Based on the richness of the scattering environment, there is a critical distance between the transmitter and receiver above which MIMO transmission is more energy efficient than single-input, single output (SISO), e.g., purely multi-hop peer-to-peer transmission.

The following mathematical explanation shows why a rich scattering environment in the WWAN channel produces capacity gains for MIMO subspace processing.

The time-invariant WWAN channel is described by:

$$y = Hx + w,$$

where y is a vector of length $M_r$ of baseband data symbols received by the receiver array having $M_r$ antennas, x is a vector of length $M_t$ of transmitted baseband data symbols from the transmitter array having $M_t$ antennas, H is the $M_r \times M_t$ WWAN channel matrix, and w is a vector of length $M_r$ of white Gaussian noise.

In some aspects of the invention, nodes transmit random linear combinations of the packets they receive by virtue of a rich scattering environment. In a MIMO system, a rich scattering environment typically provides a full rank, well-conditioned channel matrix H, which indicates that the system may exploit the maximum number of spatial degrees of freedom (d=min($M_t$, $M_r$)). In some aspects, the dimension of the subspace spanned by the system of linear equations (such as may be indicated by H) is the number of spatial degrees of freedom.

If the spatial subchannels are sufficiently uncorrelated, the probability that the receiver array will obtain linearly independent combinations (and therefore obtain innovative information) approaches 1. However, if a receiver obtains an insufficient number of linearly independent combinations of the transmitted data symbols, it may be unlikely that it can recover the original packets. For example, the receiver array may comprise fewer operable antennas than the number of spatial degrees of freedom employed by the transmitter. Specifically, the receiver may comprise fewer than the required minimum number of antennas ($M_r$<d), and/or some of the spatial subchannels may be correlated. In such cases, some aspects of the invention provide additional linear combinations until the receiver obtains a sufficient amount of information to perform spatial demultiplexing.

The capacity may be computed by decomposing the vector channel into a set of parallel independent scalar Gaussian sub-channels. From basic linear algebra, every linear transformation can be represented as a composition of three operations: a rotation operation, a scaling operation, and another rotation operation. In the notation of matrices, the matrix H has a singular value decomposition (SVD):

$$H = U \Lambda V^*,$$

where U and V are unitary matrices, and $\Delta$ is an $M_r \times M_t$ rectangular matrix whose diagonal elements are non-negative real numbers and whose off-diagonal elements are zero. The diagonal elements $\lambda_1 \geq \lambda_2 \geq \ldots \geq \lambda_{M(min)}$ are the ordered singular values of matrix H, where $M_{(min)}$ is the smaller of $M_t$ and $M_r$.

Since HH*=U$\Lambda\Lambda'$U*, the squared values $\lambda_i^2$ are the eigenvalues of the matrix HH* and also H*H.

H can be rewritten as:

$$H = \sum_{i=1}^{M_{min}} \lambda_i u_i v_i^*,$$

which is the sum of rank-one matrices $\lambda_i u_i v_i^*$. Thus, the rank of H is the sum of non-zero singular values $\lambda_i$. Each value $\lambda_i$ corresponds to an eigenmode of the channel (i.e., an eigenmode corresponds to an eigen-channel, or subspace channel). Each non-zero eigenmode can support a data stream. Thus the MIMO channel can support k subspace channels, where k is the number of non-zero eigenvalues $\lambda_i$.

In the case where the SNR is high, and equal amounts of power are allocated to the non-zero eigenmodes, the channel capacity is expressed by:

$$C \approx \sum_{i=1}^{k} \log\left(1 + \frac{P\lambda_i^2}{kN_0}\right) \approx k\log SNR + \sum_{i=1}^{k} \log\left(\frac{\lambda_i^2}{k}\right) \text{ bits/s/Hz}$$

where P is the total transmit power of the transmitter array, $N_0$ is the noise power, so the signal-to-noise ratio is SNR=P/$N_0$, and k is the number of non-zero eigenvalues $\lambda_i$, which is the number of spatial degrees of freedom per second per hertz. This is equal to the rank of matrix H. If H has full rank, the MIMO channel provides $M_{(min)}$ spatial degrees of freedom. However, the rank of H is just a crude measure of channel capacity. To better characterize channel capacity, one can consider the individual values of $\lambda_i$, particularly, the log of the values of $\lambda_i^2$, which are summed in the above capacity equation.

In the above analysis, since the same amount of power is transmitted in each eigenmode, the channel H whose eigenvalues are all equal has the highest capacity. More generally, the less spread out the singular values, the greater the channel capacity is. This relates to the condition number of the matrix H, which is the ratio: (max $\lambda_i$/min $\lambda_i$). The matrix is said to be well-conditioned when the condition number is close to 1.

This means that in a MIMO system with a sufficient SNR, a well-conditioned channel matrix H facilitates communication. However, one of the problems with antenna arrays employed on portable transceivers, such as cellular handsets or other wireless mobile devices, is that the antennas cannot be sufficiently separated to guarantee uncorrelated spatial sub-channels, even in rich scattering environments. Therefore, aspects of the invention, when implemented in a WWAN, employ a WLAN to communicatively couple together multiple nodes and configure the nodes to cooperatively function as a MIMO system. Typically, the separation between the mobile nodes is sufficient to ensure uncorrelated spatial structure for MIMO processing.

Figure 2:
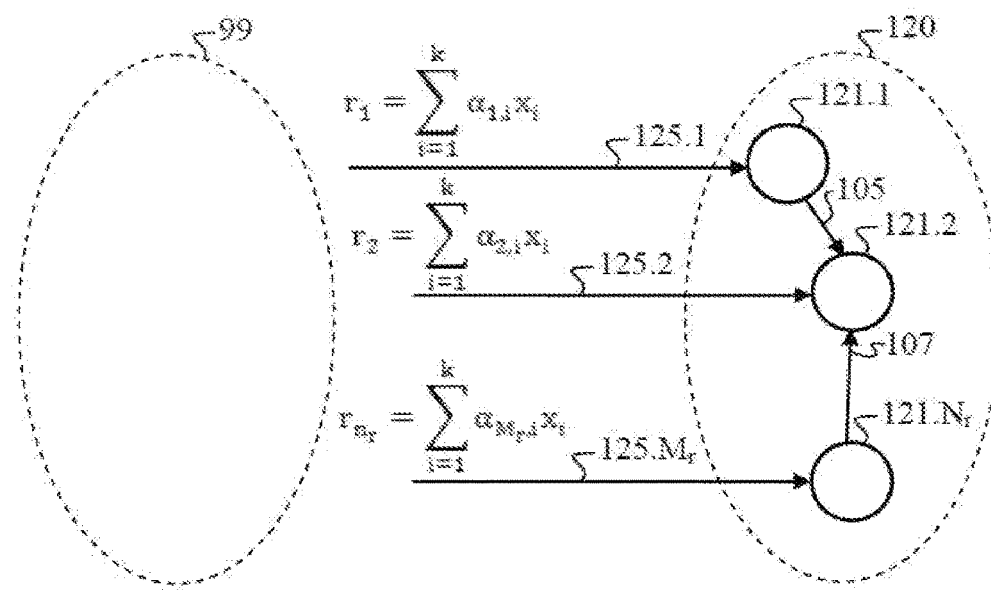
FIG. 2 is a block diagram of cooperating receiver nodes in relation to methods, devices, and systems employed for performing cooperative-MIMO processing in aspects of the invention.

FIG. 2 is a block diagram that depicts a configuration of receiver nodes in relation to methods, devices, and systems employed for cooperative-MIMO processing in accordance with certain aspects of the invention. A local group 120 comprises a plurality $N_r$ of wireless nodes 121.1-121.N$_r$ communicatively coupled together by a WLAN (depicted as WLAN links 105 and 107). At least one of the nodes 121.1-121.N$_r$ (such as node 121.2) is a destination for a transmitted signal in a WWAN. At least one of the nodes 121.1-121.N$_r$ that is not a destination node assists the destination in receiving WWAN signals. Although the WWAN transmission source(s) is (are) not shown, any type of WWAN transmission source may be employed, such as a conventional antenna array configured for transmitting WWAN signals, a plurality of WWAN base stations or access points, a plurality of cooperative-MIMO transmitters, and/or any type of WWAN peer-to-peer or multi-hop network. Accordingly, some aspects of the invention may employ techniques and structure referred to as Coordinated Multi-Point (CoMP) transmission and/or reception.

In the diagram shown in FIG. 2, a plurality $M_r$ of WWAN signals 125.1-125.$M_r$ are received by the $N_r$ nodes 121.1-121.$N_r$. However, for simplicity of the following discussion, $M_r$=$N_r$. In a WWAN that employs cooperative MIMO, a WWAN source node (not shown) having a number of original data packets to transfer to the destination node 121.2 may combine the packets together into a "coded packet" that is transmitted in the WWAN. In one aspect of the invention, the rich scattering channel naturally "encodes" the packets. In another aspect of the invention, the source node (not shown) encodes the packets by employing channel precoding. In another aspect of the invention, the source node (not shown) employs an invertible transform that maps original data symbols to a pseudo-random constellation of code symbols.

The destination node 121.2 receives the coded packet and may then store the packet for eventual decoding. The destination node 121.2 will typically require a particular number of coded packets before it decodes the coded packets to extract the original data packets. The decoding process may involve, for example, the solution of a system of linear equations having a number of independent variables (i.e., the original packets) and a number of independent equations (such as represented by the coded packets and their associated codes (e.g., code matrix)). Before the destination node 121.2 can reliably solve for the original data packets, the number of degrees of freedom received must typically equal or exceed the number of original packets. However, in some special cases, such as when certain combining techniques are employed, when certain types of error correction are employed, or when the CI invertible transform is employed, the original data packets may be recovered without requiring the number of degrees of freedom to at least equal the number of independent variables. The following methods described herein may be adapted to these and other special cases.

In some aspects of the invention, the missing degrees of freedom may be defined as the number of unknown independent variables of a system of equations less the number of independent equations. In some implementations, each coded packet successfully received at a destination node (assuming the coded packet is linearly independent of previously received coded packets) may provide another equation for use in decoding (such as in MIMO subspace demultiplexing). Thus, each linearly independent combination (e.g., uncorrelated subspace) reduces the number of degrees of freedom needed for decoding by one.

In the cooperative-MIMO receiver 120 shown in FIG. 2, the nodes 121.1-121.$N_r$ start collecting linear combinations of the transmitted messages, $x_i$, i={1, . . . , k}. For example, a signal $r_1$ received by the first node 121.1 can be expressed by the following linear combination:

$$r_1 = \sum_{i=1}^{k} \alpha_{1,i} x_i$$

where k typically equals the number of transmitted subspaces (e.g., spatial subchannels), $M_t$, from a transmitter array (not shown), and $\alpha_{1,i}$ i denotes the $i^{th}$ random channel coefficient corresponding to the first node 121.1. The set of coefficients $\alpha_{1,i}$, i={1, . . . , k} may be regarded as the $i^{th}$ subspace code, or subspace code vector.

A signal $r_{n_r}$ received by an $n_r^{th}$ node (e.g., node 121.$N_r$) is expressed by:

$$r_{n_r} = \sum_{i=1}^{k} \alpha_{n_r,i} x_i$$

where the coefficient $\alpha_{n_r,i}$, denotes the $i^{th}$ random channel coefficient corresponding to the $n_r^{th}$ node 121.$N_r$. The set of coefficients $\alpha_{n_r,i}$, i={1, . . . , k} is regarded as the $n_r^{th}$ subspace code, or subspace code vector.

If all $N_r$ spatial subchannels are uncorrelated, then the set of receiving nodes 121.1-121.$N_r$ provides a well-conditioned channel matrix H having rank $N_r$ to the destination node 121.2. In one aspect of the invention, each of the nodes 121.1-121.$N_r$ calculates its own code vector by estimating its channel coefficients $\alpha_i$. In such aspects, the subspace code matrix determined at the destination node 121.2 may be the estimated channel matrix H. Channel estimation may be performed by measuring known transmitted symbols, such as known training symbols, pilot tones, and the like. In some aspects of the invention, nodes may estimate a channel's impulse response. These code vectors, along with the received signals $r_i$ are coupled to the destination node, such as via a WLAN (e.g., WLAN links 105 and 107).

As the destination node 121.2 collects code vectors, it builds up the dimension of the subspace spanned by the received code vectors. The dimension of the subspace spanned by the code vectors received at any receiving node, such as the destination node 121.2, is also referred to as the "dimension of the node" or "rank of the node." Similarly, the dimension of the subspace spanned by the code vectors corresponding to a transmission from a transmitting node is also referred to as the "dimension of the node" or "rank of the node."

In some aspects of cooperative MIMO, one of the functions of a network controller (e.g., one of the nodes 121.1-121.$N_r$) comprises selecting nodes in the local group 120 to cooperatively transmit and/or receive WWAN signals. Adaptive array processing may be coordinated by the network controller, such as to perform "antenna selection" in which the nodes 121.1-121.$N_r$ are selected based on their channel conditions to provide a sufficiently well-conditioned channel matrix H having sufficient rank to demultiplex (i.e., decode) the transmitted signals $x_i$. For example, adaptive array processing may comprise adapting the selection of nodes 121.1-121.$N_r$ until there are $N_r \geq M_t$ uncorrelated subchannels (i.e., a sufficient number of independent linear combinations of the transmitted signals $x_i$ to permit the receiver to demultiplex the signals $x_i$). Once there are $N_r \geq M_t$ received independent linear combinations, the destination node 121.2 can recover all the messages $x_i$ successfully.

In one aspect of the invention, only the destination node 121.2 decodes the received signals $r_i$. For example, the destination node 121.2 may begin a decoding process by constructing an estimated channel matrix H. Since the component channel vectors may be determined by measuring known transmissions (e.g., pilots, training signals, other known transmitted signals, etc.), the cooperative-MIMO system may include relays that simply forward received signals (e.g., signals $r_1$ and $r_{n_r}$) to the destination node 121.2.

In accordance with some aspects of the invention, node 121.1 relays its received WWAN signal $r_1$ to the destination node 121.2 via WLAN link 105. A relay channel, such as the WLAN channel, may produce linear combinations of $r_1$:

$$r'_1 = \sum_{j=1}^{J_{12}} \beta_j r_1 = \sum_{j=1}^{J_{12}} \beta_j \left( \sum_{i=1}^{k} \alpha_{1,i} x_i \right)$$

where $\beta_j$ denotes a $j^{th}$ subchannel coefficient of a number $J_{12}$ of subchannels in the WLAN link 105. Thus, $r'_1$ is also a linear combination of the $x_i$ values with an effective code vector:

$$\gamma_i = \sum_{j=1}^{J_{12}} \beta_j \alpha_{1,i}$$

If the relay channel 105 comprises only one channel (i.e., $J_{12}=1$), then the effective code vector values $\gamma_i$ may equal the $\alpha_{1,i}$, values scaled by a constant $\beta$.

The destination node 121.2 does not need to know the values of $\alpha$ and $\beta$. Rather, in some aspects of the invention, the node 121.2 directly estimates the effective channel values, $\gamma$. In some aspects of the invention, the node 121.1 relays the unequalized signal $r_1$, which comprises unequalized known transmissions (e.g., pilots, known symbols, etc.) in addition to unequalized data portions. In some aspects, the node 121.1 does not need to estimate its WWAN channel coefficients. Upon receiving the unequalized known transmissions, the destination node 121.1 calculates an effective channel vector (i.e., $\gamma$ values). This effective channel vector may then be used with other estimated channel vectors to construct the estimated cooperative-MIMO channel matrix, H, prior to decoding.

In some aspects, the node 121.1 estimates its WWAN channel and transmits those estimates in the WLAN link 105. For example, the node 121.1 may employ its estimated WWAN channel coefficients as weights on pilot tones, or it may otherwise synthesize "distortions" on known transmission signals based on its WWAN channel estimates. When the relayed signal is received at the destination node 121.2, any WLAN distortions are imparted onto the synthesized distortions. Then the node 121.2 calculates the aggregate (i.e., effective) channel vector.

The cooperative-MIMO protocol employed in aspects of the invention does not depend on the underlying communication model. The protocol can be applied to any environment where multiple messages are to be simultaneously demultiplexed over a bandwidth-limited environment.

FIG. 3 is a flowchart illustrating a method for use in processing coded packets received at a destination node from a source node via multiple different WWAN paths in accordance with an aspect of the invention. The method comprises receiving coded packets at a receiver via multiple transmission paths 301. The receiver also receives one or more code vectors 302 corresponding to the codes that encode the packets. The number of degrees of freedom required to decode the message are determined in step 303. A plurality of receiver nodes are selected to provide the required number of degrees of freedom in step 304.

As described above, the coded packets comprise random linear combinations of original packets that are input to at least one transmitting node (not shown). In the discussion above, this random coding may be achieved by transmitting the original packets in a scattering-rich channel. However, other techniques can be employed to achieve this random coding, including, but not limited to, employing coding at the transmitter (not shown), such as channel precoding based on estimates of a random channel. In some aspects, which are described below, the coding employed at the transmitter (not shown) may employ an invertible transform, such as a CI transform, which may include block transforms and/or sliding transforms.

The multiple transmission paths may comprise a plurality of WWAN subchannels, such as the WWAN subchannels described above. The multiple transmission paths may comprise non-WWAN transmission paths, such as WLAN paths 105 and 107, and/or waveguide (i.e., wired) transmission paths. In some aspects of the invention, which are described below, the multiple transmission paths comprise parallel transmission paths employed by different networks (i.e., network channels).

The steps of receiving the coded packets 301 and receiving the code vectors 302 may be performed simultaneously, as the coded vectors may be transmitted with the coded packets. For example, in some aspects wherein the channel is employed for encoding the transmitted packets, pilot tones and/or other known transmitted signals may provide information about the channel, and, thus, the codes. In some aspects of the invention, the receiver may perform channel estimation to determine (i.e., receive) the code vectors.

The term, receiver, as used with reference to FIG. 3 may include one or more of the receiving nodes 121.1-121.N$_r$, communicatively coupled together in the local group 120. The receiver may comprise a destination node, such as node 121.2 and/or one or more intermediate nodes, such as nodes 121.1 and 121.N$_r$. A receiver may denote the collection of receiving nodes 121.1-121.N$_r$.

In some aspects of the invention, intermediate nodes (such as relay nodes) in the transmission path(s) may provide encode the packets. In accordance with some aspects, intermediate nodes may convey code vectors to the receiver. In other aspects, the intermediate nodes modify the coding of the transmissions they receive, as well as the corresponding code vectors. In such aspects, the intermediate nodes may provide linear coding to linearly coded transmissions they receive such that the aggregate coding seen by the destination node is also a linear combination of the original data packets. Intermediate nodes may convey channel estimates to other nodes in the transmission path, either directly (such as by transmitting those estimates as data), or indirectly, such as by imparting the channel estimate values on pilot signals and/or other known transmission signals used for channel estimation.

In patent application Ser. No. 10/145,854, which is hereby incorporated by reference in its entirety, linear coding applied to a transmission encapsulates (i.e., masks) the network address in the packet header. In one aspect, this problem is remedied by appending a "message address" and header. Acknowledgements are returned upon receiving either or both the encapsulating message and the individual "network" packets. The message may be retransmitted until an acknowledgement is received from the destination node or after a predetermined number of retransmissions. In some aspects of the invention, the message address may be changed as the message propagates (e.g., hops) through the network. This is described in the '854 application with respect to each peer providing its own linear coding to the packets it receives before forwarding the packets.

As described above, in some aspects of the invention, either or both steps 301 and 302 may comprise transmitting an acknowledgement in response to receiving each coded combination of packets and/or upon decoding the original packets.

In step 303, the receiver determines if there are a sufficient number of degrees of freedom to decode the encoded transmission. Specifically, the receiver determines if there are a sufficient number of linearly independent packets at the destination node to allow for recovering the original data packets. For example, if there are $M_T$ uncorrelated transmitted subspaces bearing $M_T$ transmitted packets, then at least $M_R = M_T$ uncorrelated WWAN receiving paths are selected to provide the necessary degrees of freedom to decode the transmission. Spatial subchannels that have different spatial structure (e.g., subspaces that have minimal eigenspace alignment) are said to be uncorrelated. Step 303 may comprise measuring the correlation between receiver nodes and then adapting the selection of WWAN-active nodes when receiver nodes become correlated.

One method for determining if receiver nodes are uncorrelated comprises determining if their received signals are linearly independent. For example, a Gaussian-Jordan elimination operation (or similar process) may be performed on a coefficient matrix associated with received packets. If a packet from a receiving node is not linearly independent with respect to other received packets, the packet may be discarded (or diversity combined with correlated packets). The network controller may proceed to look for new coded packets, such as by selecting another receiving node, thus building the dimension of the subspace spanned by the set of received coded packets.

In accordance with one aspect of the invention, a destination node in a cooperative-MIMO system determines that it has an insufficient number of degrees of freedom to decode a received coded message 303. Then selecting an additional receiver node 304 comprises receiving from at least one additional receiver node at least one linearly independent combination of original packets. New coded packets may be added until the destination node can decode the coded message. In some aspects of the invention, selecting 304 may be performed by the destination node, at least one other receiver node functioning as a network controller, or by the WWAN.

In one aspect of the invention, if an acknowledgement is not returned to the transmitter after a predetermined amount of time, then the transmitter retransmits the message. If the interval between transmissions is at least equal to the channel coherence time, then the retransmitted messages provide additional degrees of freedom at the receiver. Thus, a step of retransmitting the message with a different linear combination of original data packets (not shown) may be performed instead of, or in addition to step 304.

If a sufficient number of linearly independent packets have been received to decode the coded packets, then decoding 305 may be performed.

FIG. 4 is a flowchart illustrating a method for use in processing coded packets received at a destination node from a plurality of intermediate nodes in accordance with an aspect of the invention. The method comprises collecting code vectors from at least one peer 401. The collected code vectors may be arranged as a matrix 402. A processing step 403 determines if a dimension of the matrix (e.g., the number of collected code vectors) is equal to a predetermined number (e.g., the number of degrees of freedom required to decode the packets). When the dimension of the matrix does not equal the predetermined number, the method calls for repeating 413 the collecting step 401, the arranging step 402, and the processing step 403 until the dimension of the matrix equals the predetermined number. Then the original data packets are decoded 404 using the collection of code vectors in the matrix.

As described above, information about the code vectors may be transmitted with the coded packets. For example, transmissions in a wireless network typically include known control information (such as pilot tones, training sequences, etc.) that can be used for channel estimation. Generating the code matrix 402 may comprise estimating a MIMO channel matrix H. Comparing the matrix dimension 403 may comprise determining the rank of H, determining the number of code vectors, or determining the number of linearly independent code vectors. In some aspects of the invention, step 403 may comprise performing an eigenvalue decomposition of the $M_r \times M_t$ correlation matrix $R = H^H H$.

In a MIMO communication system, signals transmitted from $M_t$ transmit sources interfere with each other at a receiver comprising the receiving nodes $121.1$-$121.N_r$. Thus, interference cancellation (such as matrix inversion and/or various forms of adaptive filtering) may be employed by one or more MIMO combiners to separate the signals. The received signal is expressed by:

$$y = Hx + n$$

where the received signal, y, is a vector with $M_r$ terms $\{y_i, i=1, \ldots, M_r\}$ corresponding to signals received by $M_r$ receiver elements (i.e., receiving nodes $121.1$-$121.N_r$); x represents the transmitted signal, which is a vector having $M_t$ terms $\{x_i, i=1, \ldots, M_t\}$ corresponding to signals transmitted by $M_t$ transmitter elements (i.e., transmitting nodes $111.1$-$111.N_t$); H is an $M_r \times M_t$ channel-response matrix that characterizes the complex gains (i.e., transfer function, or spatial gain distribution) from the $M_t$ transmission elements to the $M_r$ receive elements; and n represents AWGN having zero mean and zero variance.

In the case where the channel is characterized by flat fading, such as when a narrowband signal is employed (e.g., a sub-carrier of a multi-carrier signal), the elements in matrix H are scalars. Thus, some aspects of the invention that provide for generating linear combinations of the data may provide for generating scalar coefficients. For example, pre-coding or spatial multiplexing based on the matrix H performed on the transmit side of a link may comprise generating linear combinations of signals in which the signal values are multiplied by scalar coefficients. Simultaneously transmitting multiple signals in a flat-fading environment can produce linear combinations in which the signals are scaled by scalar coefficients. Spatial demultiplexing performed on the receive side of the link may employ the scalar matrix H values, and, thus, comprise generating linear combinations of the received signals.

In one aspect of the invention, the channel-response matrix H may be diagonalized by performing an eigenvalue decomposition of the $M_r \times M_t$ correlation matrix R, where $R = H^H H$. Eigenvalue decomposition is expressed by:

$$R = EDE^H R$$

where E is an $M_r \times M_t$ unitary matrix with columns corresponding to the eigenvectors $e_i$ of R, and D is an $M_r \times M_t$ diagonal matrix wherein the diagonal elements are eigenvalues $\lambda_i$ of R. The diagonal elements of D indicate the channel gain for each of the independent MIMO channels. Alternatively, other eigenvalue-decomposition approaches, such as singular value decomposition, may be employed.

One process for diagonalizing the MIMO channel response is initiated by multiplying a data vector d with the unitary matrix E to produce the transmitted vector x: x=Es. This requires the transmitter to have some information corresponding to the channel-response matrix H, or related information thereof. The received vector y is then multiplied with $E^H H^H$ to provide an estimate of data vector s, which is expressed by:

$$\hat{s}=E^H H^H y=E^H H^H HEs+E^H H^H n=Ds+\hat{n}$$

where $\hat{n}$ is AWGN having a mean vector of 0 and a covariance matrix of $\Lambda_n = \sigma^2 D$.

The data vector s is transformed by an effective channel response represented by the diagonal matrix D. Thus, there are $N_s$ non-interfering subchannels, wherein each subchannel i has a power gain of $\lambda_i^2$ and a noise power of $\sigma^2 \lambda_i$. Subchannels with higher SNR are able to support higher information flows. Thus, some aspects of the invention provide for bit loading. Bit loading assigns bits to subchannels based on subchannel quality, which means that it allows more bits to be transmitted in higher-quality (i.e., higher-capacity) subchannels and fewer bits to be transmitted in lower-quality subchannels.

In the case where MIMO subspace processing is performed on a multicarrier (e.g., OFDM) signal or some other wideband signal that is spectrally decomposed into narrowband components, eigenmode decomposition may be performed for each frequency bin $f_n$.

If multicarrier spreading codes are employed (e.g., orthogonal DFT, or CI codes), the channel-response matrix H can cause inter-symbol interference between spread data symbols, even in a SISO arrangement. Accordingly, the eigenmode decomposition technique described above is applicable to multicarrier spreading and despreading. In one aspect of the invention, eigenmode decomposition may be applied across two or more dimensions (e.g., both spatial and frequency dimensions). In another embodiment of the invention, eigenmode decomposition may be applied across a single dimension (e.g., spatial or frequency dimensions). For example, multicarrier spreading codes (for example, orthogonal codes for data multiplexing in a given multiple-access channel) may be generated and processed via eigenmode decomposition.

Any of various water-filling or water-pouring schemes may be employed to optimally distribute the total transmission power over the available transmission channels, such as to maximize spectral efficiency. For example, water-filling can be used to adapt individual node transmission powers such that channels with higher SNRs are provided with correspondingly greater portions of the total transmit power. A transmission channel, as defined herein, may include a spatial sub-space channel, a space-frequency channel, or some other channel defined by a set of orthogonalizing properties. Similarly, water filling may be used at a physically connected (i.e., wired) antenna array. The transmit power allocated to a particular transmission channel may be determined by some predetermined channel-quality measurement, such as SNR, SINR, BER, packet error rate, frame error rate, probability of error, etc. However, different or additional criteria may be employed with respect to power allocation, including, but not limited to, wireless terminal battery life, load balancing, spatial reuse, power-control instructions, and near-far interference.

In conventional water filling, power allocation is performed such that the total transmission power $P_T$ is some predetermined constant:

$$P_T = \sum_{j \in K} \sum_{k \in L} P_j(k)$$

where $L=\{1, \ldots, N_s\}$ signifies the available spatial sub-spaces and $K=\{1, \ldots, N_f\}$ represents the available sub-carrier frequencies $f_n$. The received SNR (expressed by $\psi_j(k)$) for each transmission channel is expressed by:

$$\psi_j(k) = \frac{P_j(k)\lambda_j(k)}{\sigma^2}, \text{ for } j = \{1, \ldots, N_s\} \text{ and } k = \{1, \ldots, N_f\}$$

The aggregate spectral efficiency for the $N_s N_f$ transmission channels is expressed by:

$$C = \sum_{j=1}^{N_s} \sum_{k=1}^{N_f} \log_2(1 + \psi_j(k))$$

The modulation and channel coding for each transmission channel may be adapted with respect to the corresponding SNR. Alternatively, transmission channels may be grouped with respect to their data-carrying capability. Thus, groups of transmission channels may share common modulation/coding characteristics. Furthermore, transmission channels having particular SNRs may be used for particular communication needs. For example, voice communications may be allocated to channels having low SNRs, and thus, low data-carrying capabilities. In some cases, transmission channels that fail to achieve a predetermined threshold SNR may be eliminated. In one embodiment of the invention, water filling is employed such that the total transmission power is distributed over a plurality of selected transmission channels such that the received SNR is approximately equal for all of the selected channels.

An aspect of the invention may employ reliability assessment for determining required processing and virtual-array size (e.g., the number of active nodes functioning as WWAN receiver elements). Received bits or symbols that have low reliability may require more processing. Bits or symbols with high reliability may be processed with fewer elements (e.g., nodes) or provided with lower processing requirements. More information typically needs to be combined for data streams having less reliability and less information may need to be combined for data streams having more reliability. Also, nodes with good channel quality may share more information via the WLAN than nodes with poor channel quality. Optimization algorithms, such as water-filling algorithms may be employed in the reliability domain.

Figure 5:
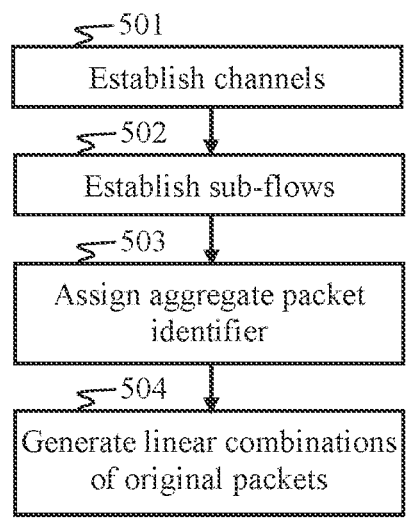
FIG. 5 is a flow diagram of a method for distributing data across a plurality of subchannels in a cooperative network according to some aspects of the invention.

FIG. 5 is a flow diagram depicting a method of distributing data across a plurality of subchannels in a cooperative network, such as a communication network wherein at least a portion of the network employs multiple inputs and multiple outputs associated with a link between a server (i.e., a source node) and a client (i.e., a destination node). Aspects of the invention associated with FIG. 5, as well as with the other figures of the disclosure, are described in the '107 application and the '854 application (both of which are incorporated by reference in their entireties, and to which this disclosure claims priority). For example, in some aspects of the invention, disclosures in '107 and '854 relating to adaptive array processing, bit loading, soft handoff, antenna switching, antenna selection, and simultaneously employing multiple network channels (including channels from different WANs) are pertinent to methods and devices associated with FIG. 5.

Referring now to FIG. 5, a client-server system comprises a server coupled to a client through at least one communication link. Portions of the link may include at least one WWAN channel. A plurality of network channels are established 501 for transmitting a data block (e.g., a file, one or more data packets, etc.) from the server to the client. In one aspect of the invention, the plurality of network channels may comprise a plurality of spatial subchannels in a cooperative-MIMO system, such as depicted in FIG. 1. In another aspect of the invention, the network channels may comprise multiple WANs, such as depicted in FIG. 1J of the '107 application.

When step 501 comprises establishing a plurality of spatial subchannels in a WWAN, a number of transmitting antennas $M_t$ and a number of receiving antennas $M_r$ may be determined. In a cooperative-MIMO system, a plurality of nodes may be employed at the transmitting side and/or at the receiving side in a wireless network. Step 501 may further comprise selecting which antennas are employed. Such antenna selection may be part of adaptive-array (e.g., smart antenna) processing performed by either or both the client and the server, and/or by one or more intermediate nodes in the link. In some aspects, antenna selection may comprise node selection in a cooperative-MIMO system.

Multiple sub-flows are established 502, wherein each sub-flow comprises a portion of the data to be transmitted. In one aspect of the invention, the sub-flows are established by determining amounts of data (e.g., number of packets) to be allocated to each of a plurality of channels and distributing the allocated amounts to the channels. Each channel may be provided with a predetermined number of packets to transmit in a particular unit time.

In one aspect, the channel quality of each subspace may be determined (such as by employing any of the eigenmode processes described above), followed by a bit-loading process. Various adaptive antenna array techniques may be employed. The basic idea is to use channel information to adaptively vary the transmission scheme. This adaptation may comprise varying the number of spatial subchannels and the sub-flow rate of each subchannel in a precoded spatial multiplexing system. In some aspects, a water-filling process, such as described above, may be employed for bit loading. For example, as a higher-quality subchannel is allocated more power, this increases the subchannel's SNR, which allows larger modulation constellations, higher coding rates, etc. to be employed. A higher-quality subchannel may also have fewer retransmissions. In some aspects of the invention, step 502 may be performed concurrently with step 501, or it may follow step 501.

Since subspace encoding employed in aspects of the invention produces an aggregate signal in which the original data portions (i.e., components) are encapsulated, if the original data portions comprise packets, then header information in those original packets, such as addresses, sequence numbers, and the like are similarly masked. Step 503 assigns an identifier to the aggregate signal. For example, the identifier may comprise a WWAN identifier (e.g., WWAN-access information) that distinguishes WWAN messages from each other. The WWAN-access information typically identifies a particular destination node to which the message is addressed. The WWAN-access information may comprise channel-access information for a WWAN channel to which the destination node is assigned. Similarly, the WWAN identifier may comprise a network address.

The '854 application discloses a message address appended to a message encoded to encapsulate an aggregation of linearly encoded packets in which the network addresses of the individual component packets are hidden by the encapsulation. A receiving node may acknowledge receipt of the encapsulating message and/or receipt of the component (i.e., original) packets once they have been decoded.

In step 504, linear combinations of the component packets are generated. These linear combinations are distributed across the previously determined sub-flows based on the amounts of data (e.g., number of packets) allocated to each sub-flow in step 502. When the linear combinations are transmitted, they are provided with the identifier provided in step 503.

In one aspect of the invention, step 504 comprises subspace coding that employs an invertible transform. For example, in the case of a linear transform from $R^n$ to $R^m$ given by $y=Ax$, where A is an m×n matrix, the transformation is invertible if $Ax=y$ has a unique solution. If m=n, the system $Ax=y$ has a unique solution if the rank of A equals n.

In one aspect of the invention, parallel transmissions (i.e., simultaneous, same-band transmissions) of the original data packets in a rich scattering environment produce linear combinations of the original data packets. Each "encoded" packet received at a receiving antenna comprises a random superposition of the original packets, wherein the randomness is provided by the random scattering channel. In accordance with one aspect of the invention, step 504 comprises coordinating a plurality of transmitting nodes to cooperatively transmit the original data packets. Step 504 may comprise antenna selection and/or node selection at the transmitting side, such as to produce an m×m channel matrix H with rank m in which the m subchannels are sufficiently decorrelated from each other. In accordance with another aspect of the invention, step 504 comprises coordinating a plurality of receiving nodes to receive the transmitted signals. Step 504 may comprise antenna selection and/or node selection at the receiving side, such as to produce an n×n channel matrix H with rank n in which the n subchannels are sufficiently decorrelated from each other.

In another aspect of the invention, pre-coding applied to the original data on the transmitting side produces linear combinations of the original data packets. Each "encoded" packet transmitted by a transmitting antenna comprises a random superposition of the original packets, wherein the randomness is provided by estimations of the random scattering channel. Aspects of the invention comprise either or both coordinating a plurality of transmitting nodes to cooperatively transmit the linear combinations of original packets and coordinating a plurality of receiving nodes to cooperatively receive the transmitted signals.

The linear combinations can be generated at random or deterministically involving all or any subset of the original packets. The coding strategy may affect the decoding complexity at the receiver. A particularly efficient coding method is to form linear combinations of packets using a CI transform, which is explained below.

In order to decode the received coded packets, the receiver needs a predetermined number of linearly independent combinations of the original packets, denoted as degrees of freedom. The effects of losing coded packets can be mitigated by providing for redundant transmissions across the subspaces. Similarly, a failure to return an acknowledgement for the original packets can naturally cause retransmission of the coded packets until the receiver can decode the encoded packets and acknowledge receipt of the original packets.

Figure 6:
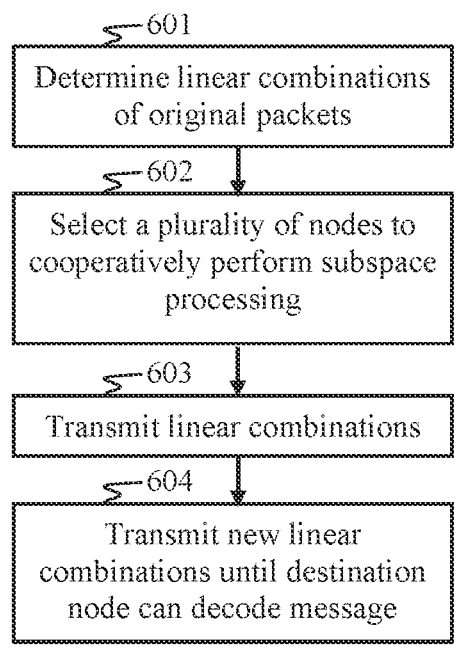
FIG. 6 is a flow diagram depicting methods for distributing data across a plurality of subchannels in a cooperative network in accordance with aspects of the invention.

FIG. 6 is a flow diagram depicting a method of distributing data across a plurality of subchannels in a cooperative network, such as a network in which a plurality of transmitting nodes, a plurality of intermediate nodes, and/or a plurality of receiving nodes cooperatively function together to perform subspace processing.

Step 601 comprises determining a plurality of linear combinations of original packets to transmit from at least one source node to at least one destination node. For example, packets in a transmit queue may partitioned into sets, each set comprising a plurality of packets. In one aspect of the invention, the number of packets in each set equals the number of transmitted subchannels. In another aspect of the invention, responsive to feedback from one or more receiving nodes, the number of packets in each set equals the number of received subchannels. In one aspect, the linear combinations comprise coding provided to the original packets by one or more transmitting nodes. In another aspect, step 601 comprises which packets are transmitted simultaneously into a multipath channel, and the channel produces random linear combinations of the transmitted packets.

Step 602 comprises selecting a plurality of nodes to cooperatively perform subspace processing. In one aspect of the invention, a plurality of transmitting nodes is selected by a source node to transmit the linear combinations. For example, each transmitting node may transmit a different linear combination. In some aspects, each transmitting node may generate a different linear combination of original packets. In another aspect of the invention, a plurality of intermediate nodes is selected to cooperatively perform subspace processing. For example, intermediate nodes may combine signals they receive and then transmit those linear combinations. Intermediate nodes may share signals with each other before forwarding their received signals. In another aspect of the invention, a plurality of receiving nodes is selected to cooperatively perform subspace processing. For example, a destination node may select one or more receiving nodes to provide a requisite number of independent linear combinations so the destination node can decode the received signals to recover the original packets.

Step 603 comprises transmitting the linear combinations. In one aspect of the invention, step 603 comprises employing multiple transmission paths for transmitting original packets and/or coded packets, wherein the multiple transmission paths provide for mixing the transmitted signals. In one aspect, intermediate nodes that have multiple simultaneous inputs may combine the input signals. In another aspect of the invention, step 603 may employ transmission paths from a plurality of networks. In such aspects, transmitting 603 may employ similar bit-loading and/or water-filling techniques employed for subspaces, as described above.

Since many aspects of the invention employ data communication protocols that typically employ some type of acknowledgement mechanism, step 603 may be repeated until the destination node acknowledges receipt of the original packets. Thus, in some aspects, the destination node will ordinarily not be able to return acknowledgements for the original packets until after it decodes its received signals. Thus, the ordinary retransmission process may generate new linear combinations 604 until the destination node can return an acknowledgement. For example, new linear combinations will be generated if the retransmission is delayed by an amount equal to or greater than the channel coherence time. Similarly, new linear combinations will typically be generated if the transmission channel is changed in other ways, such as if a different set of transmitting nodes, intermediate nodes, and/or receiving nodes is (are) employed. Alternatively, new linear combinations can be generated if new precoding values are selected.

Figure 7:
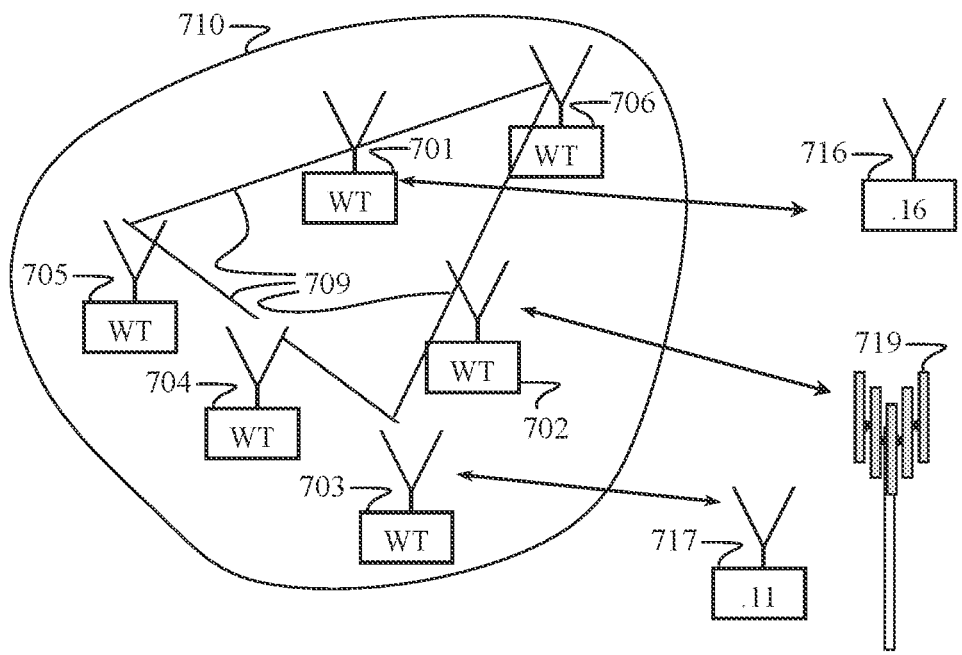
FIG. 7 is a block diagram depicting a cooperative system of nodes configured to simultaneously employ a plurality of different networks for delivering and/or receiving a data transmission in accordance with aspects of the invention.

FIG. 7 is a block diagram depicting a cooperative system of nodes configured to simultaneously employ a plurality of different WWAN connections, such as to deliver a data stream or data file to (or from) a destination (source) node. In one aspect of the invention, a local group 710 of nodes 701-706 employs connections to a plurality of different WWANs 716, 717, and 719 to transfer data to or from one of the nodes 701-706. In accordance with some aspects of the invention, the destination (or source node), i.e., one of the nodes 701-706 may simultaneously employ a plurality of WWAN user channels, including at least one of the user channels allocated to at least one of the other nodes 701-706, to transmit and/or receive data.

In some aspects of the invention, one or more nodes depicted in the figures may comprise an edge of a content delivery network. For example, an edge server may comprise one or more of the WWAN terminals 716, 717, and 719. In some aspects, one or more of the nodes 701-706 may be configured to perform edge-server functions.

In some aspects of the invention, a source or destination node may employ one or WANs to which it does not have direct access, but that one of the cooperating nodes 701-706 in the group 710 may access. For example, node 701 is shown with a communication to an IEEE 802.16 access-point terminal 716 in an IEEE 802.16 network, node 102 is shown with access capabilities to a 3G-cellular terminal 719, and node 703 has connectivity to an IEEE 802.11 access point 717. Connectivity between the nodes 701-706, such as via WLAN links 709, enables any of the nodes 701-706 in the group 710 to access any of the plurality of WAN (802.16, 3G, and 802.11) services.

A WAN-access controller (not shown), which may take the form of software residing on a physical device, such as one or more nodes 701-706, may be provided for managing access to the WAN services, including partitioning information flows across multiple WAN services, user channels within those WAN services, and/or subspace channels. Such access may be performed with respect to a combination of technical rules and business rules. For example, WAN access is typically managed using technical rules, such as network load balancing. For example, network load balancing may comprise balancing traffic across two or more WAN links. This capability can balance network sessions, such as Web, email, streaming media, etc., over multiple connections in order to spread out the amount of bandwidth used by each node 701-706, thus increasing the total amount of bandwidth available.

In some aspects of the invention, WAN access can also be influenced by business rules, such as employing cost/service ratios when determining whether and how to different WAN services. For example, the WAN-access controller (not shown) can anticipate the economic cost of particular WAN services to the user, as well as user communication needs, when assigning WAN access to individual nodes 701-706. A destination or source node 701-706 may provide the WAN-access controller (not shown) with a cost tolerance, which can be updated relative to the type of communication link desired. For example, high-priority communication needs (such as particular voice communications or bidding on an online auction) may include permissions to access more expensive WAN services in order to ensure better reliability.

The overall goal of WAN access may be to achieve optimal connectivity with minimum cost. Accordingly, WAN-access algorithms may include optimization techniques, including stochastic search algorithms (like multiobjective genetic algorithms). Multi-objective optimization are well known in the art, such as described in E. Zitzler and L. Thiele, "Multi objective evolutionary algorithms: A comparative case study and the strength pareto approach," IEEE Tran. on Evol. Comput., vol. 3, no. 4, November 1999, pp. 257-271 and J. D. Schaffer, "Multiple objective optimization with vector evaluated genetic algorithms," Proceedings of 1st International Conference on Genetic Algorithms, 1991, pp. 93-100, both of which are incorporated by reference.

Some aspects of the invention may employ the multiple WANs depicted in FIG. 7 to perform subspace processing, as described throughout this disclosure. As shown, a first node (e.g., one of the nodes 701-706) may wish to exchange information with a second node, such as a server (not shown) via a plurality of WAN services. As is known, WAN access may comprise multiple different routes or paths that data packets can traverse between the first and second nodes. In addition, some of the different routes may involve different network technologies.

In one aspect, a first path between the first and second nodes may comprise a WiFi-based network (i.e., based on the IEEE 802.11 family of wireless networking standards), such as depicted by the path to the 802.11 access point 717. A second path may comprise a 4G cellular network, such as a Long term Evolution (LTE) based cellular network or an 802.16 WiMax network, depicted by the path to the 802.16 access-point terminal 716. To use either of these different WAN paths the first node 701-706 comprises (or has access to) appropriate hardware and software to be able to communicate according to the corresponding standards. Many modern communication devices (e.g., cell phones, smart phones, handheld communicators, computers or servers with communication functionality, network gateways, wireless access points, audio/video devices with communication functionality, appliances with communication functionality, wearable communication devices, etc.) include network adapters for multiple different network technologies. Nodes 701-706 configured to cooperatively perform subspace processing in a MIMO system can also enable the first node (i.e., one of the nodes 701-706) to access WAN services that it would otherwise not be able to access.

Some aspects of the invention employ multiple different network technologies to support a single data transfer operation (or a single connection) between communication nodes. The use of multiple different network technologies associated with multiple different communication paths to support a single data transfer operation or other function may be referred to as "heterogeneous networking." Thus, cooperative subspace processing, such as subspace coding and/or subspace decoding, may employ heterogeneous networking.

Figure 8:
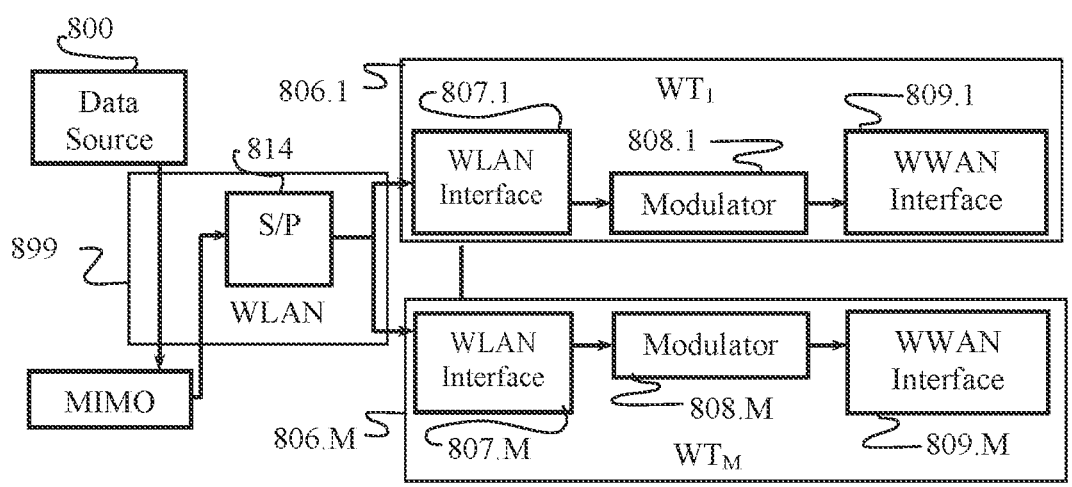
FIG. 8 is a block diagram of a plurality of cooperating nodes configured in accordance with aspects of the invention.

FIG. 8 is a block diagram of a plurality M of transmitting nodes 806.1-806.M configured in accordance with aspects of the invention. A data source 800 is coupled to a sub-space coder, such as a MIMO processor 802. The nodes 806.1-806.M are in close proximity to each other and are communicatively coupled together, such as by a WLAN 899. The MIMO processor 802 provides sub-space coding to the data. Sub-space coding may comprise spreading codes and/or channel codes, such as block channel codes, which spreads each data symbol over multiple code symbols (i.e., coded data symbols). The resulting coded data is then grouped by the MIMO processor 802 and distributed to the plurality of nodes 806.1-806.M, which may comprise wireless terminals (denoted as WTs) configured to communicate in a WWAN.

In one aspect of the invention, each node 806.1-806.M comprises a WLAN interface 807.1-807.M configured to receive and/or transmit coded data from/to the MIMO processor 802. The MIMO processor 802 may comprise one or more of the nodes 806.1-806.M. For example, the MIMO processor 802 may reside in one of the nodes 806.1-806.M that is a source node.

In one aspect of the invention, each of the nodes 806.1-806.M is configured to transmit signals into a WWAN, and, thus, each comprises a modulator 808.1-808.M and a WWAN interface 809.1-809.M. Modulation may include channel coding. In one aspect of the invention, modulation 808.1-808.M comprises employs WWAN channel weights, such as may be used for sub-space processing. The channel weights may be provided by the MIMO processor 802. Thus, in some aspects of the invention, the MIMO processor 802 couples coded data symbols and sub-space codes to the each of the nodes 806.1-806.M.

Figure 9A:
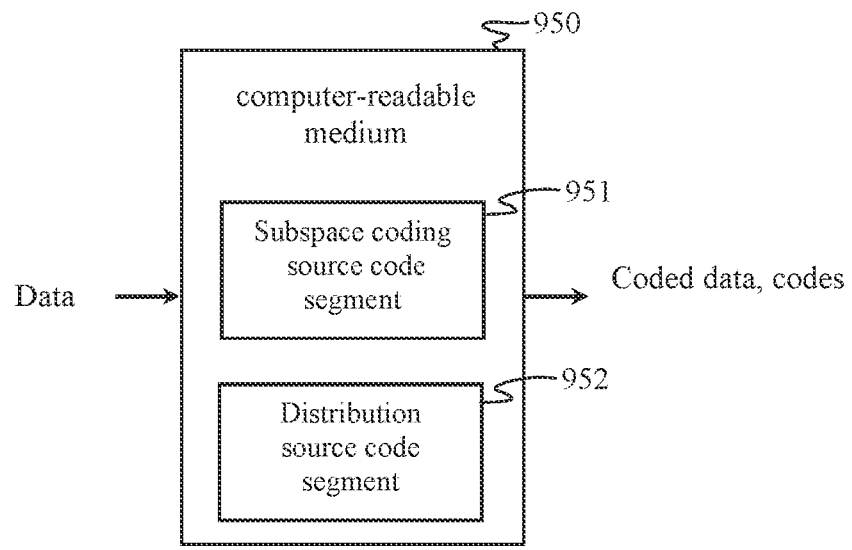
FIGS. 9A and 9B depict software components residing on a non-transitory computer-readable memory configured to operate in accordance with aspects of the invention.

FIG. 9A illustrates software components residing on a non-transitory computer-readable memory 950. A subspace coding source-code segment 951 is configured to generate a plurality of sub-space coefficients to encode a plurality of original data packets. The subspace coding source-code segment 951 is configured to accept as input at least one of a set of information inputs, including data signals (e.g., original data packets), training signals (e.g., known symbols), WWAN channel estimates, and WWAN-control information.

The subspace coding source-code segment 951 is configured to provide as output at least one of a set of signals, including coefficients for subspace coding and subspace-encoded data. In one aspect of the invention, a distribution source code segment 952 is provided for distributing the coefficients for subspace coding and the subspace-encoded data received from source-code segment 951 to a plurality of nodes. The distribution source code segment 952 may optionally function to couple at least one of a set of information inputs to the source-code segment 951, including data packets from other nodes.

Figure 9B:
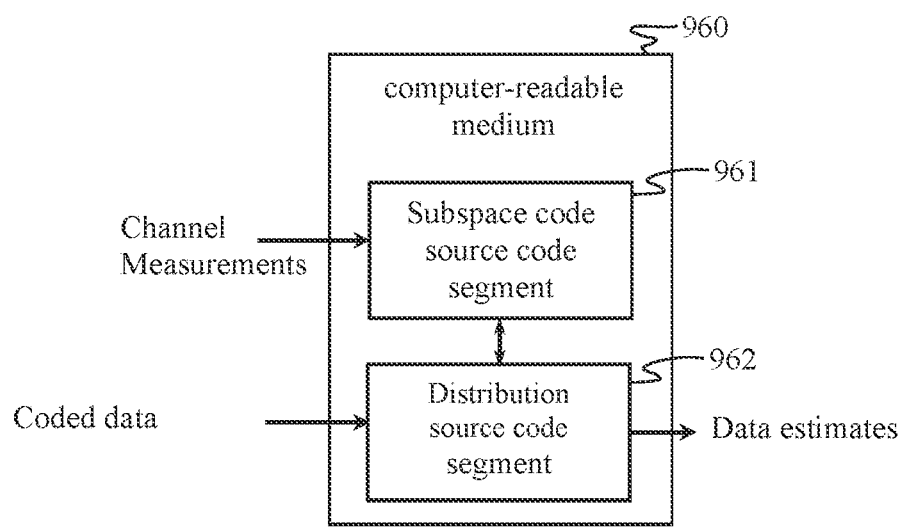

FIG. 9B illustrates software components of a receiver residing on a non-transient computer-readable memory 960. A subspace code source-code segment 961 is configured to acquire subspace code coefficients from a plurality of cooperating receiving nodes. These coefficients are subsequently used to decode received subspace-coded data. In one aspect of the invention, the source-code segment 961 may estimate subspace coefficients from measurements of the propagation channel. For example, pilot tones and/or other control information in a received signal may convey code vectors that encode the original packets. For an antenna array comprising a plurality of wireless terminal nodes, the subspace coefficients may comprise space-frequency codes (e.g., sub-carrier/antenna array weight vectors) and/or space-time codes (e.g., weighted Rake taps). The subspace code source-code segment 961 is configured to accept at least one of a set of inputs, including signals that convey code vectors (including received signals in which known symbol values are scaled by subspace code coefficients), coded data, channel estimates, and WWAN-control information.

The subspace code source-code segment 961 is configured to provide as output at least one of a set of information signals, including subspace coefficients, encoded data packets (such as to be distributed to one or more nodes), combined data packets (e.g., data packets received from a plurality of nodes and then combined, wherein the data received may comprise encoded data), and estimates of original data packets after decoding. A distribution source code segment 962 is provided for distributing at least one of a set of signals, including subspace coefficients (used for subspace coding and/or decoding), encoded data packets, combined data packets, and estimates of original data packets following decoding. The distribution source code segment 1962 may optionally function to couple at least one of a set of information inputs to the source-code segment 961, including data packets received by other WTs, training signals (including code vectors) received by other nodes, channel estimates (either of both locally estimated and received from other nodes), WWAN-control information, code vectors (including decoding values) received from at least one other node, and decoded data received from at least one other node. Accordingly, the source code segment 1962 may select which WTs to receive information from to cooperatively perform subspace demultiplexing.

Since software implementations of the invention may reside on one or more computer-readable memories, the term computer-readable memory is meant to include more than one memory residing on more than one node.

Aspects of the invention described herein may employ subspace processing methods (including software implementations) and apparatus implementations employing cooperative antenna arrays in a WWAN. While in some aspects of the invention, nodes in a cooperating group share the same WWAN access, other aspects of the invention provide for nodes with access to different WWANs. In some aspects, one or more nodes may have access to a plurality of WWANs and WWAN services. In some cases, one or more nodes may not be able to directly access any WWAN.

Figure 10:
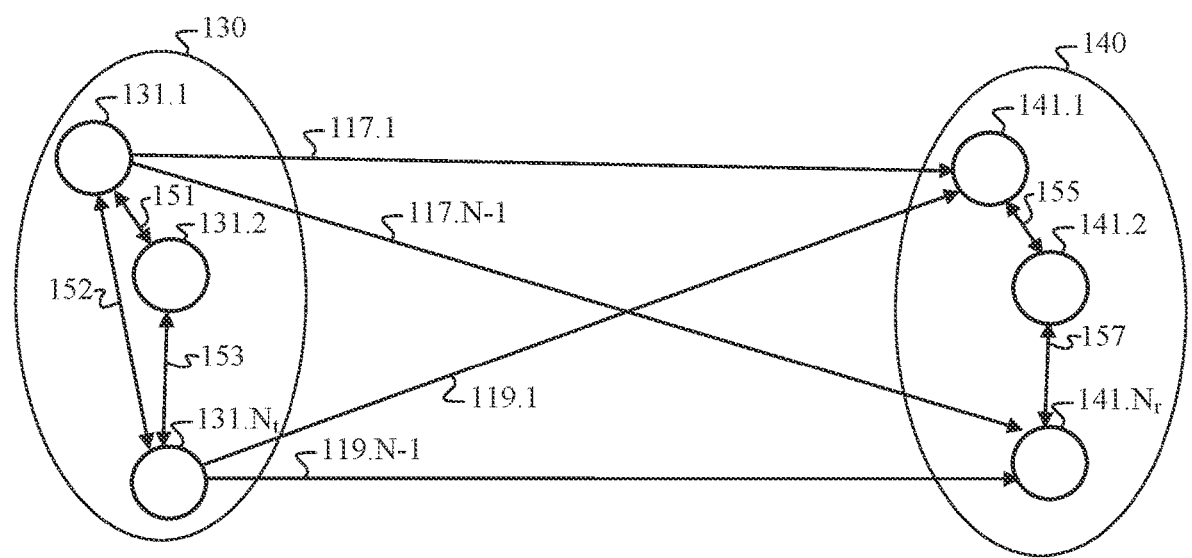
FIG. 10 is a network diagram of a cooperative subspace processing system in accordance with an aspect of the invention.

FIG. 10 is a network diagram of a cooperative subspace processing system in accordance with aspects of the invention. For example, some aspects described with reference to FIG. 1 are depicted in FIG. 10. A method for transmitting data from at least one source node, such as node 131.2, to at least one destination node, such as node 141.2, may comprise employing one or more coding nodes, such as nodes 131.1, 131.N$_t$, 141.1, and 141.N$_r$. In one aspect of the invention, coding nodes on the transmitting side (e.g., nodes 131.1 and 131.N$_t$) are employed. In another aspect, coding nodes on the receiving side (e.g., nodes 141.1 and 141.N$_r$) are employed. In yet another aspect, coding nodes at both sides (e.g., a transmitting group 130 and a receiving group 140) of the link are employed (e.g., nodes 131.1, 131.N$_t$, 141.1, and 141.N$_r$). The aforementioned aspects, as well as other aspects of the invention, may employ intermediate nodes (not shown) in the communication link.

In one aspect depicted in FIG. 10, the source node 131.2 is communicatively coupled to a plurality N$_t$ of transmitting nodes 131.1 and 131.N$_t$. For example, the nodes 131.1-131.N$_t$ may comprise a local group 130 communicatively coupled together via WLAN links 151-153. A plurality of data packets at the source node 131.2 are coupled to one or more of the other nodes (e.g., nodes 131.1 and 131.N$_t$) in the group 130 for transmission to a receiving group 140 that includes the destination node. For example, nodes 131.1 and 131.N$_t$ may transmit signals into a scattering-rich WWAN channel (such as depicted by the channel 99 in FIG. 1). An equivalent network path model for the scattering-rich channel is depicted by network links 117.1, 117.N−1, 119.1, and 119.N−1.

To simplify the discussion of this aspect of the invention, N$_t$ and N$_r$ are equal (denoted by the value N). Another simplification that characterizes this particular aspect is that there are no network paths directly from the source node 131.2 to the receiving group 140, and there are no network paths from the transmitting group 130 that go directly to the destination node 141.2. In other aspects of the invention, the communication scheme may include network paths directly from the source node 131.2 to the receiving group 140 and/or network paths from the transmitting group 130 directly to the destination node 141.2.

The destination node 141.2 may be communicatively coupled to other nodes (e.g., nodes 141.1 and 141.N$_r$) in the receiving group 140. For example, a WLAN (depicted by WLAN links 155 and 157) may couple the destination node 141.2 to other receiving nodes 141.1 and 141.N$_r$, such as to assist the destination node 141.2 in subspace de-multiplexing (i.e., decoding) linear combinations of the signals transmitted from the transmitting group 130.

As depicted in FIG. 10, the receiving node 141.1 receives a linear combination of transmitted signals from network paths 117.1 and 119.1 originating at nodes 131.1 and 131.N$_t$, respectively. The receiving node 141.N$_r$ receives a linear combination of transmitted signals from network paths 117.N−1 and 119.N−1 transmitted by nodes 131.1 and 131.N$_t$, respectively. For example, when the transmissions reside in the same band and time interval, the resulting aggregate signal (i.e., superposition) comprises a linear combination of the transmitted signals, typically referred to as interfering signals. In a MIMO system, subspace demultiplexing (i.e., subspace decoding) may be employed to separate the interfering signals at the receiver. This requires the linear combinations of signals received at nodes 141.1 and 141.N$_r$ to be linearly independent (i.e., uncorrelated). Depending on the type of signaling protocol, the linear combinations may comprise scalar and/or complex coefficients.

In one aspect of the invention, the randomness of a scattering-rich WWAN channel encodes the transmitted signal such that the coefficients of the linear combinations are random. In another aspect of the invention, subspace multiplexing is performed by the transmitting group 130, which may comprise precoding and/or other subspace coding. When the subspace multiplexing coefficients are based on channel measurements, as they typically are when performing precoding, the coefficients of the linear combination are randomly chosen by virtue of the randomness of the channel. In some aspects of the invention, the transmitting group 130 may employ an invertible transform to spread data packets across multiple subcarriers and/or subspaces. Such invertible transforms may include CI transforms, as will be discussed below. A CI transform maps a set of data points with discrete values into a pseudo-random (i.e., statistically random) set of coded data points.

In one aspect of the invention, the coding nodes 131.1, 131.N$_t$, 141.1, and/or 141.N$_r$ are selected to build up the dimension of the subspace spanned by the received coded signals. For example, in a multipath channel, the transmitting nodes 131.1 and 131.N$_t$ may be selected to ensure a set of uncorrelated subchannels (e.g., spatially separated nodes 131.1 and 131.N$_t$ are selected, or the nodes 131.1 and 131.N$_t$ may be provided with different antenna polarizations or directivity). The receiving nodes 141.1 and 141.N$_r$ may be selected to provide a sufficient number (e.g., at least N) of uncorrelated subchannels. In other aspects of the invention, coding nodes may include intermediate nodes (not shown) in the transmission path. The intermediate nodes may be selected to provide sufficient degrees of freedom at the receiving group 140.

In one aspect of the invention, a network comprises one or more source nodes, one or more destination nodes, and one or more coding nodes. The source nodes are configured to transmit a plurality of original data packets. The coding nodes are configured to output linear combinations of the original data packets wherein coefficients of the linear combinations are randomly chosen. The coding nodes are selected to provide a sufficient number of degrees of freedom to enable the one or more destination nodes to decode the linear combinations.

In one aspect of the invention, a vector of subspace coefficients accompanies the linear combinations. For example, pilot tones (and/or other control data) may convey channel information used to encode the data packets. Precoding coefficients may be distributed to the transmitting nodes (e.g., nodes 131.1 and 131.$N_t$) along with coded data. Channel estimates used for decoding may be conveyed by the receiving nodes 141.1 and 141.$N_r$ to the destination node 141.2 along with received linear combinations.

In some aspects of the invention, signals are relayed through the network. The channel of each relay link (i.e., hop) introduces its own channel distortions equally to the data payload and any pilots and/or other signals used to convey the vector of coefficients. For example, the naturally occurring linear combinations produced on each relay link are applied to the data payload and the pilot signals in an OFDM signal. The values of the received pilot tones in an OFDM signal may constitute the vector of coefficients. In other types of signals, overhead signals, such as known sequences used for synchronization and/or known values used for other control purposes, sometimes reside in packet headers. Measurements of these control values at a receiver may constitute the vector of coefficients. At each relay node, the linear combinations applied to the vector of coefficients are the same as the linear combinations applied to the data.

FIG. 11A is a flow diagram illustrating a method for performing cooperative subspace multiplexing in accordance with some aspects of the invention. A plurality of transmitting nodes is selected to receive a plurality of subspace-coded components 1101. A data set (e.g., a data file) is separated into a plurality N of original components 1102, where N equals a number of required degrees of freedom to decode the subspace-coded components. The number N may be determined based on the number of transmitting nodes to which the subspace-coded components will be distributed. An optional step (not shown) may comprise determining a number of the coded components to be distributed to each transmitting node (such as may be determined by each node's storage capacity, processing capability, and/or its number of uncorrelated transmitting antennas). The subspace-coded components are produced 1103 by generating at least N random linear combination of the original components. The coded components and any associated code vectors are distributed to the selected transmitting nodes 1104 such that at least one of the selected transmitting nodes has a number of coded components that is less than the number of required degrees of freedom. The selected transmitting nodes store the coded components and any associated code vectors before transmitting this data. In some aspects of the invention, the selected transmitting nodes comprise edge nodes of a content delivery network.

In one aspect of the invention, selecting the transmitting nodes 1101 comprises selecting one or more nodes nearby a source node in a peer-to-peer network. If a selected node can transmit a unique linear combination of the original data components (relative to the other selected nodes), then that node builds up the dimension of the subspace spanned by the transmitted coded signals until the dimension of the subspace equals the number of the original components. Therefore, in some aspects of the invention, if there are N original components (e.g., step 1102) to be transmitted simultaneously, then at least N coded components comprising unique linear combinations of the original components are generated (e.g., step 1103), such that the transmission subspace is provided with a dimension of at least N. If the dimension of the transmission subspace is greater than the dimension of the subspace spanned by the coded signals (e.g., in a WWAN, if the number of transmitting antennas is greater than the number of original data components), then there is at least one unused dimension in the transmission subspace. This can be regarded as redundancy in the transmission, and, in a wireless network, it may serve to increase gain.

In another aspect of the invention, selecting the transmitting nodes 1101 comprises selecting one or more nodes nearby a destination node in a peer-to-peer network. If each selected node receives a unique linear combination of the original data components and then retransmits its received data to the destination node, then each selected node builds up the dimension of the subspace spanned by the coded signals received at the destination node until the dimension of the subspace equals the number of the original components. In a wireless network, any additional linear combinations of the original data components may be used to increase gain.

In other aspects of the invention, selecting the transmitting nodes 1101 comprises selecting one or more intermediate nodes of the communication path(s) in a peer-to-peer network.

In aspects of the invention, the source node, the transmitting nodes, and/or the channel may encode the original components 1103. For example, the source node and/or the transmitting nodes may provide subspace coding, such as precoding, to the original data components. Nodes in between the source node and the destination node may provide subspace coding, such as by combining received signals and then retransmitting the combined signals. Signals that are transmitted in a wireless channel are typically received by more than one receiver. Thus, if the channel is characterized by rich scattering, then the linear combinations received by different receivers are more likely to be independent. Thus, selected transmitting nodes nearby the destination node employed for receiving signals may forward the received coded signals to the destination node for decoding.

FIG. 11B is a flow diagram illustrating a method for performing cooperative subspace multiplexing in accordance with some aspects of the invention. The method comprises receiving at a node in a peer to peer network, at least one of a set of subspace-coded components 1111 comprising a linear combination of original data components characterized by a number of degrees of freedom required to decode the set of subspace-coded components. The method further comprises receiving at said node, at least one code vector associated with the at least one subspace-coded component 1112; and storing at said node, the subspace coded component(s) and the code vector(s) 1113 to provide a stored set, the stored set having a number of the subspace coded component(s) that is less than the required number degrees of freedom. The method may optionally comprise transmitting the subspace-coded component(s) and the code vector(s) from the node to a destination node 1114, which collects a sufficient number of the subspace-coded components and code vectors to decode the coded components. For example, the destination node may collect the code vectors, which are then used to construct a code matrix. When the rank of the matrix equals the number of original components, then matrix operations employing the collection of code vectors can decode the subspace-coded components. In some aspects of the invention, nodes that store the coded components and the code vectors comprise edge servers in a content delivery network.

In one aspect of the invention, a Cooperative-MIMO system configured to operate in a WWAN efficiently stores data in a distributed manner. For example, multiple components (i.e., original components) of a data set (e.g., a data file) may be transmitted in parallel (i.e., at the same time in the same channel). Each antenna of a receiver receives a single coded piece, which comprises a linear combination of the transmitted components. In a cooperative-MIMO receiver, a plurality of nodes may be configured to cooperatively process received signals. A node with more than one antenna may receive more than one coded piece. For example, if the antennas (specifically, their channels) are not correlated, then each antenna receives a unique linear combinations of the original components. Signals that are correlated may simply be combined, which may provide certain diversity benefits.

With reference to FIG. 11A, in one aspect of the invention, the number of original components in step 1102 is related to the number of spatial subchannels. For example, the number of original components may be less than or equal to the number of uncorrelated spatial subchannels, the number of transmit antennas, and/or the number of receive antennas. In some aspects, higher-quality subchannels (e.g., those associated with greater eigenvalues) may carry more data, such as by employing higher modulation schemes. Thus, multiple coded components may be allocated to a single subchannel.

In one aspect of the invention, the number of wireless nodes selected to store components (e.g., step 1101) may depend on a number of factors, including (but not limited to) the total number of transmit antennas, the number of antennas on each node, the quality of subspace channels, network topology, the number of nodes near the destination node, etc.

In some aspects of the invention, step 1103 may comprise determining a random combination of original components to store at a particular node. In one aspect, the physical wireless channel provides the required statistical randomness for the coding, since temporal and spatial variations of the channel are random. Channel reciprocity (i.e., radio waves propagating in both directions of a radio link between a pair of transceivers experience the same multipath channel distortions at the same time and frequency), may be exploited by the transceivers at opposite ends of a wireless link to agree on a random code, which depends on their common channel. For example, each transceiver may estimate the common channel from known control signals (such as pilot tones in an OFDM signal) received from the other transceiver. Thus, in some aspects, the code vector can be determined from channel estimation.

In one aspect of the invention, there is no coordination between the selected nodes to decide which nodes store which components of the file. Rather, in a wireless network, each node's channel(s) may determine what combination(s) of components it receives.

In some aspects of the invention, a central controller is not required to maintain a state of the contents of all the nodes and differentiate between the nodes. A selected node may not know exactly what the other selected nodes have stored. For example, each node can estimate its own channel, from which it derives information about the linear combination(s) that it receives. However, if the node's channel is not correlated with any other node's channel, the node cannot directly estimate channels employed by the other nodes. Thus, the node does not know what linear combinations other nodes receive unless that information is shared by the other nodes.

In some aspects, the selected nodes do not coordinate for storing components. Rather, a destination node or a WLAN controller accesses the selected nodes to download the linear combinations and channel estimates (e.g., subspace weights) until a sufficient amount of information is obtained to decode the coded components. The destination node completes its download once it has enough information to recover the original components of the data set.

FIG. 11C is a diagram depicting processing methods and processing devices in accordance with aspects of the invention. A file is partitioned into a plurality of original components in processing block 1121. Each original component may comprise one or more data packets. In processing block 1122, each of a plurality of nodes in a peer-to-peer network is assigned to receive one or more of the original components and/or subspace-coded versions of the components. In processing block 1123, subspace-coded components and the associated subspace code vectors are generated. The components and, optionally, their subspace code vectors are distributed to the assigned nodes (from block 1122) 1124.

In processing block 1122, the nodes assigned to receive the components may be selected based on their locations in the network. In one aspect of the invention, nodes that are nearby a source node are selected as transmitting nodes. In another aspect, nodes nearby the destination node are selected as receiving nodes. Since these so-called receiving nodes convey their received signals to the destination node, they may be referred to as transmitting nodes. In other aspects, intermediate nodes are selected to the components.

In block 1122, the number of components assigned to each peer may be related to a combination of various factors, including (but not limited to) the bandwidth to the peer (which may include subchannel quality and the number of subchannels), the bandwidth from the peer to the destination node, and the peer's storage and/or processing capability.

In processing block 1123, code vectors may be generated from channel measurements. For example, pilot tones and/or other known signals accompanying a data transmission may be used to estimate the channel. When coding comprises the effects of scattering, then the code vector may comprise channel estimates. When precoding is performed, and the precoding is based on channel measurements, then a receiver may employ channel estimates to estimate the precoding values. In some aspects, handshaking between two peers may be employed to determine code vectors. For example, such handshaking is commonly used to ensure key match by two parties employing the randomness in the channel for key generation. In other aspects, a transmitter may employ a code matrix based on an invertible transform, such as a CI transform.

In block 1123, each coded component $r_{n_r}$ received at an $n_r^{th}$ node may be expressed by $$r_{n_r} = \sum_{i=1}^{k} \alpha_{n_r,i} x_i$$

where the coefficient $\alpha_{n_r,i}$ denotes the $i^{th}$ random coefficient corresponding to the $n_r^{th}$ assigned node, and $x_i$ is the $i^{th}$ original component. The set of coefficients $\alpha_{n_r,i}$, i={1, ..., k} is regarded as the $n_r^{th}$ subspace code, or subspace code vector.

In some aspects of the invention, block 1123 precedes block 1124. In one aspect, signals distributed to an assigned node comprise transmitted original components that are linearly coded by the communication channel. For example, the source node may comprise an antenna array for transmitting the original components to the assigned nodes. However, in order to achieve this linear coding and ensure the codes are uncorrelated, the transmitters and receivers are selected to provide uncorrelated subchannels.

In another aspect of the invention, block 1124 may precede block 1123. The coefficients $\alpha_{n_r,i}$ may comprise subspace antenna array weights, such as precoding weights, distributed to the assigned nodes. The assigned nodes may then apply the weights to the original components and/or previously coded components to generate coded components. In one aspect of the invention, the subspace code vector and the coded components are generated (1123) by scattering in the channel after the original components (and/or previously coded components) are distributed (1124) to the assigned nodes.

In one aspect of the invention, the coded components and/or original components are stored at their assigned nodes, which do not transmit the data until directed to do so. The recipient(s) of the transmitted data may comprise other coding nodes and/or the destination node.

Processing blocks 1131-1133 depict a method for decoding the file that was encoded and distributed to a plurality of nodes, such as in the manner described with respect to processing blocks 1121-1124. In processing block 1131, code vectors are collected from at least one peer. The coded components may also be collected in this step 1131, or in a subsequent step 1132 and/or 1133. In processing block 1132, a determination is made if a sufficient number of linearly independent code vectors have been collected to decode the coded components. If a sufficient number of code vectors have been collected, then decoding is performed (i.e., processing block 1133). If not, then more code vectors may be selected (e.g., control returns to block 1131).

In accordance with one aspect of the invention, processing block 1132 may provide for assembling the collected code vectors as a matrix. The matrix may comprise a $$\left(\left(\sum\nolimits_{n=1}^{n_r} k_n\right) \times N\right)$$

matrix wherein $k_n$ is the number of coded components stored at an $n^{th}$ peer, $n_r$ is the number of peers, and N is the number of original components.

In one aspect, a determination is made regarding whether the dimension $$\sum\nolimits_{n=1}^{n_r} k_n$$

is sufficient to decode the coded components collected from the peers. For example, if $$\left(\sum\nolimits_{n=1}^{n_r} k_n\right) = N,$$

then it may be possible to decode the N equations (e.g., the coded components) having N unknowns (i.e., the original components). Processing block 1132 may be configured to calculate the rank of the matrix. For example, if the rank=N, then the matrix may be diagonalized.

Processing block 1132 may be configured to determine how well-conditioned the matrix is. For example, the eigenmodes may be evaluated, which may comprise calculating the corresponding eigenvalues. If the matrix is sufficiently well-conditioned, then decoding 1133 is performed. In some aspects of the invention, a requirement for what constitutes well-conditioned may depend on the SNR of the received signals. Thus, block 1132 may provide for measuring SNR (or some similar measure of link quality), determining a threshold of what constitutes a well-conditioned matrix (e.g., threshold eigenvalues), and then determining if the matrix is sufficiently well-conditioned to decode the subspace-coded components. If the matrix is not sufficiently well-conditioned, block 1132 may discard one or more highly correlated code vectors (and the associated coded component(s), if relevant), or combine at least some of the correlated code vectors. Then control passes back to block 1131, whereby one or more additional code vector(s) are collected.

In some aspects of the invention, block 1131 comprises adaptive array processing to dynamically select (and/or de-select) transmitting and/or receiving antennas, such as to increase the rank and/or improve the conditioning of the channel matrix, H. Such array processing may comprise changing the number N of simultaneously transmitted original components. In cooperative-MIMO processing, adaptive array processing may comprise dynamically selecting and/or de-selecting peers (transmitting nodes and/or receiving nodes) employed to perform cooperative subspace processing. Adaptive array processing may include changing the antenna array weights at the transmitting and/or receiving array, such as to change the rank and/or improve the subspace channels. When the processing of block 1131 is repeated, block 1131 may provide for selecting code vectors (and, thus, coded components) from new nodes.

In some aspects of the invention, upon failure of the destination node (or its cooperative receiving nodes) to acknowledge transmitted packets, the packets are retransmitted. In response to the requirement to retransmit the data, the source node may adapt the subspace processing provided to the transmitted signals (such as by providing adaptive array processing). If a wireless channel is employed in the link, and the delay between transmission and retransmission is equal to or greater than the wireless channel's coherence time, then new linear combinations of the original components are generated. Thus, block 1131 may collect new code vectors from the same nodes, which are then processed with previously received code vectors in block 1132.

Figure 12:
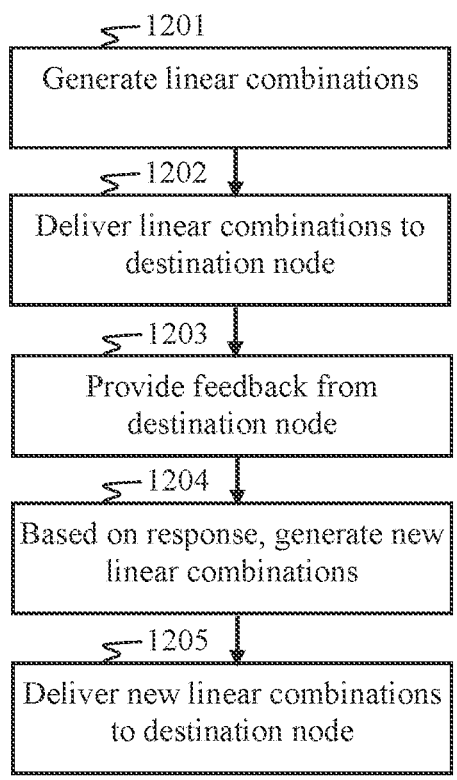
FIGS. 12, 13, and 14 are flow diagrams depicting subspace processing methods in accordance with aspects of the invention.

FIG. 12 is a diagram depicting processing methods and processing devices in accordance with aspects of the invention. In a network, a method of transmitting data from a source node to a destination node comprises forming linear combinations of original packets from a source node to produce subspace-coded packets (processing block 1201), and delivering the subspace-coded packets to the destination node over one or more network paths (processing block 1202). The destination node transmits feedback (such as acknowledgements) back to the source node (processing block 1203). Based on the responsiveness of the destination node (which includes a failure to respond), the source node causes new linear combinations of the original packets to be formed (processing block 1204) to generate new subspace-coded packets, and delivers the new subspace-coded packets to the destination node (processing block 1205).

In one aspect of the invention, a cooperative-MIMO system is employed whereby cooperating nodes are configured to perform subspace processing, such as subspace multiplexing (e.g., on the transmitting side of a link) and/or subspace demultiplexing (e.g., on the receiving side of a link). The processing block 1201 may perform array processing, such as selecting antennas of a fixed array and/or nodes of a cooperative-MIMO array to transmit signals in a wireless channel. The block 1201 may select subspace antenna weights for encoding the transmitted signals.

In some aspects of the invention, parallel transmissions in a multipath channel produce random combinations of the transmitted signals. In one aspect, precoding applied to the transmitted signals may be selected such that propagation in the multipath channel provides at least some degree of decoding. In such aspects, the channel (and, thus, processing block 1202) does not encode the transmitted signals.

In one aspect of the invention, block 1203 comprises providing acknowledgements from the destination node to the source node upon receipt of a container packet (i.e., coded packet, which effectively encapsulates the original packets) and/or upon decoding the encapsulated packets (i.e., the original packets), such as described in the '854 application, which is incorporated by reference in its entirety. In another aspect of the invention corresponding to block 1203, feedback from the destination node may comprise control signals (e.g., pilot tones), which are employed by the source node for channel estimation, and, subsequently, encoding the original packets. In accordance with some aspects of the disclosure, adaptive array processing performed by at least the source node relies on feedback from the destination node, such as to select an appropriate subspace dimension and/or optimize the subspace channels.

With reference to block 1204, adaptive array processing at the transmit side of the link may reselect the transmitting nodes, add new nodes, and/or adapt precoding and/or antenna array weights. This generates new subspace codes, thus providing new linear combinations of the original packets. In some aspects, block 1204 may comprise performing adaptive array processing at the receive side of the link. At the receive side, cooperating receiver nodes may be reselected and/or added. In some aspects, the antenna array weights and/or other subspace coding weights at the receive side may be adapted. Thus, adaptive array processing in a cooperative network may comprise adapting the degrees of freedom spanned by the subspace signals.

In one aspect of the invention, the receiver may convey to the transmitter how many degrees of freedom it has received and/or is capable of receiving. This technique can be used to select the number of transmitting antennas ($M_t$) and/or receiving antennas ($M_r$) in a cooperative-MIMO system. Similarly, communicating information about degrees of freedom in either or both directions in a link can be used to select transmitting and/or receiving nodes in a cooperative-MIMO system. In some aspects of the invention, the source node may respond to feedback (including the absence thereof) from the destination node by transmitting new linear combinations of the original packets.

As described with respect to FIG. 7, the network links 117.1, 117.N–1, 119.1, and 119.N–1 depicted in FIG. 10 may comprise two or more different WANs.

Figure 13:
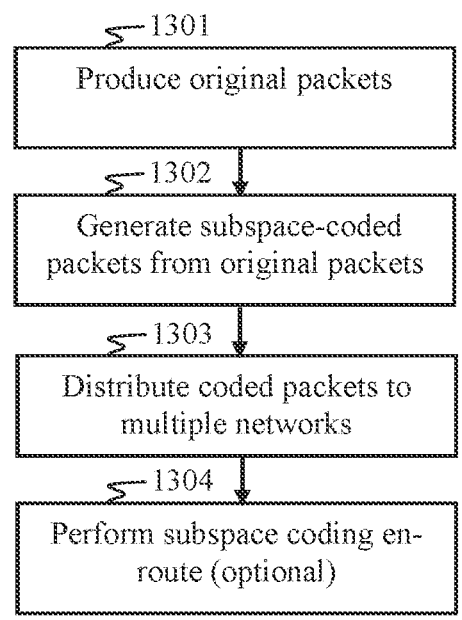

FIG. 13 is a diagram depicting processing methods in accordance with aspects of the invention. In one aspect of the invention, a communication device comprises at least a first WAN interface configured for communicating in a first WAN, and has access to a second WAN interface configured for communicating in a second WAN, the first WAN being different than the second WAN. A network controller (such as a processor) manages data transfer between the communication device and a destination node using multiple different network routes, such as the first WAN and the second WAN. The network controller may be configured to perform the steps shown in FIG. 13.

In accordance with one aspect of the invention, the network controller produces a plurality of original packets 1301 to be transferred to the destination node. A plurality of subspace-coded packets is generated 1302 from the original packets by employing subspace coding to linearly combine the original data packets. The coded packets are distributed across the plurality of different WANs to the destination node 1303. Optionally, additional subspace coding may be provided to the coded packets while they are en-route to the destination node 1304.

In one aspect of the invention, the number of original packets is selected to be less than or equal to the total dimension of the subspace between the source and destination nodes. For example, the total dimension of the subspace may equal the sum of subspaces in each of the different WANs. The total dimension of the subspace may be used to select subspace codes. In some aspects, the dimensions of subspaces in one or more of the different networks may be used to select subspace codes. For example, in one aspect, first subspace code(s) corresponding to a first WAN may encode a first set of packets, and second subspace code(s) corresponding to a second WAN may encode a second set of packets. Furthermore, a universal code(s) may be employed for encoding values transmitted over both first and second WANs. In such an aspect, one or more receivers at the destination would perform WWAN-specific subspace decoding and universal subspace decoding.

In some aspects of the invention, step 1302 comprises generating subspace codes corresponding with the subspace coded packets. In step 1303, the subspace codes may be distributed with the coded packets. In some aspects of the invention, step 1302 and/or 1303 comprises selecting at least one set of transmitting nodes, coding nodes, and/or receiving nodes to cooperatively perform subspace coding. Such selection(s) may depend on the dimension of the codes (and the coded packets). In some aspects of the invention, the selection(s) may be based on adaptive array processing algorithms, which may adapt either or both the number of nodes and the subspace codes based on the degrees of freedom at the receiver.

In some aspects of the invention, if packets are lost or the bit-error rate is high, it may be desirable to decrease the transmission rate, such as by removing one or more low-quality subchannels, adapting the coding to increase the processing gain, or otherwise introducing more redundancy in the transmitted information.

In one aspect of the invention, subspace codes are generated at the destination node. In another aspect of the invention, subspace codes are generated by a plurality of transmitting nodes communicatively coupled to the source node. In another aspect of the invention, subspace codes are generated by transmitting a plurality of known signals from a transmitting array through a scattering-rich channel to a receiving array. In another aspect of the invention, a MIMO processor coupled to a receiving array is configured to produce subspace codes. Subspace codes may be produced and/or modified by intermediate nodes in a link between the source node and the destination node.

Since subspace multiplexing and subspace demultiplexing are coordinated between the source and destination node (respectively), different networks may be employed simultaneously without requiring those networks' servers to coordinate data transfers with each other.

Figure 14:
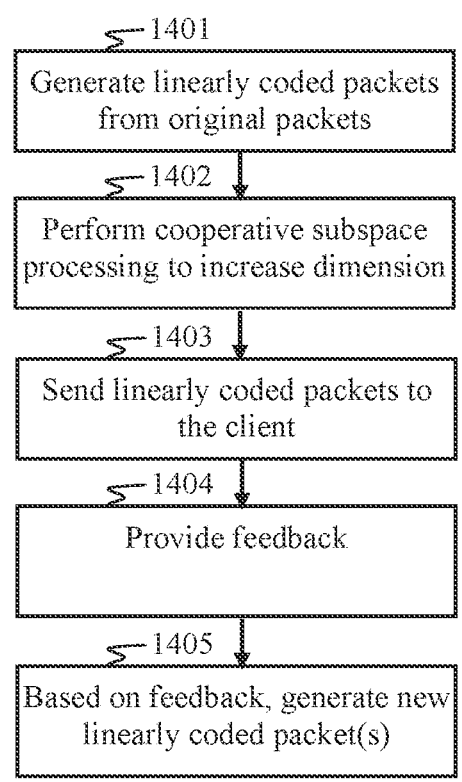

FIG. 14 is a diagram depicting processing methods in accordance with aspects of the invention. In one aspect of the invention, a method for transmitting a file between a server and a client through one or more network paths comprises generating a plurality of linearly coded packets from a plurality of original packets 1401, and performing cooperative subspace processing to increase a dimension of a subspace spanned by the linearly coded packets 1402. The linearly coded packets are sent to the client 1403, which, upon reception of at least one of the coded packets, provides feedback to the server 1404. Based on the feedback, new linearly coded packets may be transmitted to the client 1405.

In one aspect of the invention, the linearly coded packets are generated 1401 as linear combinations of the original packets. If a scattering channel is employed (directly or indirectly) for generating coefficients of the linear combinations, then such linear combinations may be random. In other aspects, a deterministic process may be employed for generating the coefficients. The deterministic process may employ an invertible transform characterized by a mapping of original data packets into a set of pseudo-random coded packets.

In processing block 1402, cooperative subspace processing is performed by a plurality of nodes to build the dimension of the subspace spanned by the linearly coded packets. For example, the plurality of nodes may cooperate to produce parallel (i.e., simultaneously transmitted) transmissions of the coded packets. In one aspect, the plurality of nodes is selected to receive a plurality of coded packets (e.g., precoded packets) from the server (e.g., a source node) and then simultaneously transmit the coded packets to the client (e.g., a destination node). In another aspect, the plurality of nodes is selected to receive the original packets and then encode the original packets to produce the coded packets before coordinating a simultaneous transmission of the coded packets to the client. In another aspect, the plurality of nodes comprises multiple transmitting nodes selected to transmit original packets and/or coded packets into a multipath channel, which linearly encodes the transmitted packets. In another aspect, the plurality of nodes comprises one or more intermediate nodes between the server and the client, the intermediate node(s) configured to receive and retransmit the coded packets. Intermediate nodes may optionally provide additional linear coding to the packets they receive. In other aspects, the plurality of nodes comprises one or more receiving nodes communicatively coupled to the client and configured to cooperatively receive transmitted coded packets and forward the received packets to the client. In such aspects, the receiving node(s) are selected to build the dimension of the subspace of signals received by the client. In some aspects of the invention, processing blocks 1401 and 1402 may be combined.

In some aspects of the invention, the processing block 1403 comprises sending the linearly coded packets to the client over a plurality of different networks. In these aspects, packets to be transmitted are distributed over the different network paths. Subspace multiplexing (e.g., coding) may comprise interleaving the coded packets over the different networks, and subspace de-multiplexing (e.g., decoding) may comprise collecting the coded packets received from the different networks, followed by a combining process in which the received coded packets are combined and decoded to retrieve the original packets.

In some aspects of the invention, interleaving the linearly coded packets to the client over a plurality of different networks may comprise network load balancing (e.g., bit loading) the multiple channels employed in the link, such as distributing more packets to channels able to support higher bandwidth and fewer packets to channels that support relatively lower bandwidth. In some aspects of the invention, these channels may comprise channels on different networks (e.g., WANs), such as channels employed by block 1403.

In block 1404, upon reception of any of the coded packets at the client, the client may provide feedback. For example, the client may transmit an acknowledgement to the server upon retrieving each of the original packets after decoding the received coded packets. However, as described in the '879 application (which is incorporated by reference in its entirety), the coded packets encapsulate the original packets, thus concealing header information in the original packets. Thus, the coded packets may comprise their own headers and employ different protocols than those used with the original packets.

Different acknowledgement protocols may be employed depending on the message layer (i.e., original packet, and coded (or encapsulating) packet). For example, TCP may be employed for the original packet, whereas the acknowledgement mechanism employed with the coded packets may be similar to mechanisms employed to coordinate adaptive antenna array processing. As mentioned in the '107 application (which is incorporated by reference in its entirety), latency can severely impede TCP. Thus, in links with high latency, such as satellite links, it is common to automatically transmit TCP acknowledgements whether packets are received or not, and then utilize a different type of transmission control protocol that tolerates latency. In aspects of the invention, the receiver, or even the transmitter, may automatically send acknowledgements for each transmission, thus, effectively short-circuiting the TCP mechanism. Then any of the adaptive array mechanisms employed in MIMO may be used as a substitute control protocol.

In processing block 1405, based upon the feedback, the server (and/or any intermediate nodes) may transmit at least one new linearly coded packet to the client. For example, absence of an acknowledgement after a predetermined amount of time may trigger retransmission of the coded packet(s).

In some aspects of the invention, network load balancing may be employed for distributing data loads across different network channels. For example, when data is to be interleaved over multiple channels (e.g., subchannels and/or network channels, including network channels in different networks), bit loading may be employed for loading more data into higher-bandwidth channels and less data into lower-bandwidth channels. In related discussions, more error correction (such as lower code rates) may be employed in lower-quality channels, which essentially reduces the amount of information transmitted in those channels. With respect to subchannels, more data may be loaded on subchannels with higher eigenvalues, such as discussed above. Various techniques for distributing data over multiple channels with respect to the effective channel bandwidth are described throughout the '107 application, which is incorporated by reference in its entirety. Similarly, reliability assessments of all the individual channels (which may be based on BER, SNR, and/or other qualitative measures of a channel) may provide a basis for allocating processing resources, such as the number of nodes employed to perform subspace processing.

FIG. 15A is a diagram depicting processing methods in accordance with aspects of the invention. In one aspect of the invention, a method is provided to manage data interleaving in a communication network that simultaneously employs multiple network channels to transmit data from a source node to a destination node. As used herein, a network channel may comprise a user channel separated from other user channels by at least one of the following multiple-access schemes: frequency division multiple access (e.g., OFDMA), time division multiple access (TDMA), and code division multiple access (e.g., CDMA). For example, a first CDMA channel may be encoded with a first Walsh code and a second CDMA channel may be encoded with a second Walsh code, wherein the first and second Walsh codes are orthogonal to each other. In the '107 application, which is incorporated by reference in its entirety, the user channels are also referred to as physical channels. If the first and second Walsh codes are orthogonal, then the first user channel is a network channel, and the second user channel is a different network channel. In one aspect of the invention, the multiple network channels may comprise a plurality of different networks, such as depicted in FIG. 7.

In one aspect of the invention, multiple network channels are established 1501 to provide a connection from a single source node to each of at least one destination node. At least one real-time property of each network channel is monitored 1502. Subspace processing is performed to interleave data across the network channels 1503. Based on variations of the monitored property (or properties), network load balancing (e.g., bit loading, or interleaving) may be adjusted 1504.

As described above with respect to FIG. 7, processing block 1501 may employ multiple network technologies (e.g., different WANs) to simultaneously transmit data from a source node to a destination node. In some aspects, the processing block 1501 interleaves data across different non-interfering user channels.

In processing block 1502, at least one channel quality parameter is measured and/or determined for each of the network channels. For example, BER, probability of error, SNR, and/or any other quality metric may be determined.

In processing block 1503, subspace processing may comprise subspace coding to spread data across the non-interfering network channels. Optionally, one or more of the network channels may comprise a plurality of subspaces. In one aspect, the subspace-coded data is distributed across the network channels such that the destination node needs to receive coded data from a plurality of the network channels in order to have a sufficient number of degrees of freedom to decode the received data. In another aspect of the invention, subspace processing 1503 comprises de-multiplexing the received subspace-coded data.

In some aspects of the invention, subspace processing 1503 comprises employing a plurality of transmitting nodes to cooperatively perform subspace processing, such as described above. In such aspects, selecting the cooperating transmit nodes may effectively build the dimension of the subspace of the transmitted signal. In some aspects of the invention, subspace processing 1503 comprises employing a plurality of receiving nodes to cooperatively perform subspace processing, such as described above. In such aspects, selecting the cooperating receiving nodes may effectively build the dimension of the subspace of the received signal. In some aspects of the invention, a local group of cooperating nodes may provide a source and/or destination node with access to network interfaces, and, thus, network channels that it would otherwise not have.

In processing block 1504, multiple network channels may be employed for transmitting data from a single source node to a single destination node. For example, in one aspect of the invention, a source node (e.g., one of the nodes 701-706 shown in FIG. 7) may employ at least one other node to simultaneously provide multiple network channels that reside on different networks (e.g., networks 716, 717, and 719) for communicating a data stream to a destination node. Similarly, one of the nodes 701-706 may employ the multiple network channels for receiving a data stream from a remote source. In some aspects of the invention, the servers in the networks 716, 717, and 719 are not required to coordinate with each other to manage data flows on the network channels to/from any of the nodes 701-706. Rather, each node (e.g., any of the nodes 701-706) having a WAN interface manages its own connection(s) with its respective network(s) (e.g., networks 716, 717, and 719). The source/destination node amongst the nodes 701-706, or one of the nodes 701-706 configured to function as a network controller manages data flow across the network channels. Such management may comprise selecting and/or adapting data interleaving (e.g., bit loading, network load balancing) across the network channels. Channels that can support higher data rates may be allocated more coded data than channels that support only lower data rates.

FIG. 15B is a diagram depicting processing methods in accordance with aspects of the invention. In one aspect of the invention, a method is provided to manage quality of service in a node, such as a mobile wireless device. In the mobile wireless device, an application service connection is established 1511 between an application processor and a remote device through a wireless communication network. A transceiver monitors at least one real-time property 1512 of a radio frequency access link between the mobile wireless device and the wireless communication network. The transceiver provides the application processor with updated values of the monitored at least one real time property 1513 of the radio frequency access link. The application processor adjusts packet data generation in response to the updated values 1514 to manage a quality of service property of the application service connection.

In one aspect of the invention, establishing the connection 1511 comprises employing a plurality of nodes to establish a plurality of network channels and/or subchannels. The real-time property that is monitored 1512 may comprise a channel estimate, a data rate, a BER, an SNR, and/or any other link-quality metric.

In some aspects of the invention, processing block 1514 may comprise adaptive array processing, which is sometimes performed in coordination with monitoring link quality 1512. In some aspects of the invention, processing block 1514 may comprise performing network load balancing (e.g., bit loading across network channels) when multiple network channels are employed, and/or bit loading across subchannels when multiple subchannels are employed.

In some aspects of the invention, block 1514 may comprise adjusting subspace coding. If the node is a receiving node (e.g., a destination node), the receiver may adjust the rate over each network channel by the way it responds to receiving packets. For example, sending acknowledgements (or failing to send acknowledgements) can change the data rates. This can also affect the coding and redundancy of the data transmissions.

Figure 16:
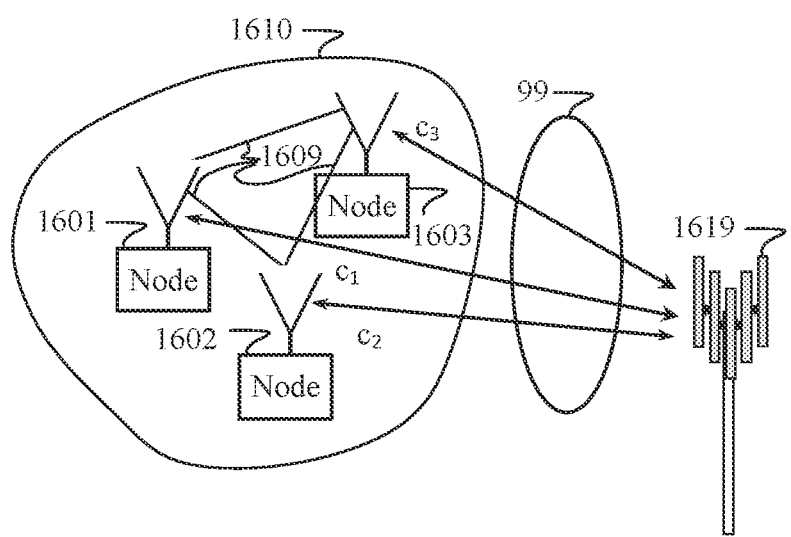
FIG. 16 is a block diagram of a cooperating group of nodes employing a plurality of different code spaces for communicating in a wide area network according to aspects of the invention.

FIG. 16 is a block diagram depicting communications between a WWAN node 1619 and a cooperating group of nodes 1610 (such as a plurality of wireless terminal nodes 1601-1603) employing a plurality of different, yet complementary, code spaces $c_1$, $c_2$, and $c_3$. In one aspect of the invention, the term complementary means that the coded transmissions corresponding to the code spaces $c_1$, $c_2$, and $c_3$ can sum to produce at least one predetermined WWAN coded data sequence. This may be a weighted sum (i.e., a random linear combination), such as due to the given channel 99 conditions. A predetermined WWAN coded data sequence may employ a code that would ordinarily (in view of the prior art) be employed in whole. That is, it would not ordinarily be partitioned into sub-codes to be transmitted by different transmitters or received by different receivers.

In one aspect of the invention, the code spaces $c_1$, $c_2$, and $c_3$ correspond to direct-sequence codes, such as may be used to provide for spreading and/or multiple access. A superposition of signals transmitted across the code spaces $c_1$, $c_2$, and $c_3$ may provide at least one predetermined WWAN coded data sequence received by at least one WWAN node 1619. Similarly, a superposition of signals received by nodes 1601-1603 and mapped onto the code spaces $c_1$, $c_2$, and $c_3$ may provide at least one predetermined WWAN coded data sequence that would ordinarily (in view of the prior art) be intended for a single node 1601-1603. Some aspects of the invention may provide for channel corrections (e.g., pre-distortion and/or receiver-side channel compensation) by either or both the cooperating group 1610 and the WWAN node 1619. Accordingly, the code spaces $c_1$, $c_2$, and $c_3$ may be adapted to account for channel conditions.

In another aspect of the invention, the code spaces $c_1$, $c_2$, and $c_3$ may correspond to direct-sequence codes having predetermined spectral characteristics. It is well known that different time-domain data sequences may be characterized by different spectral distributions. Some aspects of the invention may provide for selecting complementary codes $c_1$, $c_2$, and $c_3$ having predetermined spectral characteristics with respect to WWAN channel conditions affecting the links between the nodes 1601-1603 and the WWAN node 1619. Thus, in some aspects, the codes $c_1$, $c_2$, and $c_3$ may be selected according to the same criteria employed for selecting OFDM subcarriers.

A direct-sequence code may comprise a pseudo random noise code, such as is known in the art. Pseudo-random noise is a deterministic set of values or signals that satisfies one or more tests for statistical randomness. A direct sequence code may comprise an orthogonal code, such as a Walsh code, such as is known in the art. Direct sequence is a type of signaling in which each data symbol is modulated (or otherwise impressed) onto (or represented by) a sequence of code symbols. Thus, information about each data symbol resides on a plurality of coded data symbols. In this respect, each data symbol is "spread" across multiple code symbols, and the resulting coded data symbols are transmitted in sequence. Furthermore, each coded data symbol may contain information about a plurality of data symbols.

A receiver that receives the sequence of coded data symbols may decode the received signals if it knows the direct-sequence code and if a sufficient number of the coded data symbols are received. In one aspect of the invention, if $M_t$ code spaces $c_1, c_2, \ldots, c_{Mt}$ comprise $M_t$ linear combinations of up to $M_t$ data symbols, then the coded transmissions provide a sufficient number of degrees of freedom for decoding the data symbols. In another aspect, the code spaces $c_1, c_2, \ldots, c_{Mt}$ may indicate codes produced by an invertible transform. In some instances, if the number of coded data symbols is less than the number of data symbols, decoding produces a certain amount of inter-symbol interference that can be corrected.

The distribution of the inter-symbol interference to each estimated data symbol can depend on the type of coding employed. In some aspects, of the invention, CI codes may be employed, such as described in U.S. Patent Application Publication No. 20040086027, which is incorporated by reference in its entirety. The '107 application incorporates by reference U.S. Patent Application Publication Nos. 20040086027 and 20030147655, which are hereby incorporated by reference in their entireties. CI codes may comprise either or both block-type codes and sliding transform codes. Block codes often uniformly distribute inter-symbol interference due to each data symbol across all the other data symbols encoded by the block code, whereas sliding transform codes may non-uniformly distribute inter-symbol interference of each data symbol across the other symbols in the sliding transform window.

In one aspect of the invention, transmitting a sequence of symbols into a multipath channel produces a sliding transform of those symbols. A random channel produces a random sliding transform. For example, in a multipath channel, some paths are longer (and, thus, introduce more delay) than other paths. Inter-symbol interference occurs when earlier-transmitted symbols arrive at a receiver at the same time that later-transmitted symbols are received. In some aspects of the invention, the length of this sliding transform window equals the delay spread of the channel.

In some aspects, the coding window may be the number of resolvable multipath delays. A time-domain receiver typically employs a Rake receiver having a number of taps. For example, the number of Rake taps in an efficient receiver may equal the number of resolvable delays. The coding window may be increased by employing a larger number of transmitters and/or receivers. Increasing the coding window may comprise increasing the number of transmit and/or receive directions. In some aspects, the angle of the transmitted and/or received signals may be increased. In multipath environments, paths received at higher angles relative to line-of-sight (i.e., zero incidence) between a transmitter and receiver often have greater delays than paths received closer to the line-of-sight.

In another aspect of the invention, a sliding window transform is synthesized by a transmitter, such as by deliberately time-offsetting signals transmitted from antennas of an array. In such aspects, one or more of a node's transmissions may be provided with time-varying complex weights (e.g., amplitudes and/or phases), such as described in S. A. Zekavat, C. R. Nassar and S. Shattil, "Combined Directionality and Transmit Diversity via Smart Antenna Spatial Sweeping," proceedings of 38$^{th}$ *Annual Allerton Conference on Communication, Control, and Computing, University of Illinois in Urbana-Champaign*, pp. 203-211, Urbana-Champaign, IL, USA, October 2000, S. A. Zekavat, C. R. Nassar and S. Shattil, "Smart antenna spatial sweeping for combined directionality and transmit diversity," *Journal of Communications and Networks (JCN), Special Issue on Adaptive Antennas for Wireless Communications*, Vol. 2, No. 4, pp. 325-330, December 2000, and S. A. Zekavat, C. R. Nassar and S. Shattil, "Merging multi-carrier CDMA and oscillating-beam smart antenna arrays: Exploiting directionality, transmit diversity and frequency diversity," *IEEE Transactions on Communications*, Vol. 52, No. 1, pp. 110-119, January 2004, which are incorporated by reference herein.

In some aspects of the invention, a Rake receiver performs sliding-transform processing. For example, a $k^{th}$ direct-sequence transmission signal $s^k(t)$ that includes N code symbols $\{b^k[n]\}_{n+1}^N$ is given by:

$$s^k(t) = \sum_{n=0}^{N-1} b^k[n] g_{T_b}(t - nT_b) g_\tau(t) a^k(t - iT_b) \cos(2\pi f_c t)$$

where $$a^k(t) = \sum_{i=0}^{G-1} C_i^k g_{T_c}(t - iT_c), C_i^k$$

is the Direct Sequence spreading signal, G represents processing gain, $T_c$ is the chip duration, $T_b$ is the bit duration, and $g_{T_c}(t)$, $g_{T_b}(t)$, and $g_\tau(t)$ represent the chip, bit, and transmitted pulse shapes, respectively.

A plurality M of nodes linked together by a WLAN comprises elements of an M-element antenna array capable of receiving K transmission channels. In a frequency-selective channel, the received signal at the array is:

$$r(t) = \sum_{k=1}^{K} \sum_{l=0}^{L^k-1} \sum_{n=0}^{N-1} \alpha_l^k \vec{V}(\vartheta_l^k) b_k[n] g(t - \tau_l^k - nT_b) \cos(2\pi f_c t + \varphi_l^k) + \upsilon(t)$$

where $\vec{V}(\vartheta)$ is an array-response vector, K is the number of received transmission channels, $L^k$ is the number of distinct fading paths corresponding to the $k^{th}$ user, $\alpha_l^k$ is the fade amplitude associated with path l and user k, $\varphi_l^k = U[0,2\pi]$ represents the associated fade phase, $\tau_l^k$ is the path time-delay (which occurs below a predetermined duration threshold $T_{max}$), and $\vartheta_l^k$ denotes angle of arrival. The array response vector $\vec{V}(\vartheta)$ is expressed by:

$$\vec{V}(\vartheta) = [1 e^{-2\pi d_1 \cos\vartheta/\lambda} \ldots e^{-2\pi d_M-1 \cos\vartheta/\lambda}]$$

where $d_m$ is the antenna separation, and k is the wavelength corresponding to carrier frequency $f_c$.

For a $j^{th}$ user's $l^{th}$ path, the $n_{th}$ bit at the beamformer output is given by:

$$z_l^j[n] = W^H(\vartheta_l^k) \int_{+(n-1)T_b}^{+nT_b} r(t) \cos(2\pi f_c t + \varphi_l^j) a^j(t - \tau_l^j - (n-1)T_b) dt$$

where $W(\vartheta_l^k)$ is the weighting vector of the beamforming system. $z_l^k[n]$ can be expressed by four components:

$$z_l^k[n] = S_l^j[n] + ISI_l^j[n] + IXI_l^j[n] + \upsilon_l^j[n]$$

where S is the desired signal, ISI is inter-symbol interference, IXI is cross interference (i.e., multiple-access interference), and v is the AWGN contribution. These components can be expressed as follows:

$$S_l^j[n] = \alpha_l^j W^H(\vartheta_l^j) \vec{V}(\vartheta_l^j) b^j[n] G$$

$$ISI_l^j[n] = \sum_{\substack{h=0 \\ h \neq l}}^{L^k-1} \sum_{n=0}^{N-1} \alpha_l^k W^H(\vartheta_h^j) \vec{V}(\vartheta_l^j) b^j[n] \cos(\varphi_h^j - \varphi_l^j) R_{jj}(\tau_h^j - \tau_l^j - nT_b)$$

$$IXI_l^j[n] = \sum_{\substack{k=1 \\ k \neq j}}^{K} \sum_{\substack{h=0 \\ h \neq l}}^{L^k-1} \sum_{n=0}^{N-1} \alpha_l^k W^H(\vartheta_h^j) \vec{V}(\vartheta_l^k) b^j[n] \cos(\varphi_h^k - \varphi_l^j) R_{kj}(\tau_l^j - \tau_h^k - nT_b)$$

$$\upsilon_l^j[n] = \int_{+(n-1)T_b}^{+nT_b} W^H(\vartheta_l^j) n(t) a^j(t - \tau_l^j) \cos(2\pi f_c t + \varphi_l^j) dt$$

where $W^H(\vartheta_l^j) \vec{V}(\vartheta_l^j)$ represents the spatial correlation, $\varphi_l^j$ and $\tau_l^j$ are the random phase and time delay for the $j^{th}$ user's $l^{th}$ path, G is the processing gain, and $R_{jj}$ and $R_{kj}$ are the partial auto-correlation and cross-correlation of the direct sequence code(s):

$$R_{kj}(\tau) = \int_\tau^T a^k(t) a^j(t - \tau) dt$$

Maximal ratio combining produces an output:

$$z^j[n] = \sum_{l=0}^{L-1} \alpha_l^j z_l^j[n]$$

which can be processed by a decision processor. In this case, the BER is given by:

$$P_e = \int_0^\infty Q(2r_o) f(r_o | \bar{r}_o) dr_o$$

where $\bar{r}_o$ is the mean value of the instantaneous SINR, $r_o$, and Q( ) represents the complementary error function.

It should be appreciated that the nodes may be adapted to perform either or both time-domain (e.g., Rake) or frequency-domain processing as part of a receiver operation. Signals received by a plurality of nodes may be combined with respect to any combining technique, including EGC, MRC, Minimum Mean Squared Error Combining, other types of optimal combining, Successive Interference Cancellation, and other matrix-reduction/matrix diagonalization techniques. Successive Interference Cancellation may be particularly useful for decoding signals encoded with a sliding transform.

Figure 17:
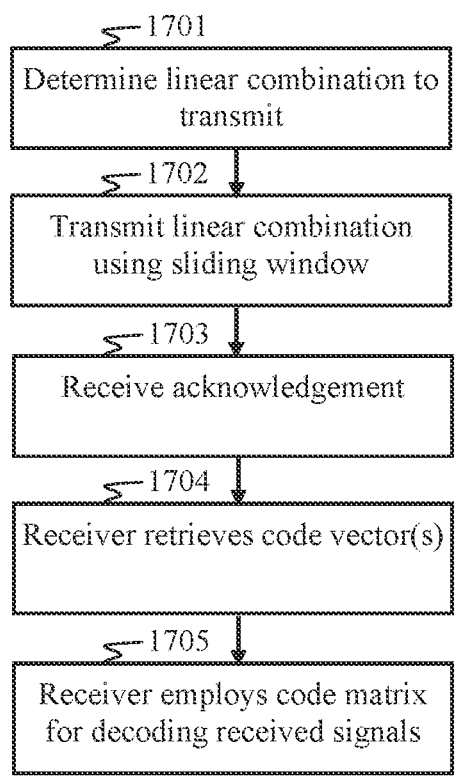
FIGS. 17 and 18 are flow diagrams depicting coding methods configured in accordance with aspects of the invention.

FIG. 17 is a diagram depicting processing methods in accordance with aspects of the invention. In one aspect of the invention, a method is provided in which a transmitting node determines a linear combination of original packets to transmit 1701, transmits the linear combination of packets across a network using a sliding window protocol 1702, and receives an acknowledgement when a receiving node receives the linear combination of packets 1703.

In one aspect, the process of transmitting 1702 and/or a process of receiving the transmitted linear combination (not shown) comprises at least one of the transmitting node and the receiving node enlisting at least one cooperating node to increase the dimension of the subspace spanned by the linear combination. For example, the at least one cooperating node may increase the rank of the coding matrix generated at the receiver and/or may improve the conditioning of the matrix.

In one aspect of the invention, the receiving node retrieves coding coefficients (i.e., at least one code vector) from the linear combination of packets 1704. The receiver may produce a code matrix from the coding coefficients. The coding coefficients (which may be appended to a code matrix) are employed in a decoding process for decoding the received linear combinations 1705. Since the coding comprises a sliding transform, decoding 1705 may comprise successive interference cancellation, or some other matrix-reduction process.

In accordance with still another aspect of the systems, circuits, and techniques described herein, a communication device comprises a first network interface unit configured for communication in a first network, a second network interface unit configured for communication in a second network that is different from the first network, and at least one processor to manage data transfer between the communication device and a destination node using multiple different channels.

Figure 18:
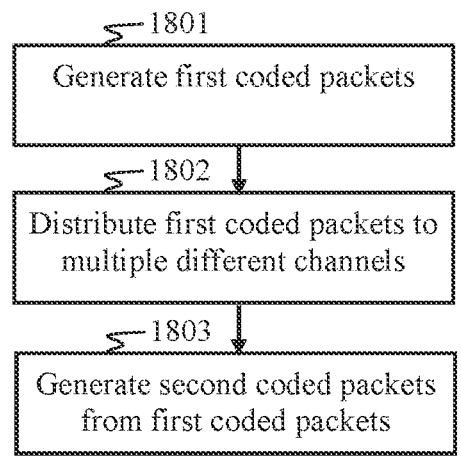

In one aspect of the invention, a method depicted in FIG. 18 is provided in which the at least one processor employs a plurality of cooperating nodes to generate first coded packets and/or second coded packets. In one aspect of the invention, first coded packets are generated by linearly combining original data packets 1801. Coding 1801 may employ subspace codes and/or codes derived from an invertible transform, such as a CI code matrix. The first coded packets are distributed to multiple different channels 1802, such as different network channels and/or different subchannels, for transmission to a destination node. Second coded packets are generated within the different channels 1803, such as by linearly combining first coded packets distributed to the channels, and/or by employing codes derived from an invertible transform, such as a CI code matrix. In some aspects of the invention, intermediate nodes in a multi-hop path may perform second coding 1803, and/or the destination node may provide second coding 1803 when combining signals received from its local group.

In one aspect of the disclosure, the at least one processor is configured to generate first coded packets by linearly combining original data packets within a sliding coding window. In another aspect, a first of the multiple different channels is associated with the first network interface unit and a second of the multiple different channels is associated with the second network interface unit. In some aspects of the invention, the first and second network interface units reside on different nodes that are communicatively coupled together (such as by a WLAN) and configured to cooperatively process the first coded packets.

Aspects of the invention may employ CI coding for direct sequence coding, spread-OFDM coding, and/or coding across subspaces, such as described throughout the '854 application, which is incorporated by reference in its entirety.

In OFDM, the transmission bandwidth is partitioned into a plurality N (which typically equals 2 raised to some integer power) of orthogonal subcarrier frequencies. Multicarrier spread-spectrum employs spreading across the subcarriers to produce a transmit signal expressed by $x = F^{-1}Sb$, where $F^{-1}$ is an inverse discrete Fourier transform (DFT), S is a spread-OFDM code matrix, and b is the transmitted symbol vector. The inverse DFT typically employs an over-sampling factor, so its dimension is K×N (where K>N is the number of time-domain samples per OFDM symbol block), whereas the dimension of the spread-OFDM code matrix is N×N.

At the receiver, the received spread-OFDM signal is expressed by $r = HF^{-1}Sb$, where H is a channel matrix for the transmission channel. A cyclic prefix in OFDM changes the Toeplitz-like channel matrix into a circulant matrix. The circulant channel matrix H is expressed by $$H = F^{-1}\Lambda_H F,$$

wherein $\Lambda_H$ is a diagonal matrix whose diagonal elements correspond to the first column of the circulant channel matrix H.

Thus, the received signal is represented by $$r = F^{-1}\Lambda_H F F^{-1} Sb,$$

which is $$r = F^{-1}\Lambda_H Sb.$$

The receiver processes r with a DFT to produce $$y = \Lambda_H Sb.$$

In order to facilitate the estimation of b, it is advantageous to employ a spreading code matrix S that commutes with $\Lambda_H$. For example, the matrix $S = \Lambda_C F$ may be employed, wherein $\Lambda_C$ is the diagonal matrix of the circulant matrix C, which is defined by $C = F^{-1}\Lambda_C F$.

In this case, the received signal, r, is expressed as $$r = F^{-1}\Lambda_H F F^{-1}(\Lambda_C F)b,$$

which can be written as $$r = F^{-1}\Lambda_H \Lambda_C F b = F^{-1}\Lambda_C \Lambda_H F b.$$

Following DFT processing, but prior to equalization, the signal, y, is expressed by $y = \Lambda_C^{-1} F r$.

In the simplest case, the spreading matrix $S = \Lambda_C F$ may be implemented with $\Lambda_C = I$, such that the spreading matrix S is just an N×N DFT matrix. Since OFDM's over-sampled DFT is K×N, the spreading matrix S may partially resemble a sinc pulse-shaping filter, except that it maps each data symbol to a cyclically shifted (and orthogonally positioned) superposition of OFDM subcarriers. In this case, the transmitter employs the spreading matrix C for spreading the data vector b: $C = F^{-1}\Lambda_C F$.

Since each spread symbol comprises a linear combination of the data vector's b values, if a spread symbol is lost during transmission, that loss is mitigated because it is effectively distributed across all the data values of b. Thus, spreading permits accurate estimation of a received signal despite substantial losses, even before error-correction coding is employed.

Furthermore, this type of spreading permits a receiver to decode a transmission without requiring all of the spread symbols. For example, a receiver may accurately decode N data values by employing M<N spread symbols.

Since the spread symbols employ predetermined linear relationships between the data symbols of b, techniques typically employed in multi-user detection (such as, but not limited to, successive interference cancellation and mixed-decision symbol estimation) can enhance performance at the receiver. Thus, in some aspects of the invention, orthogonality of the spreading codes is not required if the spreading coefficients are known at the receiver. Rather, the code spaces processed by the receiver may simply need to be sufficiently de-correlated from each other to estimate the data symbols b.

In one aspect of the invention, the above-mentioned spreading matrix S is employed as an invertible transform to produce a sequence of coded data symbols x from an input data vector b: $x = Sb$. This implementation of the invertible transform matrix S takes the form of direct-sequence coding.

Figure 19:
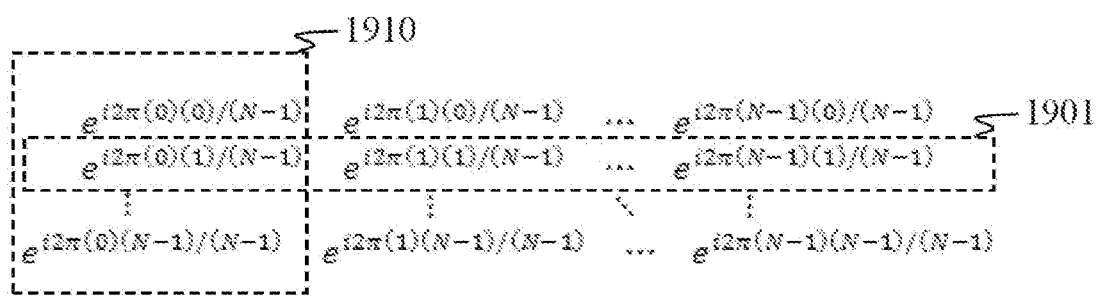
FIG. 19 shows an invertible transform matrix that may be employed for coding in some aspects of the invention.

FIG. 19 illustrates an invertible transform matrix that may be employed in some aspects of the invention. In one aspect, the invertible transform matrix S is an N×N matrix. Each row (e.g., row 1901) of the matrix S multiplies original data vector b (which comprises N values) to produce a coded data symbol $x_i$. Specifically, each coded data symbol $x_i$ comprises a linear combination of the original data symbols b, wherein the coefficients of the linear combination are values of the invertible transform matrix S.

To estimate an $i^{th}$ value $b_i$ of the original data vector b, a decoding vector $s_i$ comprising an $i^{th}$ row or column of a decoding matrix may be used to multiply the vector of coded data symbols x to produce an inner product, from which the estimated value $\hat{b}_i$ is derived. The vector $s_i$ may be regarded as corresponding to an $i^{th}$ subspace of the decoding matrix. Since the inner product requires vectors of equal length, if the number of coded data symbols x is deficient relative to the rank of the decoding matrix, then the decoding vector $s_i$ may be reduced accordingly. For example, a $j^{th}$ value $s_{ij}$ of the decoding vector $s_i$ corresponding to a $j^{th}$ missing coded data symbol $x_j$ may be omitted from the vector $s_i$ before the multiplication. The decoding vector $s_i$ functions as a matched filter. In one aspect, the corresponding decoding matrix may comprise the complex conjugate of the matrix S. However, other aspect of the invention may employ different types of invertible CI matrices, including scalar code matrices and other complex code matrices. Gauss-Jordan elimination can be used to determine whether a given matrix is invertible and to find the inverse. An alternative is LU decomposition, which generates upper and lower triangular matrices, which are easier to invert.

The first element of each matrix row (indicated by the first column 1910 of matrix S) multiplies the first data symbol $b_0$ of the data vector b. In this case, all the values in the first column 1910 equal one. The corresponding decoding vector so also has all of its values equal to one, so to retrieve the first data symbol $b_0$, all the coded data symbols $\{x_0, x_1, \ldots, x_{N-1}\}$ are summed. This can be regarded as a "baseband" matched filter. One of the advantages of employing the type of CI coding matrix shown in FIG. 19 is that data mapped to this baseband subspace can be retrieved regardless of the order in which the coded data symbols $\{x_0, x_1, \ldots, x_{N-1}\}$ are summed. Thus, in some aspects of the invention, certain control information may be included in packets that are encoded to this subspace. In some aspects of the invention, a decoding matrix may be included in the baseband subspace. In some aspects, information relating to the order and/or identity of the coded data symbols may be included in the baseband subspace.

To retrieve original data from a non-baseband subspace, a decoding vector may effectively map its corresponding subspace to baseband so the information in the other subspaces cancels out. For example, the data encoded in the target subspace combines coherently while data in all the other subspaces cancel. The decoding process may comprise an inner product of the coded data packets with one or more vectors of decoding coefficients. In some aspects, information about the intended order of the coded data (such as may be used for decoding) may be included in the baseband subspace such that the coded data can be arranged correctly if it is received out of order. In some aspects, information in the baseband subspace may be used to identify missing coded data such that decoding can be adapted accordingly. For example, in one aspect, values of the decoding vector(s) may be removed with respect to which coded data is missing.

Some advantages of employing these types of CI codes are that information can be decoded using fast transforms, such as processes that employ fast Fourier transforms, the codes can have any code length, and information can be re-encoded by intermediate nodes without requiring decoding. In some aspects of the invention, intermediate nodes participate in the coding process. For example, intermediates nodes may combine received packets and generate new packets. The encoded packets encapsulate the original packets, thus, sequence numbers and other control information in the original packets can remain concealed until they are decoded. Decoding only requires that a specified number of the coded packets be received. The order in which those packets are received is inconsequential. This permits a client to simultaneously employ multiple channels, even multiple different networks, with different bandwidths, latencies, and/or channel conditions to download a file or receive streaming media without requiring network servers to coordinate their transmissions. The destination node needs only to assemble a sufficient number of received packets in order to decode the flow. Since the code is either already known at the receiver or it is conveyed in the baseband subspace, the packets are interchangeable and the arrival order is irrelevant. No scheduling or route coordination is necessary at the source. Such advantages are particularly relevant in cloud networks.

As described above, some aspects of the invention may employ an invertible transform matrix $\hat{S}=F^{-1}S$, where $F^{-1}$ is a K×N inverse DFT (where K>N is the number of time-domain samples per OFDM symbol block), and S is an N×N spread-OFDM code matrix. In this case, the vector of coding coefficients that multiply OFDM subcarriers constitute a random linear mapping of the data vector b, as will be described with respect to FIGS. 20A and 20B.

Figure 20A:
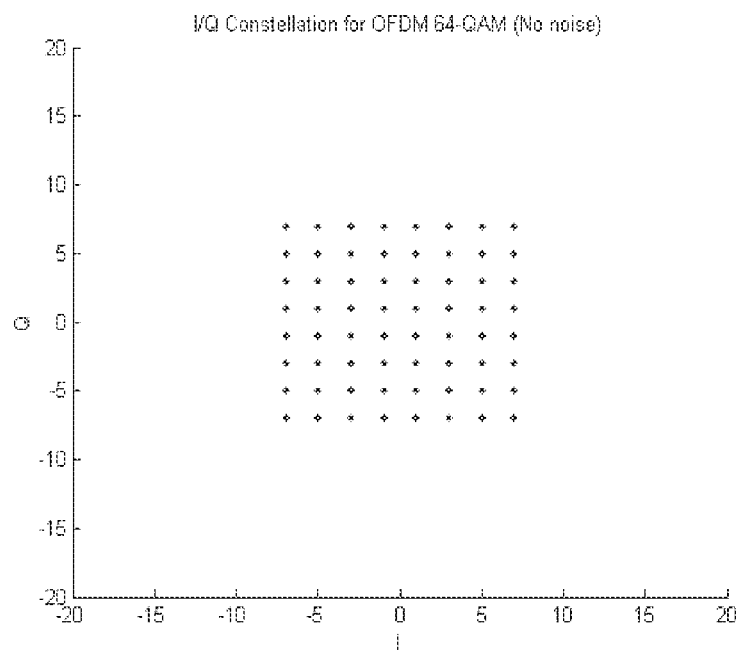
FIG. 20A is a constellation plot of original data values before coding.
Figure 20B:
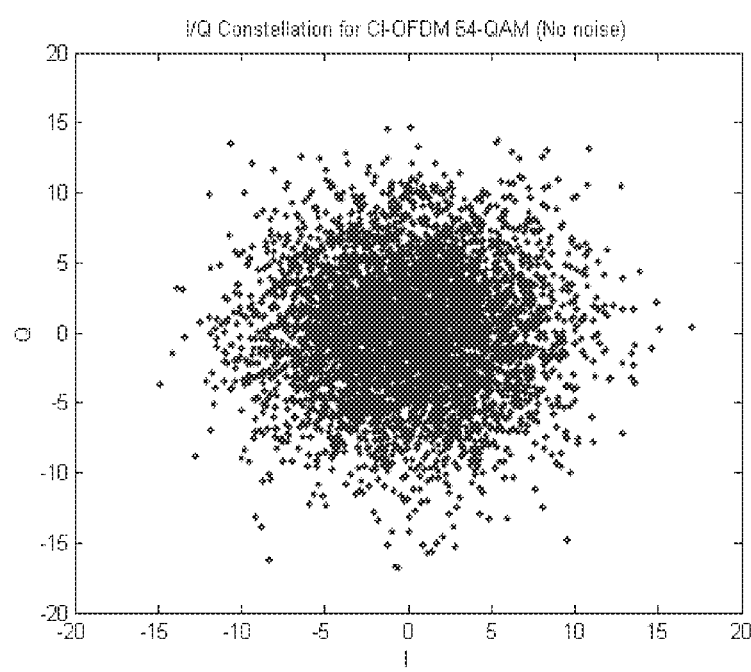
FIG. 20B is a constellation plot of coded data values in accordance with an aspect of the invention.

FIG. 20A is a constellation plot of original data values b, which clearly have a 64-QAM structure. In conventional OFDM, these data values would ordinarily modulate the OFDM subcarriers. FIG. 20B is a constellation plot of subcarrier coefficients produced by employing a CI code matrix, such as the code matrix depicted in FIG. 19. The coded symbols comprise linear combinations of the original data determined by the invertible CI transform matrix.

The constellation plot in FIG. 20B is a Gaussian distribution that is statistically random. In accordance with one aspect of the invention, a sequence of coded data symbols is generated from the operation $x=F^{-1}Sb$ and transmitted into one or more channels. In some aspects of the invention, the aforementioned subcarrier coefficients may instead be employed as coefficients in random linear combinations of the original data values. In such aspects, the coefficients may be derived from an invertible transform matrix (such as a CI matrix) and information about the original data symbols. Decoding may employ an iterative process for estimating the original data.

Figures 21A, 21B:
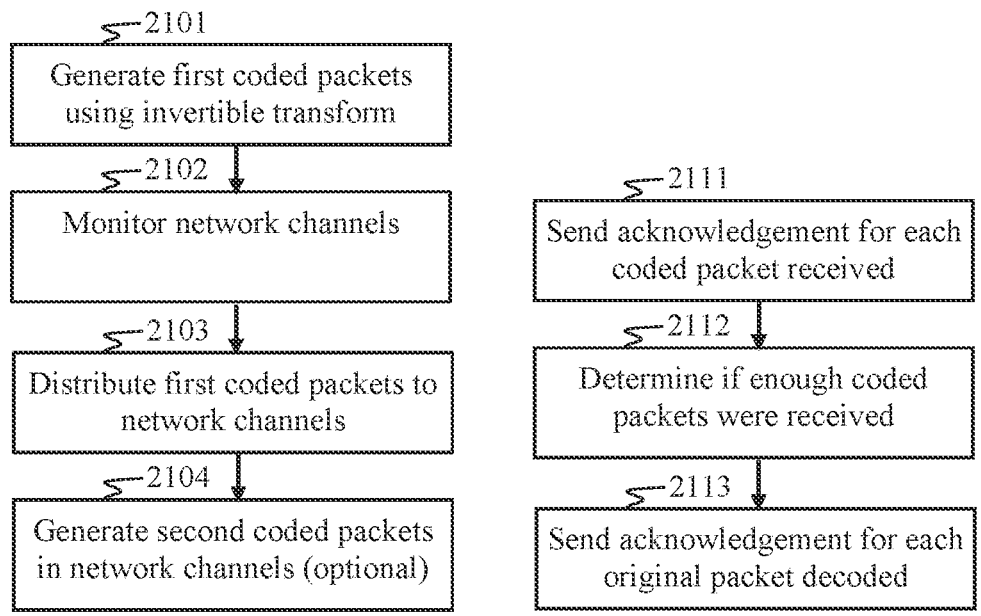
FIG. 21A is a flowchart illustrating a method for transmitting data from a source node to a destination node via multiple different channels in accordance with an aspect of the invention.
FIG. 21B is a flowchart illustrating a method for receiving data at a destination node via multiple different channels in accordance with an aspect of the invention.

FIG. 21A is a flowchart illustrating a method for transmitting data from a source node to a destination node via multiple different channels in accordance with an aspect of the invention. As described previously, the multiple different channels may be associated with different communication technologies.

First coded data packets are generated by combining original data packets using an invertible transform, such as a CI transform 2101. The first coded packets may be generated using a block and/or sliding CI transform by forming a linear combination of the original packets currently within a coding window. For example, coded data may be generated by multiplying a vector of original data with a CI code matrix. Thus, each coded data packet comprises a different linear combination of the original data packets, and, thus, constitutes a degree of freedom. If a sliding transform is employed, as each new original packet is added to the coding window, an oldest original packet in the window may be shifted out. In some aspects, a new first coded packet may be generated for each new original packet added to the coding window. The size of the first coding window may be fixed or variable.

The multiple different channels may be monitored 2102 to identify one or more channels to insert a new first coded packet at a particular time. This monitoring process may continue until all of the data has been successfully transferred to and decoded at the destination node. When a channel is identified, one or more first coded packets may be distributed to the identified channel 2103. Different first coded packets may be injected into different channels using the above-described technique. For example, in one aspect of the invention, a first coded packet is transmitted on a first channel and at least a second coded packet is transmitted on at least a second channel, wherein the first coded packet and the at least second coded packet together are necessary to provide a sufficient number of degrees of freedom to decode the original packet.

For each channel, one or more second coded packets may be generated 2104 by linearly combining the first coded packets that currently reside within a corresponding second coding window using an invertible transform, such as a CI transform. In some aspects, CI coefficients may comprise statistically random coefficients may be used to perform the linear combination.

FIG. 21B is a flowchart illustrating a method for receiving data at a destination node via multiple different channels in accordance with an aspect of the invention. Upon receiving a coded packet at a destination node, the destination node may send an acknowledgement message to the source node 2111. The destination node determines if a sufficient number of coded packets have been received to allow the receiver to decode the packets 2112. If an invertible transform is employed for coding, a sufficient number of coded packets may be less than the number of original packets. Packets may need to be retransmitted until a sufficient number of packets are received. In some cases, the coding may be adapted (e.g., the coding window may be adjusted, the code rate may be adjusted, etc.) based on feedback from the destination node. Upon decoding, the receiver may send an acknowledgement for each original packet received 2113.

Figures 22A, 22B:
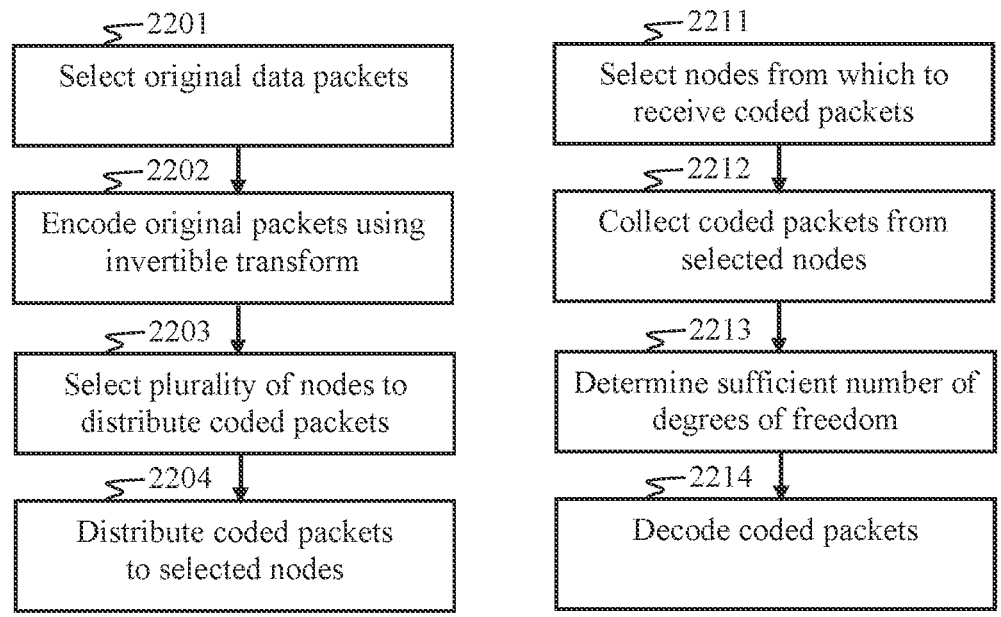
FIG. 22A is a flowchart illustrating a method for transmitting data from a source node to a destination node in accordance with aspects of the invention.
FIG. 22B is a flowchart illustrating a method for receiving data at a destination node in accordance with aspects of the invention.

FIG. 22A is a flowchart illustrating a method for employing an invertible transform, such as CI coding, for distributing data from a source node to be received by a destination node via multiple routes through at least one network. The method comprises selecting a set of original data, such as original data packets, for encoding 2201. The selected data is encoded using an invertible transform 2202, such as a CI transform. A multiple distribution nodes are selected to distribute the coded data 2203, and the coded packets are distributed to the selected nodes 2204.

Selecting the original data 2201 may comprise partitioning the data into a predetermined number of data sections, such as packets or other data sets, wherein the predetermined number may comprise the dimension of the invertible transform used for coding. The predetermined number may comprise the length of a coding window employed, such as when a sliding CI transform is employed. In some aspects, the predetermined number may be related to a number of distribution nodes to which the coded data will be distributed 2203, the storage capability of each distribution node, network conditions (e.g., traffic load, latency, bandwidth, link quality, etc.) in the vicinity of each node, demand for the original data, and/or other factors that can affect the flow and timely delivery of the original data to one or more clients. In some aspects, the predetermined number may be related to a number of network paths or channels used for delivering data to the destination node.

Coding 2202 may comprise employing a block transform or a sliding transform, or some combination thereof. In some aspects of the invention, the coded packets and the corresponding code matrix comprise a plurality of independent equations having a plurality of independent variables in a system of linear equations, wherein the independent variables comprise the original packets. In some aspects of the invention, control information may be encoded into the baseband subspace of the coded data. For example, the control information may help a receiver identify individual coded packets such that if a coded packet is lost, decoding can be adapted accordingly. The control information may identify a preferred sequence of the coded packets, so a receiver can correctly arrange received packets such as to facilitate decoding of the non-baseband subspaces.

Selecting the distribution nodes 2203 may comprise selecting nodes that are nearby the destination node. The distribution nodes may comprise edge servers in a content delivery network. In some aspects, the selection of distribution nodes 2203 may be based on anticipated and/or actual demand for the original data. The distribution nodes may be selected 2203 to best serve requesting clients, such as to offload network loads from the network backbone to the network edges, reduce latency when serving data to the clients, and/or reduce distribution costs for content providers. In peer-to-peer networks, some of the clients may be selected as distribution nodes. For example, a client requesting the original data may be directed to retain a set of coded packets containing the original data such that the client may serve other clients requesting the same original data.

Distributing the coded packets to the distribution nodes 2204 may comprise determining how much data to store on each node. In one aspect, distributing may first comprise determining storage capability of each candidate distribution node. Distributing 2204 may comprise calculating a cost per unit flow on each link, and/or determining link capacity, link traffic, and/or other factors affecting how data is distributed. Distributing 2204 may comprise determining demand topology in a network, such as to determine how much and where coded data is distributed.

In some aspects of the invention, distributing 2204 comprises providing each of a plurality of the distribution nodes with a number of coded components that is less than a number of required degrees of freedom to decode the coded components. A destination node can acquire a sufficient number of the coded components to perform decoding by collecting coded components from more than one distribution node. This can reduce the amount of data stored on each distribution node while still being able to serve the clients. Thus, distributing 2204 may comprise determining a network demand topology to use for calculating which coded packets to distribute to which nodes in a manner that serves the requesting client(s) while reducing network traffic and storage requirement on the distribution nodes. In other aspects, distributing 2204 may be based on network bandwidth, latency, link quality, and/or other link metrics pertaining to each of a plurality of channels employed by the distribution nodes serving a client.

FIG. 22B is a flowchart illustrating a method for employing an invertible transform, such as CI coding, for receiving data from a plurality of routes through at least one network. The method comprises a destination node selecting a plurality of distribution nodes from which to receive coded packets 2211, collecting the coded packets from the selected distribution nodes 2212, and determining if a sufficient number of unique coded packets have been collected to decode the packets 2213. If the destination node determines that a sufficient number of degrees of freedom are available with respect to the collected packets, then it performs decoding 2214. Otherwise, control returns to processing block 2211, and at least one more distribution node is selected. In some aspects, one of the distribution nodes may request additional coded packets (not shown), such as from other distribution nodes and/or a source node.

In one aspect of the invention, the nodes are selected 2211 to provide a sufficient number of coded packets (e.g., which, along with their respective code matrix, represent linearly independent equations) for decoding the original packets (e.g., unknown variables). In some aspects, the invertible transform matrix is known at the receiver, so the coding matrix is not transmitted to the distribution nodes. However, information about the relation of each coded packet to the coding matrix may be provided to the distribution nodes and transmitted to the destination node.

In one aspect, decoding 2214 comprises calculating a solution for a system of linear equations comprising the independent equations and their independent variables. In this aspect, the independent equations comprise the coded packets and the corresponding invertible transform matrix, and the independent variables comprise the plurality of original packets.

As described throughout the '107 application, distributing data on network routes may be performed in a manner that achieves one or more cost objectives, including cost objectives related to combinations of technical and business objectives. Such aspects of the invention may be applied to communication systems in which multiple different networks are simultaneously employed for transmitting data from a source to a destination.

In one aspect of the invention, a method of providing minimum-cost routing comprises modeling a network between a source node and a destination node as a trellis graph, wherein each state node of the trellis corresponds to a network node, and each transition between states corresponds to a communication link between network nodes. A cost is associated with each link, and then a path is calculated through the trellis that minimizes the total cost for routing data between the source and destination nodes. The cost for each link may be based on various combinations of factors, including link capacity, available storage at each node, network traffic loads, link latency, quality of service, etc. In some aspects, coding is part of the routing operation, and it may directly affect the cost associated with the links. As a route for each data set (e.g., coded data packet) is determined, the cost for each link may be updated, and then the process is repeated for the next data set (e.g., coded packet). This process may be repeated for a plurality of coded packets, such as to determine an optimal number of coded packets, code rate, code matrix, and/or other coding parameters prior to encoding and routing the coded data.

Aspects of the invention may employ client-side and/or server-side techniques, devices, systems, and/or protocols for providing content delivery management, such as disclosed in U.S. patent application Ser. No. 13/036,778, filed Feb. 28, 2011, U.S. patent application Ser. No. 13/036,171, filed Feb. 28, 2011, and U.S. patent application Ser. No. 13/036,812, filed Feb. 28, 2011, which are hereby incorporated by reference in their entireties.

Figure 23A:
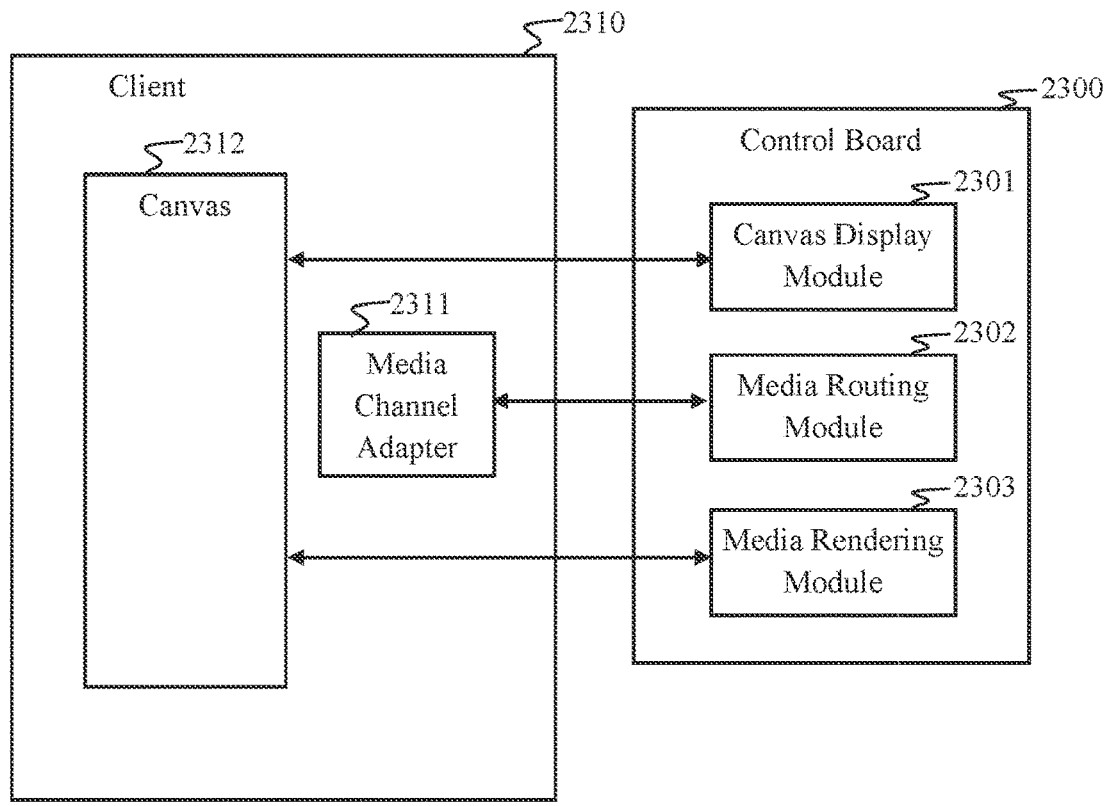
FIG. 23A is a block diagram of a control board configured in accordance with an aspect of the invention.

FIG. 23A is a block diagram of a control board 2300 configured in accordance with an aspect of the invention. The control board 2300 may comprise any combination of hardware and software that enables content providers to manage user interactions with media resources. In one aspect, the control board 2300 may comprise a distributed system, meaning that control board components 2301-2303 may reside on multiple devices. For example, control board components 2301-2303 may reside on multiple servers and/or on multiple client devices.

In one aspect of the invention, the control board 2300 comprises software residing on non-transient computer-readable media configured to perform control board functions. In another aspect of the invention, the control board 2300 comprises hardware configured to perform control board functions.

According to one aspect of the invention, the control board 2300 comprises a client-device canvas display module 2301, a media routing module 2302, and a media rendering module 2303. The canvas display module 2301 is configured for interacting with a canvas 2312 displayed on the media interface on a client device 2310. The client device 2310 is one of a plurality of user-selectable client devices. The canvas 2312 is part of a graphical user interface that displays user-controllable devices and available media resources. The canvas 2312 may comprise windows, icons, menus, and/or other display items. Mapped onto the canvas 2312 are all user-controllable devices, such as laptops, handsets, PDAs, tablets, other mobile client devices, and set-top boxes. The canvas 2312 includes canvas display and control software that allows users to experience and control media across multiple client devices, and assign control and viewing interfaces (e.g., windows) to the devices.

In one aspect of the invention, the canvas 2312 allows for human-computer interaction by enabling the display items to be manipulated by user input, such as by a mouse, keyboard, touch screen, and/or other user controls. The canvas 2312 software converts user inputs to messages, which are transmitted to the canvas display module 2301 and/or the media routing module 2302. The control board 2300 may receive information about the client device 2310 and other user-selectable client devices (not shown) automatically, without the need for user input. For example, the media routing module 2302 may receive messages from the canvas 2312, such as messages indicating which client devices are present, presentation capabilities of each client device, and communication bandwidth available to each client device. The media routing module 2302, in response to the canvas 2312 messages, may allocate media resources to each client device. The media routing module 2302 is responsive to at least one of client device information and user inputs received from the canvas 2312 for allocating the media resources to the client device 2310 and other user-selectable client devices. The canvas display module 2301 may be responsive to user input and/or client device information to configure and/or reconfigure the canvas 2312 display. The canvas display module 2301 may be responsive to the media routing module for configuring and/or reconfiguring the canvas 2312 display.

In one aspect of the invention, the media routing module 2302 may select which media resources are available to a particular client device based on link performance to that client device. Specifically, link performance may comprise an estimate of average data rate, a prediction of future data rate, latency measurements, and/or other measurements or calculations indicating link quality. The link performance may be compared to transmission requirements of the available media resources (e.g., bandwidth, tolerance to latency, activity factor, etc.) and characteristics of the client devices (e.g., buffer size, storage capacity, bandwidth, etc.) in order to determine which media resources are suitable for being delivered to each client device.

Figure 23B:
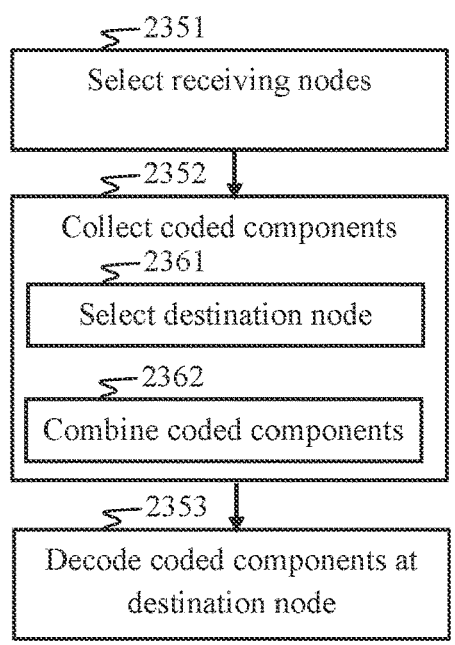
FIG. 23B is a flowchart illustrating a method for retrieving data in a content delivery network in accordance with some aspects of the invention.

FIG. 23B is a flowchart illustrating a method for retrieving data in a content delivery network in accordance with some aspects of the invention. Multiple receiving nodes are selected 2351 to cooperatively receive a plurality of linearly independent coded components and a plurality of corresponding code vectors. In one aspect, the rank of each of the receiving nodes is insufficient for decoding the coded components. The coded components and the corresponding code vectors are collected 2352 from the plurality of receiving nodes to build up the dimension of the subspace spanned by the collected code vectors. In one aspect of the invention, step 2352 comprises, in response to a user input, selecting 2361 a destination node from a plurality of user-selectable client devices, and combining 2362 the coded components and the corresponding code vectors at the destination node. Once the destination node has sufficient rank for decoding, the coded components are decoded 2353.

The media routing module 2302 is responsive to user selections of media resources and is configured for routing selected media resources to a destination client device, such as the client device 2310. For example, the media routing module 2302 may be responsive to a user's selection of a streaming video channel and information about the selected client device's display 2310 capabilities for allocating an available stream bandwidth and delivering the selected video at the allocated stream bandwidth. While multiple receiving nodes are selected 2351 to receive the transmission, the media routing module 2302 configures stream bandwidth relative to the display capabilities of the destination device, and the media rendering module 2303 configures the media based on characteristics of the destination device. If the destination device is changed by the user, the routing and rendering may be adapted accordingly.

Figure 24:
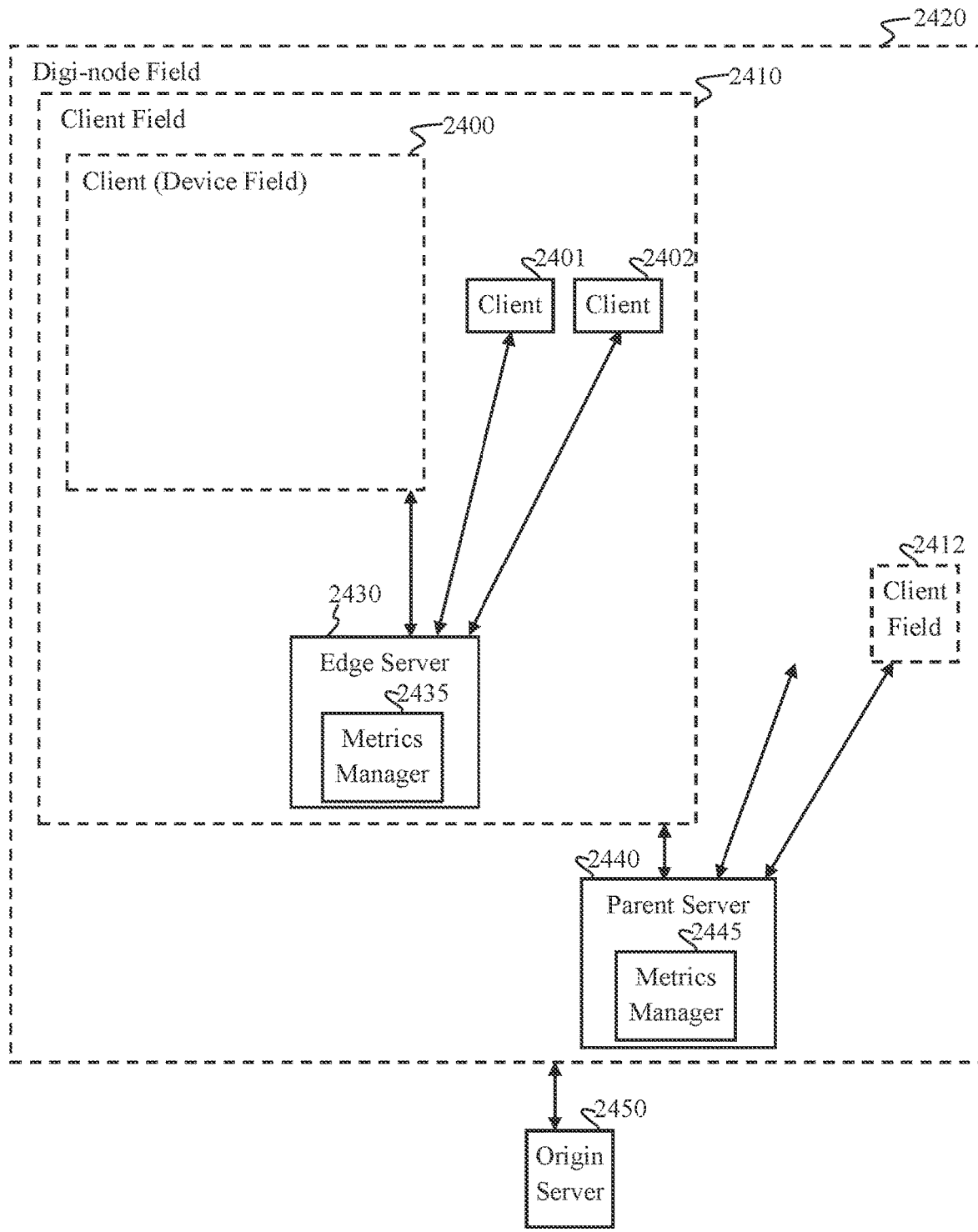
FIG. 24 is a block diagram of a content delivery network configured to operate in accordance with some aspects of the invention.

FIG. 24 is a block diagram of a CDN configured to operate in accordance with some aspects of the invention. A client comprises a device field 2400, which may include one or more client devices, such as client devices 2421 and 2422 communicatively coupled to a client-side metrics manager 2425. The metrics manager 2425 may reside on one or more of the client devices 2421 and 2422. The metrics manager 2425 collects data from the client devices 2421 and 2422 and manages client interactions with the CDN. Information about the client devices 2421 and 2422 may be collected from the metrics manager 2425 and used to select nodes that are used for distributing coded media files to a destination device (e.g., one of the client devices 2421 and 2422).

The metrics manager 2425 is configured to manage client interactions with the network. For example, media transmissions to a destination node may be based on wireless network performance data for each client device in the destination node's device field. Other factors, such as the amount of data stored in a client device's buffer, or a low-bandwidth status warning from a device may be employed. In one aspect of the invention, information about a device field is used to select which client devices receive coded data transmissions for a destination node in the device field. The client devices are configured to cooperatively receive the transmitted data and forward the coded data to the destination node. Upon receiving a sufficient amount of coded data, the destination node performs decoding.

An edge server 2430 serves one or more clients, such as clients 2400-2402. Clients 2401 and 2402 each comprise one or more client devices (not shown) and a client-side metrics manager (not shown). The edge server 2430 comprises a network node metrics manager 2435 configured for collecting data from one or more client-side metrics managers (e.g., metrics manager 2425) and brokering network resources from the CDN to the clients 2400-2402. The edge server 2430 and the clients 2400-2402 it serves are part of a client field 2410. The client field 2410 is managed by the metrics manager 2435 for distributing network resources (e.g., media services) to the clients 2400-2402. In one aspect of the invention, information about which clients are connected to which edge servers is managed by the metrics manager 2435 and may be used for distributing coded data to a plurality of edge servers for transmission to a destination node. For example, coded data intended for a destination node may be distributed to multiple edge servers to which the destination node is communicatively coupled. In some aspects, information from both the client-side metrics manager 2425 and the network node metrics manager 2435 is employed by the CDN for selecting nodes to transmit coded data to a destination node. For example, information about which edge servers each device in the destination node's device field 2400 may be used to select which edge servers will serve the coded data.

The data employed by the metrics manager 2435 may comprise raw and/or processed client-side data. For example, the data may comprise a number of requests for media resources, types of media resources requested, and/or bandwidths of the requested media resources. The data may comprise aggregations of the client-side data, such as the total bandwidth requested. The data may comprise indications of changing network loads (e.g., the number of requests for increased/decreased bandwidth) and/or changes in network performance (e.g., number of acknowledgements, number of requests for retransmission, measured latency, packet error rate, etc.). The metrics manager 2435 allocates the network resources from the CDN to the clients 2400-2402 based, at least in part, on the data collected from the client-side metrics managers 225.

According to one aspect of the invention, the network node metrics manager 2435 receives a request from one of the clients 2400-2402. The metrics manager 2435 may check to determine if coded parts of the requested object are available at the edge server's 2430 cache. If a sufficient number of coded parts of the requested object are available, the edge server 2430 transmits the coded parts to the client. In some cases, it may be necessary to deliver coded parts from multiple edge servers to the destination node. The method may further comprise transmitting a request for coded parts to a parent server 2440 or an origin server if a sufficient number of coded parts are not available at the edge server(s) to enable the destination node to perform decoding. In some aspects of the invention, the metrics manager 2435 (or a node cloud metrics manager 2445) may reassign the client field 2410 to a different edge server.

The parent server 2440 comprising the node cloud metrics manager 2445 is communicatively coupled to a plurality of client fields, such as client fields 2410-2412. The metrics manager 2445 is configured for collecting data from multiple network node metrics managers, such as network node metrics manager 2435, for distributing network services between edge servers 2430. The parent server 2440 and the client fields 2410-2412 it serves is denoted as a digi-node field 2420. The digi-node field 2420 is managed by the metrics manager 2445 for distributing network services to the edge servers, such as edge server 2430.

The data employed by the metrics manager 2445 may comprise raw and/or processed data from the network node metrics managers (such as metrics manager 2435). The data may comprise aggregations of the client-side data and/or data from the network node metrics managers. For example, the data may comprise the total bandwidth requested, or the amount of bandwidth requested at each edge server. The data may comprise indications of changing network loads (e.g., the number of requests for increased/decreased bandwidth) and/or changes in network performance (e.g., number of acknowledgements, number of requests for retransmission, measured latency, packet error rate, etc.). The metrics manager 2435 distributes the network resources of the CDN between the network nodes (e.g., edge servers) based, at least in part, on the data collected from the metrics managers 2435.

Figure 25:
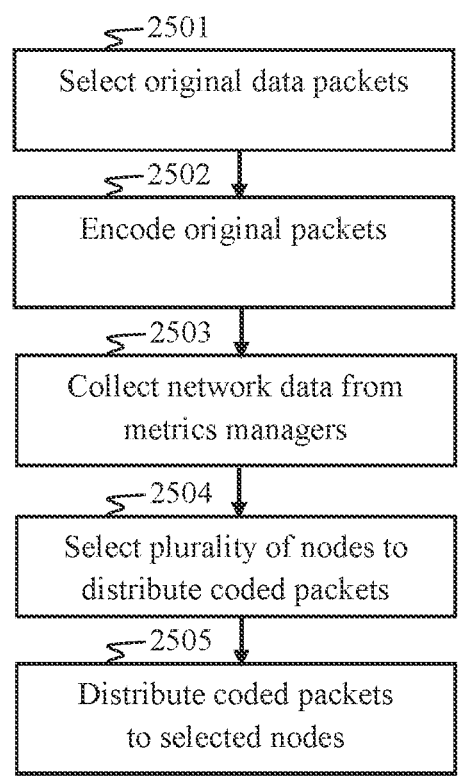
FIG. 25 is a flowchart illustrating a method for delivering data in a content delivery network in accordance with some aspects of the invention.

FIG. 25 is a flowchart illustrating a method for delivering data in a content delivery network in accordance with some aspects of the invention. A plurality of original data components (e.g., packets) are selected 2501 to be transferred to at least one destination node. The original data packets are encoded 2502 for generating a plurality of subspace coded packets and a corresponding code matrix. Network data, which may comprise a combination of network topology data and network performance data, is collected 2503 from metrics managers, such as client-side metrics managers and network-node metrics managers. A plurality of transmitting nodes are selected 2504 to which the coded packets are distributed 2505. Each of the transmitting nodes stores a subset of the plurality of subspace coded packets and corresponding code matrix, such that each transmitting node has a rank that is insufficient for decoding the coded packets.

Additional aspects of the invention include a computerized device configured to process all the method operations disclosed herein. In such aspects, the computerized device may include a memory system, a processor, communications interface in an interconnection mechanism connecting these components. The memory system may be encoded with a process that provides the coding techniques as explained herein that, when performed (e.g. when executing) on the processor, operates as explained herein within the computerized device to perform methods and operations explained herein as aspects of the invention.

Other aspects of the invention that are disclosed herein may include software programs to perform the methods and operations described above. More particularly, a computer program product is one aspect that has a non-transient computer-readable medium including computer program logic encoded thereon that when performed in a computerized device provides associated operations providing the functions explained herein. The computer program logic, when executed on at least one processor with a computing system, causes the processor to perform the operations (e.g., the methods) indicated herein as aspects of the invention. Such aspects are typically provided as software, code and/or other data structures arranged or encoded on a non-transient computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein. Software processes that operate in a collection of computerized devices, such as in a group of data communications devices or other entities can also provide a system in accordance with aspects of the invention. The system can be distributed between many software processes on several data communications devices, or all processes could run on a small set of dedicated computers, or on one computer alone.

For clarity of explanation, the illustrative system and method aspects is presented as comprising individual functional blocks. The functions these blocks represent may be provided through the use of either shared or dedicated hardware, including, but not limited to, hardware capable of executing software. For example the functions of one or more blocks may be provided by a single shared processor or multiple processors. Use of the term "processor" should not be construed to refer exclusively to hardware capable of executing software. Illustrative aspects may comprise microprocessor and/or digital signal processor (DSP) hardware, read-only memory (ROM) for storing software performing the operations discussed below, and random access memory (RAM) for storing results. Very large scale integration (VLSI), field-programmable gate array (FPGA), and application specific integrated circuit (ASIC) hardware aspects may also be provided.

The methods and systems described herein merely illustrate particular aspects of the invention. It should be appreciated that those skilled in the art will be able to devise various arrangements, which, although not explicitly described or shown herein, embody the principles of the invention and are included within its scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles and aspects of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method, comprising:
providing for modulating a plurality of data symbols onto a sequence of code symbols to produce a transmit signal comprising linear combinations of the plurality of data symbols, wherein providing for modulating comprises:
employing a block transform on the plurality of data symbols to produce a plurality of coded data symbols, the block transform providing for multiplying each of the plurality of data symbols with one of a plurality of code vectors, wherein each of the plurality of code vectors comprises a different one of a first plurality of frequencies; and
employing subcarrier modulation to modulate each of the plurality of coded data symbols onto a different one of a second plurality of frequencies to produce a plurality of modulated subcarriers, wherein the plurality of modulated subcarriers sum to produce the transmit signal;
wherein the block transform has dimension N×N, and the subcarrier modulation employs a transform having dimension K×N, where K>N; and
configuring the transmit signal for transmission into a wireless communication network.

2. The method of claim 1, wherein the block transform configures the plurality of coded data symbols to have a Gaussian distribution of complex values.

3. The method of claim 1, wherein providing for modulating and configuring the transmit signal for transmission are configured to be employed in a relay node, a mobile device in a cellular network, a device in a wireless local area network, or a peer in a peer-to-peer network.

4. The method of claim 1, further comprising applying precoding to the plurality of coded data symbols.

5. The method of claim 1, wherein at least one of the block transform and the subcarrier modulation comprises a fast transform.

6. The method of claim 1, wherein the transmit signal is expressed by $x=F^{-1}Sb$, where $F^{-1}$ is an inverse discrete Fourier transform, S is a spread-OFDM code matrix, and b is the plurality of data symbols.

7. The method of claim 1, wherein configuring the transmit signal for transmission comprises at least one of:
- employing at least one of frequency division multiple access, orthogonal-frequency division multiple access, time division multiple access, and code division multiple access;
- configuring multiple network interfaces for communicating in multiple wireless networks, each of the multiple network interfaces employing a different network technology;
- configuring the transmit signal for transmit diversity or multiple-input multiple-output (MIMO);
- providing the transmit signal with at least one of control information, a pilot tone, a training sequence, a synchronization signal, or a cyclic prefix; or
- allocating transmit power to at least one transmission channel, the transmit power being determined from at least one of a channel-quality measurement, wireless terminal battery life, load balancing, spatial reuse, power-control instructions, and near-far interference.

8. An apparatus, comprising:
- a communication interface configured for wireless communication; and
- a communication circuit configured for:
  - modulating a plurality of data symbols onto a sequence of code symbols to produce a transmit signal comprising linear combinations of the plurality of data symbols, wherein modulating comprises:
    - employing a block transform on the plurality of data symbols to produce a plurality of coded data symbols, the block transform providing for multiplying each of the plurality of data symbols with one of a plurality of code vectors, wherein each of the plurality of code vectors comprises a different one of a first plurality of frequencies; and
    - employing subcarrier modulation to modulate each of the plurality of coded data symbols onto a different one of a second plurality of frequencies to produce a plurality of modulated subcarriers, wherein the plurality of modulated subcarriers sum to produce the transmit signal;
    - wherein the block transform has dimension N×N, and the subcarrier modulation employs a transform having dimension K×N, where K>N; and
  - configuring the communication interface for transmitting the transmit signal in a wireless communication network.

9. The apparatus of claim 8, wherein the block transform is configured to provide the plurality of coded data symbols with a Gaussian distribution of complex values.

10. The apparatus of claim 8, wherein the communication circuit and the communication interface are configured to be employed in a relay node, a mobile device in a cellular network, a device in a wireless local area network, or a peer in a peer-to-peer network.

11. The apparatus of claim 8, wherein the communication circuit is further configured for applying precoding to the plurality of coded data symbols.

12. The apparatus of claim 8, wherein at least one of the block transform and the subcarrier modulation is performed with a fast transform.

13. The apparatus of claim 8, wherein the transmit signal is expressed by $x=F^{-1}Sb$, where $F^{-1}$ is an inverse discrete Fourier transform, S is a spread-OFDM code matrix, and b is the plurality of data symbols.

14. The apparatus of claim 8, wherein at least one of the communication circuit and the communication interface is configured for at least one of:
- employing at least one of frequency division multiple access, orthogonal-frequency division multiple access, time division multiple access, and code division multiple access;
- configuring multiple network interfaces for communicating in multiple wireless networks, each of the multiple network interfaces employing a different network technology;
- configuring the transmit signal for transmit diversity or multiple-input multiple-output (MIMO);
- providing the transmit signal with at least one of control information, a pilot tone, a training sequence, a synchronization signal, or a cyclic prefix; or
- allocating transmit power to at least one transmission channel, the transmit power being determined from at least one of a channel-quality measurement, wireless terminal battery life, load balancing, spatial reuse, power-control instructions, and near-far interference.

15. A method for configuring a communication device to communicate in a wireless network, the method comprising:
- configuring at least one processor for modulating a plurality of data symbols onto a sequence of code symbols to produce a transmit signal comprising linear combinations of the plurality of data symbols, wherein modulating comprises:
  - employing a block transform on the plurality of data symbols to produce a plurality of coded data symbols, the block transform providing for multiplying each of the plurality of data symbols with one of a plurality of code vectors, wherein each of the plurality of code vectors comprises a different one of a first plurality of frequencies; and
  - employing subcarrier modulation to modulate each of the plurality of coded data symbols onto a different one of a second plurality of frequencies to produce a plurality of modulated subcarriers, wherein the plurality of modulated subcarriers sum to produce the transmit signal;
  - wherein the block transform has dimension N×N, and the subcarrier modulation employs a transform having dimension K×N, where K>N; and
- configuring the at least one processor to couple the transmit signal to a communication interface that is configured for transmitting the transmit signal in the wireless communication network.

16. The method of claim 15, wherein the block transform is configured to provide the plurality of coded data symbols with a Gaussian distribution of complex values.

17. The method of claim 15, wherein the at least one processor and the communication interface are configured to be employed in a relay node, a mobile device in a cellular network, a device in a wireless local area network, or a peer in a peer-to-peer network.

18. The method of claim 15, further comprising configuring the at least one processor to apply precoding to the plurality of coded data symbols.

19. The method of claim 15, wherein at least one of the block transform and the subcarrier modulation uses a fast transform.

20. The method of claim 15, wherein the at least one processor comprises a computer processor, an application specific integrated circuit, a digital signal processor, a microprocessor, a field-programmable gate array, or a very large scale integrated circuit.

21. The method of claim 15, further comprising configuring the at least one processor for at least one of:
- employing at least one of frequency division multiple access, orthogonal-frequency division multiple access, time division multiple access, and code division multiple access;
- configuring multiple network interfaces for communicating in multiple wireless networks, each of the multiple network interfaces employing a different network technology;
- configuring the transmit signal for transmit diversity or multiple-input multiple-output (MIMO);
- providing the transmit signal with at least one of control information, a pilot tone, a training sequence, a synchronization signal, or a cyclic prefix; or
- allocating transmit power to at least one transmission channel, the transmit power being determined from at least one of a channel-quality measurement, wireless terminal battery life, load balancing, spatial reuse, power-control instructions, and near-far interference.

* * * * *